US008105154B2

(12) United States Patent
Okada

(10) Patent No.: US 8,105,154 B2

(45) Date of Patent: Jan. 31, 2012

(54) GAMING MACHINE, GAME CONTROL METHOD AND GAME SYSTEM

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 943 days.

(21) Appl. No.: 11/262,744

(22) Filed: Nov. 1, 2005

(65) Prior Publication Data

US 2007/0060278 A1 Mar. 15, 2007

(30) Foreign Application Priority Data

Aug. 30, 2005 (WO) .................. PCT/JP2005/015817

(51) Int. Cl.
*A63F 13/00* (2006.01)

(52) U.S. Cl. ........................................................ 463/25

(58) Field of Classification Search .............. 463/16–22, 463/26–29

See application file for complete search history.

(56) References Cited

U.S. PATENT DOCUMENTS 4,283,709 A 8/1981 Lucero et al.
4,624,459 A 11/1986 Kaufman
4,669,731 A 6/1987 Clarke
4,837,728 A 6/1989 Barrie et al.
4,964,638 A 10/1990 Ishida
5,178,390 A 1/1993 Okada
5,280,909 A 1/1994 Tracy
5,611,730 A 3/1997 Weiss
5,639,088 A 6/1997 Schneider et al.
5,695,402 A 12/1997 Stupak
5,702,303 A 12/1997 Takemoto et al.
5,770,533 A 6/1998 Franchi
5,820,459 A * 10/1998 Acres et al. .................... 463/25
5,836,817 A 11/1998 Acres et al.
5,890,963 A 4/1999 Yen
5,910,048 A * 6/1999 Feinberg ........................ 463/25
6,001,016 A 12/1999 Walker et al.
6,003,013 A 12/1999 Boushy et al.
6,089,980 A 7/2000 Gauselmann
6,224,482 B1 5/2001 Bennett
6,234,896 B1 5/2001 Walker et al.
6,244,957 B1 6/2001 Walker et al.
(Continued)

FOREIGN PATENT DOCUMENTS

DE 37 12 841 A1 11/1988
(Continued)

OTHER PUBLICATIONS

U.S. Appl. No. 11/734,799, filed Apr. 13, 2007, Okada.
(Continued)

*Primary Examiner* — David L Lewis
*Assistant Examiner* — Eric M Thomas
(74) *Attorney, Agent, or Firm* — Oblon, Spivak, McClelland, Maier & Neustadt, L.L.P.

(57) ABSTRACT

A gaming machine determines a winning combination by lottery. A first special game state is determined as a game state advantageous to a player when the determined winning combination is a special winning combination. A second special game state is provided in which a predetermined number of game media is paid out when the number of games accumulatively counted each time a game is played reaches a set value. A payout mode is selected in the special game state from a plurality of predetermined payout modes.

26 Claims, 22 Drawing Sheets

U.S. PATENT DOCUMENTS

| | | | | |
|---|---|---|---|---|
| 6,254,483 | B1 | 7/2001 | Acres | |
| 6,257,981 | B1 | 7/2001 | Acres et al. | |
| 6,270,409 | B1 * | 8/2001 | Shuster | 463/20 |
| 6,273,820 | B1 | 8/2001 | Haste, III | |
| 6,663,489 | B2 * | 12/2003 | Baerlocher | 463/20 |
| 6,695,697 | B1 | 2/2004 | Okada | |
| 6,932,704 | B2 | 8/2005 | Walker et al. | |
| 6,932,707 | B2 | 8/2005 | Duhamel | |
| 2002/0187825 | A1 * | 12/2002 | Tracy et al. | 463/17 |
| 2003/0064809 | A1 | 4/2003 | Okada | |
| 2003/0064810 | A1 | 4/2003 | Okada | |
| 2003/0069067 | A1 | 4/2003 | Okada | |
| 2003/0069073 | A1 | 4/2003 | Okada | |
| 2003/0073486 | A1 | 4/2003 | Okada | |
| 2003/0073487 | A1 | 4/2003 | Okada | |
| 2003/0078095 | A1 | 4/2003 | Okada | |
| 2003/0119579 | A1 * | 6/2003 | Walker et al. | 463/20 |
| 2003/0228901 | A1 | 12/2003 | Walker et al. | |
| 2005/0159211 | A1 | 7/2005 | Englman | |
| 2006/0009276 | A1 | 1/2006 | Okada | |

FOREIGN PATENT DOCUMENTS

| | | | |
|---|---|---|---|
| DE | 41 37 010 | A1 | 8/1992 |
| EP | 0 631 798 | A1 | 1/1995 |
| EP | 1 192 975 | A1 | 4/2002 |
| EP | 1 302 914 | A2 | 4/2003 |
| EP | 1 477 947 | A2 | 11/2004 |
| GB | 2 326 830 | | 1/1999 |
| JP | 9-264777 | | 10/1997 |
| JP | 9-271567 | | 10/1997 |
| JP | 2719450 | | 11/1997 |
| JP | 11-319213 | | 11/1999 |
| JP | 2000-51436 | | 2/2000 |
| JP | 2000-354685 | | 12/2000 |
| JP | 2001-149524 | | 6/2001 |
| JP | 2003-111890 | | 4/2003 |
| JP | 2003-117053 | | 4/2003 |
| JP | 2003-117070 | | 4/2003 |
| JP | 2004-267642 | | 9/2004 |
| JP | 2005-66182 | | 3/2005 |
| JP | 2005-87245 | | 4/2005 |
| JP | 2005-143639 | | 6/2005 |
| JP | 2005-192660 | | 7/2005 |

OTHER PUBLICATIONS

U.S. Appl. No. 11/734,805, filed Apr. 13, 2007, Okada.
U.S. Appl. No. 11/734,834, filed Apr. 13, 2007, Okada.
U.S. Appl. No. 11/734,810, filed Apr. 13, 2007, Okada.
U.S. Appl. No. 11/735,011, filed Apr. 13, 2007, Okada.
U.S. Appl. No. 11/734,801, filed Apr. 13, 2007, Okada.
U.S. Appl. No. 11/734,815, filed Apr. 13, 2007, Okada.
U.S. Appl. No. 11/734,829, filed Apr. 13, 2007, Okada.
U.S. Appl. No. 11/735,016, filed Apr. 13, 2007, Okada.
U.S. Appl. No. 11/734,989, filed Apr. 13, 2007, Okada.
U.S. Appl. No. 11/734,962, filed Apr. 13, 2007, Okada.
U.S. Appl. No. 11/262,803, filed Nov. 1, 2005, Okada, et al.
U.S. Appl. No. 11/262,780, filed Nov. 1, 2005, Okada.
U.S. Appl. No. 11/262,945, filed Nov. 1, 2005, Okada.
U.S. Appl. No. 11/262,743, filed Nov. 1, 2005, Okada, et al.
U.S. Appl. No. 11/262,804, filed Nov. 1, 2005, Okada, et al.
U.S. Appl. No. 11/262,802, filed Nov. 1, 2005, Okada.
U.S. Appl. No. 11/262,742, filed Nov. 1, 2005, Okada.
U.S. Appl. No. 11/262,763, filed Nov. 1, 2005, Okada, et al.
U.S. Appl. No. 11/398,695, filed Apr. 6, 2006, Okada.
U.S. Appl. No. 11/398,663, filed Apr. 6, 2006, Okada.
U.S. Appl. No. 11/398,706, filed Apr. 6, 2006, Okada.

* cited by examiner

Fig. 3

| | Left reel | Center reel | Right reel |
|---|---|---|---|
| Code No. | Symbol | Symbol | Symbol |
| 00 | JACKPOT 7 | JACKPOT 7 | JACKPOT 7 |
| 01 | PLUM | BELL | CHERRY |
| 02 | ORANGE | APPLE | ORANGE |
| 03 | PLUM | BELL | APPLE |
| 04 | ORANGE | CHERRY | ORANGE |
| 05 | PLUM | ORANGE | PLUM |
| 06 | ORANGE | PLUM | ORANGE |
| 07 | PLUM | CHERRY | PLUM |
| 08 | BLUE 7 | BELL | ORANGE |
| 09 | CHERRY | APPLE | PLUM |
| 10 | ORANGE | BELL | ORANGE |
| 11 | BELL | STRAWBERRY | PLUM |
| 12 | ORANGE | PLUM | BELL |
| 13 | STRAWBERRY | BLUE 7 | STRAWBERRY |
| 14 | BLUE 7 | BELL | BLUE 7 |
| 15 | ORANGE | APPLE | BELL |
| 16 | APPLE | BELL | CHERRY |
| 17 | PLUM | STRAWBERRY | PLUM |
| 18 | ORANGE | PLUM | ORANGE |
| 19 | PLUM | CHERRY | PLUM |
| 20 | BLUE 7 | BELL | ORANGE |
| 21 | CHERRY | APPLE | PLUM |

| Gaming machine identification number | Number of games | Accumulative number of coin-in | Accumulative number of coin-out | Payment balance | Return rate (%) |
|---|---|---|---|---|---|
| 001 | 300 | 15000 | 13500 | -1500 | 90 |
| 002 | 300 | 15000 | 16500 | 1500 | 110 |
| 003 | 600 | 30000 | 22500 | -7500 | 75 |
| ⋮ | ⋮ | ⋮ | ⋮ | ⋮ | ⋮ |

| Set value | Number of coin-out |
|---|---|
| 600 | 1000 |

| Set value | Number of coin-out |
|---|---|
| 600 | (− payment balance) × 50%<br>(provided that the number of coin-out = 1000 if a payment balance ≧ 0) |

Fig. 13

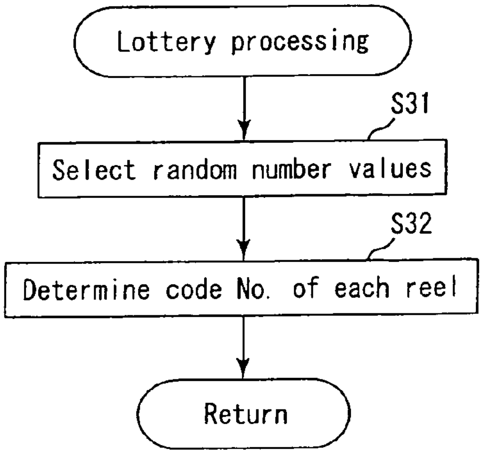

Fig. 14

| Winning combination | | | Establishment possibility (%) | Number of coin-out (※1) |
|---|---|---|---|---|
| Bonus game trigger | | | 0.5 | (※2) |
| JACKPOT 7 | JACKPOT 7 | JACKPOT 7 | 0.5 | 30 |
| BLUE 7 | BLUE 7 | BLUE 7 | 0.8 | 10 |
| BELL | BELL | BELL | 1.1 | 8 |
| CHERRY | CHERRY | CHERRY | 1.5 | 5 |
| STRAWBERRY | STRAWBERRY | STRAWBERRY | 1.5 | 5 |
| PLUM | PLUM | PLUM | 1.8 | 4 |
| ORANGE | ORANGE | ORANGE | 2.3 | 3 |
| CHERRY | CHERRY | (ANY) | 3.0 | 2 |
| ORANGE | ORANGE | (ANY) | 3.0 | 2 |
| CHERRY | (ANY) | (ANY) | 7.5 | 1 |
| ORANGE | (ANY) | (ANY) | 7.5 | 1 |

※1: the number of coin-out per one coin-in
※2: the number of free games determined by lottery is performed

Fig. 17

| Code No. | Index | Number of steps (※) |
|---|---|---|
| 00 | 1 | 0 |
| 01 | | 18 |
| 02 | | 36 |
| 03 | | 54 |
| 04 | | 72 |
| 05 | | 91 |
| 06 | | 109 |
| 07 | | 127 |
| 08 | | 145 |
| 09 | | 163 |
| 10 | | 182 |
| 11 | 2 | 200 |
| 12 | | 218 |
| 13 | | 236 |
| 14 | | 254 |
| 15 | | 273 |
| 16 | | 291 |
| 17 | | 309 |
| 18 | | 327 |
| 19 | | 345 |
| 20 | | 364 |
| 21 | | 382 |

※the number of steps with index 1 as a reference

| Return mode | Payout mode |
|---|---|
| A | Payout of 1000 coins |
| B | Free game (continued until 1000 coins are paid out) |
| C | Game in which the number of coin-out in response to winning combination is increased (continued until the increased number of coin-out reaches 1000 coins) |

Fig. 22

| Winning combination | | | Establishment possibility (%) | Number of coin-out |
|---|---|---|---|---|
| Bonus game trigger | | | 0.8 | (※) |
| JACKPOT 7 | JACKPOT 7 | JACKPOT 7 | 1.5 | 500 |
| BLUE 7 | BLUE 7 | BLUE 7 | 1.5 | 400 |
| BELL | BELL | BELL | 1.5 | 300 |
| CHERRY | CHERRY | CHERRY | 3.0 | 100 |
| STRAWBERRY | STRAWBERRY | STRAWBERRY | 3.0 | 100 |
| PLUM | PLUM | PLUM | 6.0 | 50 |
| ORANGE | ORANGE | ORANGE | 7.5 | 40 |
| CHERRY | CHERRY | (ANY) | 15.0 | 30 |
| ORANGE | ORANGE | (ANY) | 15.0 | 30 |
| CHERRY | (ANY) | (ANY) | 22.5 | 20 |
| ORANGE | (ANY) | (ANY) | 22.5 | 20 |

※: Number of coin-out = 1000 − (accumulated number of coin-out in return mode B)

Fig. 24

| Winning combination | | | Establishment possibility (%) | Number of coin-out (※1) Normal number of coin-out | Number of coin-out (※1) Increased number of coin-out |
|---|---|---|---|---|---|
| Bonus game trigger | | | 0.5 | 0 | (※2) |
| JACKPOT 7 | JACKPOT 7 | JACKPOT 7 | 0.5 | 30 | 15 |
| BLUE 7 | BLUE 7 | BLUE 7 | 0.8 | 10 | 5 |
| BELL | BELL | BELL | 1.1 | 8 | 4 |
| CHERRY | CHERRY | CHERRY | 1.5 | 5 | 3 |
| STRAWBERRY | STRAWBERRY | STRAWBERRY | 1.5 | 5 | 3 |
| PLUM | PLUM | PLUM | 1.8 | 4 | 2 |
| ORANGE | ORANGE | ORANGE | 2.3 | 3 | 2 |
| CHERRY | CHERRY | (ANY) | 3.0 | 2 | 1 |
| ORANGE | ORANGE | (ANY) | 3.0 | 2 | 1 |
| CHERRY | (ANY) | (ANY) | 7.5 | 1 | 1 |
| ORANGE | (ANY) | (ANY) | 7.5 | 1 | 1 |

※1: the number of coin-out per one coin-in
※2: Number of coin-out = 1000 − (accumulated increased number of coin-out in return mode C)

Fig. 25

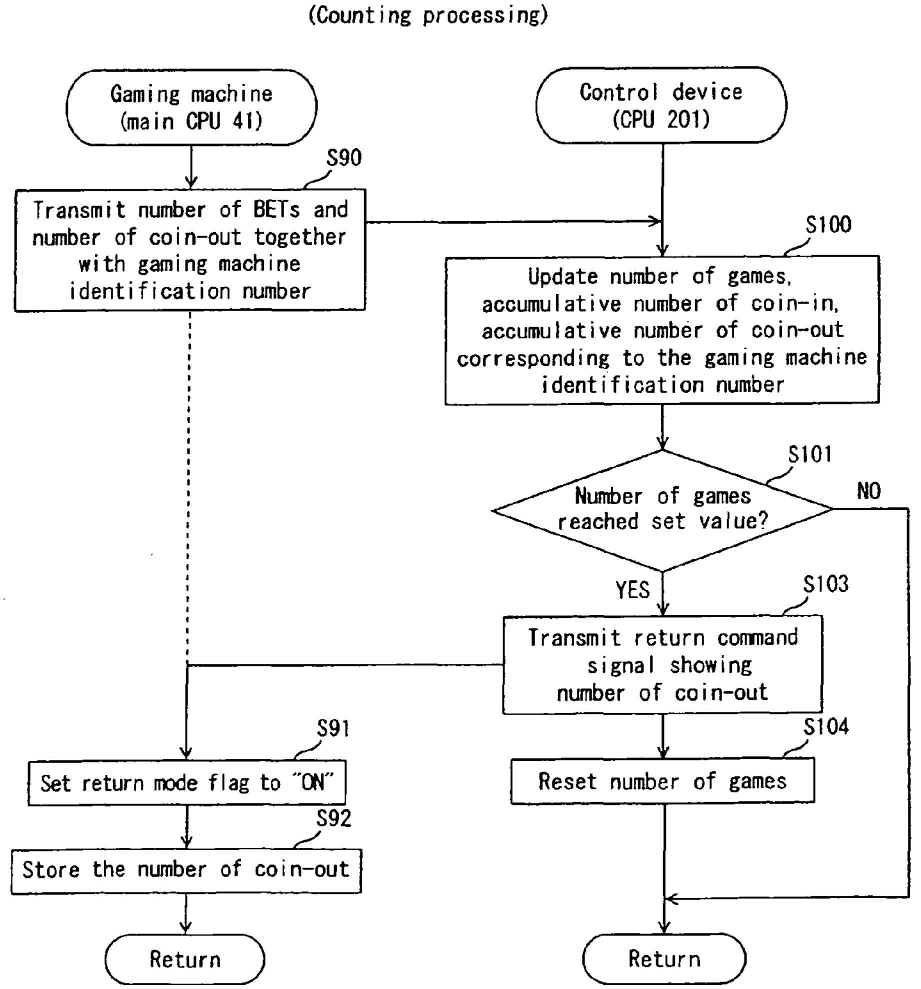

Fig. 27

| Gaming machine identification number | Number of games | Accumulative number of coin-in | Accumulative number of coin-out | Payment balance | Return rate (%) | Set value |
|---|---|---|---|---|---|---|
| 001 | 600 | 30000 | 27000 | -3000 | 90 | 600 |
| 002 | 600 | 30000 | 33000 | 3000 | 110 | 600 |
| 003 | 1200 | 60000 | 45000 | -15000 | 75 | 1200 |
| ⋮ | ⋮ | ⋮ | ⋮ | ⋮ | ⋮ | ⋮ |

Fig. 28

| Set value | Number of coin-out |
|---|---|
| 600 | 1000 |
| 1200 | 2000 |
| 2400 | 4000 |

Fig. 29

| Set value | Number of coin-out |
|---|---|
| 600 | (− payment balance) × 50% (provided that the number of coin-out = 1000 if a payment balance ≧ 0) |
| 1200 | (− payment balance) × 60% (provided that the number of coin-out = 2000 if a payment balance ≧ 0) |
| 2400 | (− payment balance) × 70% (provided that the number of coin-out = 4000 if a payment balance ≧ 0) |

GAMING MACHINE, GAME CONTROL METHOD AND GAME SYSTEM

CROSS-REFERENCE TO RELATED APPLICATIONS

This application claims benefit of priority based on PCT/JP2005/015817 filed on Aug. 30, 2005. The contents of this application are incorporated herein by reference in their entirety.

BACKGROUND OF THE INVENTION

1. Field of the Invention

The present invention relates to a gaming machine such as a slot machine in which a game is conducted using a game media (game valuable) such as a coin and the like, a game control method for the gaming machine, and a game system comprising the gaming machine and a control device.

2. Discussion of the Background

Conventionally, in a facility in which gaming machines such as a slot machine are installed, a game is played by inserting various kinds of game media such as a coin, cash and the like into a gaming machine. Each gaming machine pays out a dividend to a player according to a prize wining state (a result of playing the game) generated while the game is in progress.

In a casino where plural slot machines are installed, a credit spent in each slot machine is partly reserved and in a case where the reservation reaches a predetermined amount, one of the slot machines provides a so-called "jackpot" paying out a big amount, which is not paid out in an ordinary hit (JP-A 2003-117053). In such slot machines, a hit in each machine usually occurs on a preset probability and a player advances a game with expectation of the hit to be encountered. One of the slot machines has a chance to hit a jackpot at a timing in a lottery different from a common lottery in which a hit based on the above-mentioned probability is set in the slot machines. Generally, plural casinos are interconnected in a network in order to increase a payout amount in a jackpot.

Furthermore, a system has been available in which a host computer and plural gaming machines are interconnected on a network and the generating of a bonus in the gaming machines is controlled by the host computer (U.S. Pat. No. 5,820,459). In this system, not only is the number of coins inserted into each gaming machine added up, but part of a total number of inserted coins in the plural gaming machines are separately added up as a bonus pool. The host computer gives a bonus qualification to a gaming machine in which the number of inserted coins reaches a predetermined number. The host computer transmits a command to one gaming machine selected from gaming machines having bonus qualification, when a value of the bonus pool reaches a predetermined threshold value. The gaming machine which received the command is enabled to play a bonus game high in gambling characteristic.

In a slot machine described in JP-A 2003-117053, however, it is a player who plays a game in a gaming machine selected in a lottery that enjoys a profit from a jackpot. Hence, there has arisen a case where a player having spent many coins cannot enjoy a jackpot at all, but another player who has just started the game acquires a jackpot profit.

In the system described in U.S. Pat. No. 5,820,459 as well, a chance to acquire the profit of a bonus game is one of gaming machines in which a total number of inserted coins reaches a predetermined number. A chance to acquire the profit of a bonus game is not always given to a player having spent many coins. Therefore, in the system described in U.S. Pat. No. 5,820,459, there has arisen a case where a player having spent many coins cannot secure the profit of a bonus game and another player who has just started the game acquires a bonus game profit, in a similar way to that in a slot machine described in JP-A 2003-117053.

In the system described in U.S. Pat. No. 5,820,459, part of the number of inserted coins in each of plural gaming machines is added up as a bonus pool. Hence, in a case where an operation rate of the gaming machines in the system is low, a player, who has spent many of coins, has had a possibility not to be rewarded by the profit of a bonus game since the value of the bonus pool does not reaches a predetermined threshold value. Moreover, since the bonus game in the system described in U.S. Pat. No. 5,820,459 is high in gambling characteristic, there has arisen a case where the profit of the bonus game cannot be acquired sufficiently by a player, even when he is given a chance capable of acquiring the profit.

If such circumstances occur, a player who has spent many coins may feel unpleasant against the game, build up distrust thereto, or lose interest in or a concern on the game.

The contents of JP-A 2003-117053 and U.S. Pat. No. 5,820,459 are incorporated herein by reference in their entirety.

SUMMARY OF THE INVENTION

The present invention has been made in light of the above-mentioned problems and it is an object of the present invention to provide: a gaming machine capable of preventing a player who has spent many of the game media such as coins from feeling unpleasant against a game, building up a distrust thereto, or losing interest in or a concern on the game; a game control method related to the gaming machine; and a gaming machine system equipped with the gaming machine and a control device.

In order to solve the above problems, the present invention provides the following configuration.

(1) A gaming machine comprising:

winning combination determination means for determining a winning combination by a lottery;

means for generating a first special game state which is a game state advantageous to a player when the determined winning combination is a special winning combination;

means for generating a second special game state in which the predetermined number of game media is paid out when the number of games accumulatively counted each time a game is played reaches a set value that is an object of comparison with the number of games; and means for selecting a payout mode of the game medium in said second special game state from plural kinds of predetermined payout modes.

According to the configuration (1), the second special game state in which the predetermined number of game media is paid out is generated when the number of games reaches the set value. Therefore, even when the first special game state is not generated for a long period of time and the player used many game media, since the second special game state is generated when the number of games reaches the set value, the player can obtain the predetermined number of game media.

In addition, the payout mode of the game media in the second special game state is selected from plural kinds of predetermined payout modes. Even when either mode is selected, although the number of game media to be paid out in the second special game state is the same, the second special game states can be provided with the diversity by changing the payout mode of the game media in the second special game state.

Therefore, the player who has spent many game media can receive the return in various modes for playing a game until the number of games reaches the set value. As a result, it can be prevented for a player who has spent many of the game media from feeling unpleasant against the game, building up distrust thereto, or losing interest in or a concern on the game.

In addition, the present invention provides the following configuration.

(2) A gaming machine comprising;

winning combination determination means for determining a winning combination by a lottery;

means for generating a first special game state which is a game state advantageous to a player when the determined winning combination is a special winning combination; and means for generating a second special game state in which the predetermined number of game media is paid out in a case the predetermined number of the first special game state is not generated until the number of games accumulatively counted each time a game is played reaches a set value that is an object of comparison with the number of games.

According to the configuration (2), when the second special game state in which the predetermined number of game media is paid out is generated in the case where the predetermined number (three times, for example) of the first special game state is not generated until the number of games reaches the set value. Therefore, even in a case where the first special game state is generated infrequently and the player spends many game media, when the number of games reaches the set value, the second special game state is generated and the player can receive the predetermined number of the game media. As a result, it can be prevented for a player who has spent many of the game media from feeling unpleasant against the game, building up distrust thereto, or losing interest in or a concern on the game.

Furthermore, the present invention provides the following configuration.

(3) A gaming machine comprising:

winning combination determination means for determining a winning combination by a lottery;

means for generating a first special game state which is a game state advantageous to a player when the determined winning combination is a special winning combination;

means for generating a second special game state in which the predetermined number of game medium is paid out in a case the predetermined number of the first special game state is not generated until the number of games accumulatively counted each time a game is played reaches a set value that is an object of comparison with the number of games; and means for selecting a payout mode of the game medium in the second special game state from plural kinds of predetermined payout modes.

According to the configuration (3), when the second special game state in which the predetermined number of game media is paid out is generated in the case where the predetermined number (three times, for example) of the first special game state is not generated until the number of games reaches the set value. Therefore, even in a case where the first special game state is generated infrequently and the player spends many game media, when the number of games reaches the set value, the second special game state is generated and the player can receive the predetermined number of the game media.

In addition, since the payout mode of the game media in the second special game state is selected from plural kinds of the predetermined payout modes, there can be provided a variety of the second special game states.

Therefore, the player who has spent many game media can receive the return in various modes for playing the game until the number of games reaches the set value. As a result, it can be prevented for a player who has spent many of the game media from feeling unpleasant against the game, building up distrust thereto, or losing interest in or a concern on the game.

Furthermore, the present invention provides the following configuration.

(4) A gaming machine connected to a control device which accumulatively counts the number of games in for every gaming machine of a plurality of gaming machines through a communication line, comprising:

winning combination determination means for determining a winning combination by a lottery;

means for generating a first special game state which is a game state advantageous to a player when the determined winning combination is a special winning combination;

means for transmitting an identification information of the gaming machine to said control device through said communication line each time a game is played;

means for receiving a command signal transmitted from said control device when the number of games accumulatively counted by the control device based on said identification information of the gaming machine reaches a set value that is an object of comparison with said number of games;

means for generating a second special game state in which the predetermined number of game medium is paid out based on said command signal; and means for selecting a payout mode of the game medium in said second special game state from plural kinds of predetermined payout modes.

According to the configuration (4), the command signal transmitted from the control device is received when the number of games counted by the control device reaches the set value, and the second special game state in which the predetermined number of game media is paid out is generated. In addition, the payout mode of the game media in the second special game state is selected from plural kinds of the predetermined payout modes. Therefore, the player who has spent many game media can receive the return in various modes for playing a game until the number of games reaches the set value. As a result, it can be prevented for a player who has spent many of the game media from feeling unpleasant against the game, building up distrust thereto, or losing interest in or a concern on the game.

In addition, the present invention provides the following configuration.

(5) A gaming machine comprising:

winning combination determination means for determining a winning combination by a lottery;

means for generating a first special game state which is a game state advantageous to a player when the determined winning combination is a special winning combination;

means for accumulatively counting the number of games each time a game is played;

means for determining whether or not said number of games has reached a set value that is an object of comparison with said number of games;

means for generating a second special game state in which the predetermined number of game medium is paid out when said number of games is determined to have reached said set value; and means for selecting a payout mode of the game medium in said second special game state from plural kinds of predetermined payout modes.

According to the configuration (5), the number of games is accumulatively counted each time the game is played. In addition, whether or not the number of games reaches a set value is determined, the second special game state in which the predetermined number of game media is paid out is generated when it is determined that the number of games reaches the set value. In addition, the payout mode of the game media in the second special game state is selected from plural kinds of the predetermined payout modes. Therefore, the player who has spent many game media can receive the return in various modes for playing a game until the number of games reaches the set value. As a result, it can be prevented for a player who has spent many of the game media from feeling unpleasant against the game, building up distrust thereto, or losing interest in or a concern on the game.

Furthermore, the present invention provides the following configuration.

(6) The gaming machine according to any one of the above (1) to (5) wherein reception means that can accept for one game an insertion of game media up to a predetermined upper limit value is provided, and said means for generating said second special game state generates a second special game state in a case where the number of inserted game media for the game played by the player is equal to said upper limit when said number of games reaches said set value.

According to the configuration (6), since the player is urged to insert the game media until the upper limit value, a facility such as a casino can make more profit.

Furthermore, the present invention provides the following configuration.

(7) A gaming machine equipped with a processing device and a storage device, wherein said processing device executes:

a processing determining one winning combination selected from plural kinds of winning combinations determined in advance by executing a lottery program stored in said storage device;

a processing reading from said storage device a first program for generating a first special game state that is a game state advantageous to a player when the determined winning combination is a special winning combination, and executing said first program;

a processing reading a second program for generating a second special game state in which the predetermined number of game media is paid out from the storage device when the number of games accumulatively counted each time a game is played reaches a set value that is an object of comparison with said number of games, and executing said second program; and a processing selecting the second program for reading from the storage device and executing, from a plurality of second programs in which the payout modes of the game media is different.

According to the configuration (7), when the number of games reaches the set value, the second special game state is generated. In addition, the payout mode of the game media in the second special game state is selected from plural kinds of the predetermined payout modes. Therefore, the player who has spent many game media can receive the return in various modes for playing a game until the number of games reaches the set value. As a result, it can be prevented for a player who has spent many of the game media from feeling unpleasant against the game, building up distrust thereto, or losing interest in or a concern on the game.

Furthermore, the present invention provides the following configuration.

(8) A gaming machine equipped with a processing device and a storage device, wherein said processing device executes:

a processing determining one winning combination selected from plural kinds of winning combinations determined in advance by executing a lottery program stored in said storage device; a processing reading from said storage device a first program for generating a first special game state that is a game state advantageous to a player when the determined winning combination is a special winning combination, and executing said first program;

a processing reading from said storage device a second program for generating a second special game state in which the predetermined number of game media is paid out in a case the predetermined number of the first special game state is not generated until the number of games accumulatively counted each time a game is played reaches a set value that is an object of comparison with the number of games, and executing said second program; and a processing selecting the second program for reading from said storage device and executing, from a plurality of second programs in which the payout modes of the game media is different.

According to the configuration (8), the second special game state is generated in a case where the predetermined number of the first special game state is not generated until the number of the games reaches the set value. In addition, the payout mode of the game media in the second special game state is selected from plural kinds of the predetermined payout modes. Therefore, the player who has spent many game media can receive the return in various modes for playing a game until the number of games reaches the set value. As a result, it can be prevented for a player who has spent many of the game media from feeling unpleasant against the game, building up distrust thereto, or losing interest in or a concern on the game.

Furthermore, the present invention provides the following configuration.

(9) A gaming machine equipped with a processing device and a storage device, and connected through a communication line to a control device which counts the number of games accumulatively for every gaming machine of plural gaming machines, wherein said processing device executes:

a processing determining one winning combination selected from plural kinds of winning combinations determined in advance by executing a lottery program stored in said storage device;

a processing reading from said storage device a first program for generating a first special game state that is a game state advantageous to a player when the determined winning combination is a special winning combination, and executing said first program;

a processing transmitting an identification information on a gaming machine stored in said storage device to said control device through said communication line each time a game is played;

a processing receiving a command signal transmitted from said control device when said number of games counted accumulatively by said control device based on said identification information on the gaming machine reaches a set value that is an object of comparison with said number of games;

a processing reading from the storage device based on said command signal a second program for generating a second special game state in which the predetermined number of game media is paid out, and executing said second program; and a processing selecting the second program for reading from said storage device and executing, from plural kinds of second programs in which the payout modes of the game media is different.

According to the configuration (9), the command signal transmitted from the control device is received when the number of games counted by the control device reaches the set value, and the second special game state is generated. In addition, the payout mode of the game media in the second special game state is selected from plural kinds of the predetermined payout modes. Therefore, the player who has spent many game media can receive the return in various modes for playing a game until the number of games reaches the set value. As a result, it can be prevented for a player who has spent many of the game media from feeling unpleasant against the game, building up distrust thereto, or losing interest in or a concern on the game.

Furthermore, the present invention provides the following configuration.

(10) A gaming machine equipped with a processing device and a storage device, wherein said processing device executes:

a processing determining one winning combination selected from plural kinds of winning combinations determined in advance by executing a lottery program stored in said storage device;

a processing reading from said storage device a first program for generating a first special game state that is a game state advantageous to a player when the determined winning combination is a special winning combination, and executing said first program;

a processing counting the number of games accumulatively each time a game is played;

a processing determining whether or not said number of games has reached said set value that is an object of comparison with said number of games;

a processing reading from the storage device a second program for generating a second special game state in which the predetermined number of game media is paid out when said number of games is determined to have reached said set value, and executing said second program; and a processing selecting the second program for reading from said storage device and executing, from plural kinds of second programs in which the payout modes of the game media is different.

According to the configuration (10), each time the game is played, the number of games is accumulatively counted. In addition, it is determined whether the number of games reaches the set value or not and when it is determined that the number of games reaches the set value, the second special game state is generated. In addition, the payout mode of the game media in the second special game state is selected from plural kinds of the predetermined payout modes. Therefore, the player who has spent many game media can receive the return in various modes for playing a game until the number of games reaches the set value. As a result, it can be prevented for a player who has spent many of the game media from feeling unpleasant against the game, building up distrust thereto, or losing interest in or a concern on the game.

Furthermore, the present invention provides the following configuration.

(11) the gaming machine according to any one of the above (7) to (10), wherein said processing device executes a second program for generating said second special game state in a case where the number of inserted game media for the game played a player is predetermined upper limit value of the number of game media to be inserted for one game when said number of games reaches said set value According to the configuration (11), since the player is urged to insert the game media until the upper limit value, a facility such as a casino can make more profit.

Furthermore, the present invention provides the following configuration.

(12) A gaming machine comprising:

winning combination determination means for determining a winning combination by a lottery;

means for generating a first special game state which is a game state advantageous to a player when the determined winning combination is a special winning combination;

means for generating a second special game state in which the predetermined number of game media is paid out when the payment balance in terms of the game media accumulatively counted each time a game is played becomes equal to or below a set value that is an object of comparison with the payment balance in terms of the game media; and means for selecting a payout mode of the game media in the second special game state from plural kinds of the predetermined payout modes.

According to the configuration (12), the second special game state in which the predetermined number of game media is paid out is generated when the payment balance in terms of the game media becomes equal to or below the set value. Therefore, when many game media is used and the payment balance in terms of the game media becomes equal to or below the set value, the second special game state is generated and the player can get the predetermined number of the game media.

In addition, the payout mode of the game media in the second special game state is selected from plural kinds of the predetermined payout modes. Even when any mode is selected, although the number of the game media paid out is the same, a variety of second special game states can be provided by changing the payout mode of the game media.

Therefore, the player who has spent many game media can receive the return in various modes for playing a game until the payment balance in terms of the game media becomes equal to or below the set value. As a result, it can be prevented for a player who has spent many of the game media from feeling unpleasant against the game, building up distrust thereto, or losing interest in or a concern on the game.

(13) A gaming machine comprising:

winning combination determination means for determining a winning combination by a lottery;

means for generating a first special game state which is a game state advantageous to a player when the determined winning combination is a special winning combination; and means for generating a second special game state in which the predetermined number of game media is paid out in a case where the predetermined number of the first special game state is not generated until the payment balance in terms of the game media accumulatively counted each time a game is played becomes equal to or below a set value that is an object of comparison with the payment balance in terms of the game media.

According to the configuration (13), the second special game state in which the predetermined number of game media is paid out is generated in a case where the predetermined number (three times, for example) of the first special game state is not generated until the payment balance in terms of the game media becomes equal to or below the set value. Therefore, even in a case where the first special game state is generated infrequently and the player has spent many game media, until the payment balance in terms of the game media becomes equal to or below the set value, the second special game state is generated and the player can receive the predetermined number of the game media. As a result, it can be prevented for a player who has spent many of the game media from feeling unpleasant against the game, building up distrust thereto, or losing interest in or a concern on the game.

Furthermore, the present invention provides the following configuration.

(14) A gaming machine comprising winning combination determination means for determining a winning combination by a lottery;

means for generating a first special game state which is a game state advantageous to a player when the determined winning combination is a special winning combination;

means for generating a second special game state in which the predetermined number of game media is paid out in a case the predetermined number of the first special game state is not generated until the payment balance in terms of the game media accumulatively counted each time a game is played becomes equal to or below a set value that is an object of comparison with the payment balance in terms of the game media; and means for selecting a payout mode of the game media in the second special game state from plural kinds of the predetermined payout modes.

According to the configuration (14), the second special game state is generated in a case where the predetermined number of the first special game state is not generated until the payment balance in terms of the game media reaches the set value. In addition, the payout mode of the game media in the second special game state is selected from plural kinds of the predetermined payout modes. Therefore, the player who has spent many game media can receive the return in various modes until the payment balance in terms of the game media becomes equal to or below the set value. As a result, it can be prevented for a player who has spent many of the game media from feeling unpleasant against the game, building up distrust thereto, or losing interest in or a concern on the game.

Furthermore, the present invention provides the following configuration.

(15) A gaming machine connected to a control device which accumulatively counts the payment balance in terms of the game media in for every gaming machine of a plurality of gaming machines through a communication line, comprising:

winning combination determination means for determining a winning combination by a lottery;

means for generating a first special game state which is a game state advantageous to player when the determined winning combination is a special winning combination;

means for transmitting the payment balance in terms of the game media at that game with an identification information of the gaming machine to the control device through the communication line each time a game is played;

means for receiving a command signal transmitted from the control device when the payment balance in terms of the game media accumulatively counted by the control device based on the payment balance in terms of the game media at that game and the identification information of the gaming machine reaches a set value that is an object of comparison with the payment balance in terms of the game media;

means for generating a second special game state in which the predetermined number of game media is paid out based on the command signal; and means for selecting a payout mode of the game media in the second special game state from plural kinds of the predetermined payout modes.

According to the configuration (15), the command signal transmitted from the control device is received when the payment balance in terms of the game media counted by the control device becomes equal to or below the set value, and the second special game state is generated. In addition, the payout mode of the game media in the second special game state is selected from plural kinds of the predetermined payout modes. Therefore, the player who has spent many game media can receive the return in various modes until the payment balance in terms of the game media becomes equal to or below the set value. As a result, it can be prevented for a player who has spent many of the game media from feeling unpleasant against the game, building up distrust thereto, or losing interest in or a concern on the game.

In addition, the present invention provides the following configuration.

(16) A gaming machine comprising:

winning combination determination means for determining a winning combination by a lottery;

means for generating a first special game state which is a game state advantageous to a player when the determined winning combination is a special winning combination;

means for accumulatively counting the payment balance in terms of game media each time a game is played;

means for determining whether or not the payment balance in terms of the game media becomes equal to or below a set value that is an object of comparison with the payment balance in terms of the game media;

means for generating a second special game state in which a predetermined number of game media is paid out when it is determined that the payment balance in terms of the game media becomes equal to or below the set value; and means for selecting a payout mode of the game media in the second special game state from plural kinds of the predetermined payout modes.

According to the configuration (16), the payment balance in terms of the game media is accumulatively counted each time the game is played. In addition, it is determined whether or not the payment balance in terms of the game media becomes equal to or below the set value, and the second special game state is generated when it is determined that the payment balance in terms of the game media becomes equal to or below the set value. In addition, the payout mode of the game media in the second special game state is selected from plural kinds of the predetermined payout modes. Therefore, the player who has spent many game media can receive the return in various modes until the game media reaches the set value. As a result, it can be prevented for a player who has spent many of the game media from feeling unpleasant against the game, building up distrust thereto, or losing interest in or a concern on the game.

Furthermore, the present invention provides the following configuration.

(17) The gaming machine according to any one of the above (12) to (16) comprising reception means which can accept an insertion of the game media up to a predetermined upper limit value for one game, means for generating the second special game state generates the second special game state when the payment balance in terms of the game media becomes equal to or below the set value in a case where the number of inserted game media for that game is the upper limit value.

According to the configuration (17), since the player is urged to insert the game media until the upper limit value, a facility such as a casino can make more profit.

Furthermore, the present invention provides the following configuration.

(18) A gaming machine comprising a processing device and a storage device, wherein the processing device executes:

a processing determining one winning combination selected from plural kinds of winning combinations by executing a lottery program stored in the storage device;

a processing reading from the storage device a first program for generating a first special game state which is a game state advantageous to a player when the determined winning combination is a special winning combination, and executing the first program;

a processing reading from the storage device a second program for generating a second special game state in which the predetermined number of game media is paid out when the payment balance in terms of the game media accumulatively counted each time a game is played becomes equal to or below a set value that is an object of comparison with the payment balance in terms of the game media, and executing the second program; and a processing selecting the second program for reading from the storage device and executing, from a plurality of second programs in which the payout modes of the game media is different.

According to the configuration (18), when the payment balance in terms of the game media becomes equal to or below the set value, the second special game state is generated. In addition, the payout mode of the game media in the second special game state is selected from plural kinds of the predetermined payout modes. Therefore, the player who has spent many game media can receive the return in various modes until the payment balance in terms of the game media becomes equal to or below the set value. As a result, it can be prevented for a player who has spent many of the game media from feeling unpleasant against the game, building up distrust thereto, or losing interest in or a concern on the game.

Furthermore, the present invention provides the following configuration.

(19) A gaming machine comprising a processing device and a storage device, wherein the processing device executes:

a processing determining one winning combination selected from plural kinds of the predetermined winning combinations by executing a lottery program stored in the storage device;

a processing reading from the storage device a first program for generating a first special game state which is a game state advantageous to a player when the determined winning combination is a special winning combination, and executing the first program;

a processing reading and executing a second program to generate a second special game state in which the predetermined number of game media is paid out from the storage device in a case where the predetermined number of the first special game state is not generated until the payment balance in terms of the game media accumulatively counted each time a game is played becomes equal to or below a set value that is an object of comparison with the payment balance in terms of the game media, and a processing selecting the second program for reading from the storage device and executing, from a plurality of second programs in which the payout modes of the game media is different.

According to the configuration (19), the second special game state is generated in a case where the predetermined number of the first special game state is not generated until the payment balance in terms of the game media reaches the set value. In addition, the payout mode of the game media in the second special game state is selected from plural kinds of the predetermined payout modes. Therefore, the player who has spent many game media can receive the return in various modes until payment balance in terms of the game media becomes equal to or below the set value. As a result, it can be prevented for a player who has spent many of the game media from feeling unpleasant against the game, building up distrust thereto, or losing interest in or a concern on the game.

Furthermore, the present invention provides the following configuration.

(20) A gaming machine comprising a processing device and a storage device and connected to a control device which accumulatively counts the payment balance in terms of the game media in for every gaming machine of a plurality of gaming machines through a communication line, wherein the processing device executes:

a processing determining one winning combination selected from plural kinds of predetermined winning combinations by executing a lottery program stored in the storage device;

a processing reading from the storage device a first program for generating a first special game state which is a game state advantageous to a player when the determined winning combination is a special winning combination, and executing the first program;

a processing transmitting the numbers of insertion and payout of game media which are stored in the storage device with an identification information of the gaming machine to the control device through the communication line each time a game is played;

a processing receiving a command signal transmitted from the control device when the payment balance in terms of the game media accumulatively counted by the control device based on the numbers of insertion and payout of the game media in the game and the identification information of the gaming machine becomes equal to or below a set value that is an object of comparison with payment balance in terms of the game media;

a processing reading from the storage device a second program for generating a second special game state in which the predetermined number of game media is paid out based on the command signal, and executing the second program; and a processing selecting the second program for reading from the storage device and executing, from a plurality of second programs in which the payout modes of the game media is different.

According to the configuration (20), the command signal transmitted from the control device is received when the payment balance in terms of the game media counted by the control device becomes equal to or below the set value, and the second special game state is generated. In addition, the payout mode of the game media in the second special game state is selected from plural kinds of the predetermined payout modes. Therefore, the player who has spent many game media can receive the return in various modes for playing a game until the payment balance in terms of the game media becomes equal to or below the set value. As a result, it can be prevented for a player who has spent many of the game media from feeling unpleasant against the game, building up distrust thereto, or losing interest in or a concern on the game.

Furthermore, the present invention provides the following configuration.

(21) A gaming machine comprising a processing device and a storage device, wherein the processing device executes:

a processing determining one winning combination selected from plural kinds of the predetermined winning combinations by executing a lottery program stored in the storage device;

a processing reading from the storage device a first program for generating a first special game state which is a game state advantageous to a player when the determined winning combination is a special winning combination, and executing the first program;

a processing accumulatively counting the payment balance in terms of the game media each time a game is played;

a processing determining whether or not the payment balance in terms of the game media becomes equal to or below a set value that is an object of comparison with the payment balance in terms of the game media;

a processing reading from the storage device a second program for generating a second special game state in which the predetermined number of game media is paid out when it is determined that the payment balance in terms of the game media becomes equal to or below the set value, and executing; and a processing selecting the second program for reading from the storage device and executing, from a plurality of second programs in which the payout modes of the game media is different.

According to the configuration (21), each time the game is played, the payment balance in terms of the game media is accumulatively counted. In addition, it is determined whether or not the payment balance in terms of the game media becomes equal to or below the set value, and when it is determined that the payment balance in terms of the game media becomes equal to or below the set value, the second special game state is generated. In addition, the payout mode of the game media in the second special game state is selected from plural kinds of the predetermined payout modes. Therefore, the player who has spent many game media can receive the return in various modes for playing a game until the payment balance in terms of the game media becomes equal to or below the set value. As a result, it can be prevented for a player who has spent many of the game media from feeling unpleasant against the game, building up distrust thereto, or losing interest in or a concern on the game.

Furthermore, the present invention provides the following configuration.

(22) the gaming machine according to any one of the above (18) to (21), the processing device executes the second program for generating the second special game state when the payment balance in terms of the game media becomes equal to or below the set value in a case where the number of inserted game media for that game is a predetermined upper limit value of the number of inserted game media for one game.

According to the configuration (22), since the player is urged to insert the game media until the upper limit value, a facility such as a casino can make more profit.

Furthermore, the present invention provides the following configuration.

(23) A gaming machine comprising:

means for paying out to the player a number of game media corresponding to the number of games played by a player; and means for selecting a payout mode of the number of game media corresponding to said number of games from plural kinds of predetermined payout modes.

According to the configuration (23), the number of game media corresponding to the number of games played by the player is paid out to the player. In addition, the payout mode in that time is selected from plural kinds of payout modes. Therefore, the player who has spent many game media can receive the return in various modes until the payment balance in terms of the game media becomes equal to or below the set value. As a result, it can be prevented for a player who has spent many of the game media from feeling unpleasant against the game, building up distrust thereto, or losing interest in or a concern on the game.

Furthermore, the present invention provides the following configuration.

(24) A gaming machine comprising:

means for paying out a number of game media corresponding to the payment balance in terms of the game media of a player to the player; and means for selecting a payout mode of the number of game media corresponding to the payment balance in terms of the game media from plural kinds of the predetermined payout modes.

According to the configuration (24), the number of game media corresponding to the payment balance in terms of the game media of the player is paid out to the player. In addition, the payout mode in that time is selected from plural kinds of the predetermined payout modes. Therefore, the player who has spent many game media can receive the return in various modes until the payment balance in terms of the game media becomes equal to or below the set value. As a result, it can be prevented for a player who has spent many of the game media from feeling unpleasant against the game, building up distrust thereto, or losing interest in or a concern on the game.

Furthermore, the present invention provides the following configuration.

(25) A game control method comprising:

a step of paying to the player a number of game media corresponding to the number of games played by a player; and a step of selecting a payout mode of the number of game media corresponding to said number of games from plural kinds of predetermined payout modes.

According to the configuration (25), the number of game media corresponding to the number of games played by the player is paid out to the player. In addition, the payout mode of the number of game media is selected from plural kinds of the predetermined payout modes. Therefore, the player who has spent many game media can receive the return in various modes until the payment balance in terms of the game media becomes equal to or below the set value. As a result, it can be prevented for a player who has spent many of the game media from feeling unpleasant against the game, building up distrust thereto, or losing interest in or a concern on the game.

Furthermore, the present invention provides the following configuration.

(26) A game control method comprising:

a step of paying to the player a number of game media corresponding to the payment balance in terms of the game media of a player; and a step of selecting a payout mode of the number of game media corresponding to the payment balance in terms of the game media from plural kinds of the predetermined payout modes.

According to the configuration (26), the number of game media corresponding to the payment balance in terms of the game media of a player is paid out to the player. In addition, the payout mode at that time is selected from plural kinds of the predetermined payout modes. Therefore, the player who has spent many game media can receive the return in various modes until the payment balance in terms of the game media becomes equal to or below the set value. As a result, it can be prevented for a player who has spent many of the game media from feeling unpleasant against the game, building up distrust thereto, or losing interest in or a concern on the game.

Furthermore, the present invention provides the following configuration.

(27) A control system equipped with a gaming machine and a control device, wherein the control device includes:

means for transmitting a signal to said gaming machine according to said number of games played by a player in said gaming machine, and the gaming machine includes:

means for paying out a number of game media corresponding to said number of games to the player based on said signal received from said control device; and means for selecting a payout mode of the number of game media corresponding to said number of games from plural kinds of the predetermined payout modes.

According to the configuration (27), the number of game media corresponding to the number of games played by the player is paid out to the player. In addition, the payout mode in that time is selected from plural kinds of the predetermined payout modes. Therefore, the player who has spent many game media can receive the return in various modes until the payment balance in terms of the game media becomes equal to or below the set value. As a result, it can be prevented for a player who has spent many of the game media from feeling unpleasant against the game, building up distrust thereto, or losing interest in or a concern on the game.

Furthermore, the present invention provides the following configuration.

(28) A game system comprising a gaming machine and a control device, wherein the control device comprises means for transmitting a signal to the gaming machine according to the payment balance in terms of the game media of a player in the gaming machine, and means for paying out a number of game media corresponding to said payment balance in terms of the game media of a player to the player based on said signal received from said control device; and means for selecting a payout mode of the number of game media corresponding to said payment balance in terms of the game media from plural kinds of the predetermined payout modes.

According to the configuration (28), the number of game media corresponding to the payment balance in terms of the game media of the player is paid out to the player. In addition, the payout mode of the number of game media is selected from plural kinds of payout modes. Therefore, the player who has spent many game media can receive the return in various modes until the payment balance in terms of the game media becomes equal to or below the set value. As a result, it can be prevented for a player who has spent many of the game media from feeling unpleasant against the game, building up distrust thereto, or losing interest in or a concern on the game.

As a result, according to the present invention, it can be prevented for a player who has spent many of the game media from feeling unpleasant against the game, building up distrust thereto, or losing interest in or a concern on the game.

BRIEF DESCRIPTION OF THE DRAWINGS

FIG. 3 is a schematic view showing the symbol sequence depicted on the outer circumferential surface of each reel;

FIG. 13 is a flowchart showing a subroutine of a lottery processing;

FIG. 14 is a figure describing a relationship among winning combinations of plural kinds, establishment possibility of each winning combination and the number of coin-out in the present embodiment;

FIG. 17 is a schematic diagram showing a correspondence table between the number of steps and the code No.;

FIG. 22 is a figure describing a relationship among winning combinations of plural kinds, establishment possibility of each winning combination and the number of coin-out in the return mode B;

FIG. 24 is a figure describing a relationship among winning combinations of plural kinds, establishment possibility of each winning combination and the number of coin-out in the return mode C;

FIG. 25 is a flowchart showing a subroutine of a count process;

FIG. 27 is a view schematically showing another example of the correspondence table between the set value and the number of payout;

FIG. 28 is a flowchart showing another example of the subroutine of the count process;

FIG. 29 is a flowchart schematically showing another example of the correspondence table between the gaming machine identification number and the game history.

DESCRIPTION OF THE EMBODIMENTS

Figure 1:
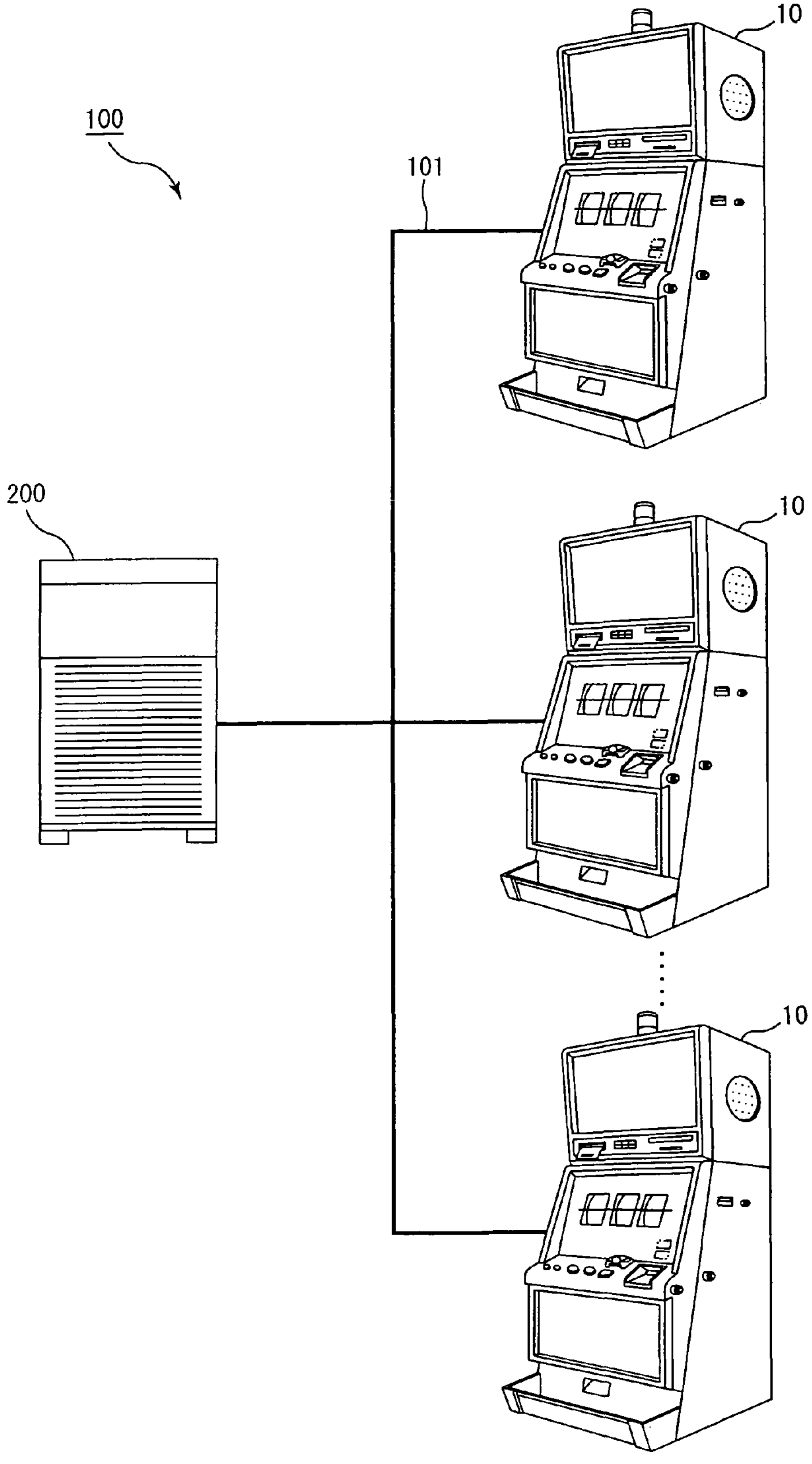
FIG. 1 is a schematic diagram showing the entire construction of a game system according to one embodiment of the present invention.

FIG. 1 is a schematic diagram showing the entire construction of a game system according to one embodiment of the present invention.

A game system 100 includes: plural gaming machines 10; and a control device 200 connected to the gaming machines 10 through a predetermined communication line 101. Such a game system 100 may be constructed in one recreation facility capable of playing various kinds of games such as a bar, a casino and the like, or between plural recreation facilities. When the game system is constructed in one recreation facility, the game system 100 may be constructed on each floor or section of the recreation facility. The communication line 101 is not particularly limited, and may be wired or wireless, and either a dedicated line or a switched line can be used.

In the embodiment, the gaming machine 10 is a slot machine. In the present invention, however, a gaming machine is not limited to a slot machine, and for example, a so-called single gaming machine such as a video slot machine, a video card gaming machine and the like may be adopted, and a so-called mass game (multi-terminal gaming machine) such as a racing game, a bingo game, a public lottery and the like, which is a game that takes a predetermined time for a result to be displayed, may also be adopted.

In the gaming machine 10, a coin, a note or electronic valuable information corresponding thereto is used as a game media. In the present invention, however, the game media is not particularly limited, and for example, a medal, a token, electronic money and a ticket can be used. The ticket is not particularly limited and may include, for example, a ticket with a bar code as described later, and of the like tickets.

The control device 200 controls plural gaming machines 10. Especially, in the present embodiment, the control device 200 controls a transition to a return mode in each of the gaming machines 10. The return mode corresponds to the second special game state in the present invention and many coins are paid out in the return mode. The control device 200 may be a device which controls the return rate by controlling the transition to the return mode. In such a construction, the control device 200 may be a device which controls the return rates of each of the gaming machines 10 individually, or a device which controls the return rate across all gaming machines 10 collectively.

The control device 200 may further function as a so-called hole server which is installed in a recreation facility having plural gaming machines 10, or as a server which collectively controls plural recreation facilities. Moreover, every gaming machine 10 has its own identification number, and the source of data transmitted to the control device 200 from each of the gaming machines 10 is distinguished therein by their identification numbers. The identification number is also used to designate a transmission destination of data transmitted to the gaming machine 10 from the control device 200.

The identification number of a gaming machine corresponds to the identification information on a gaming machine of the present invention. The identification information on a gaming machine of the present invention is not particularly limited, and examples thereof may include: a letter, a symbol, a figure, a combination thereof, and the like.

Figure 2:
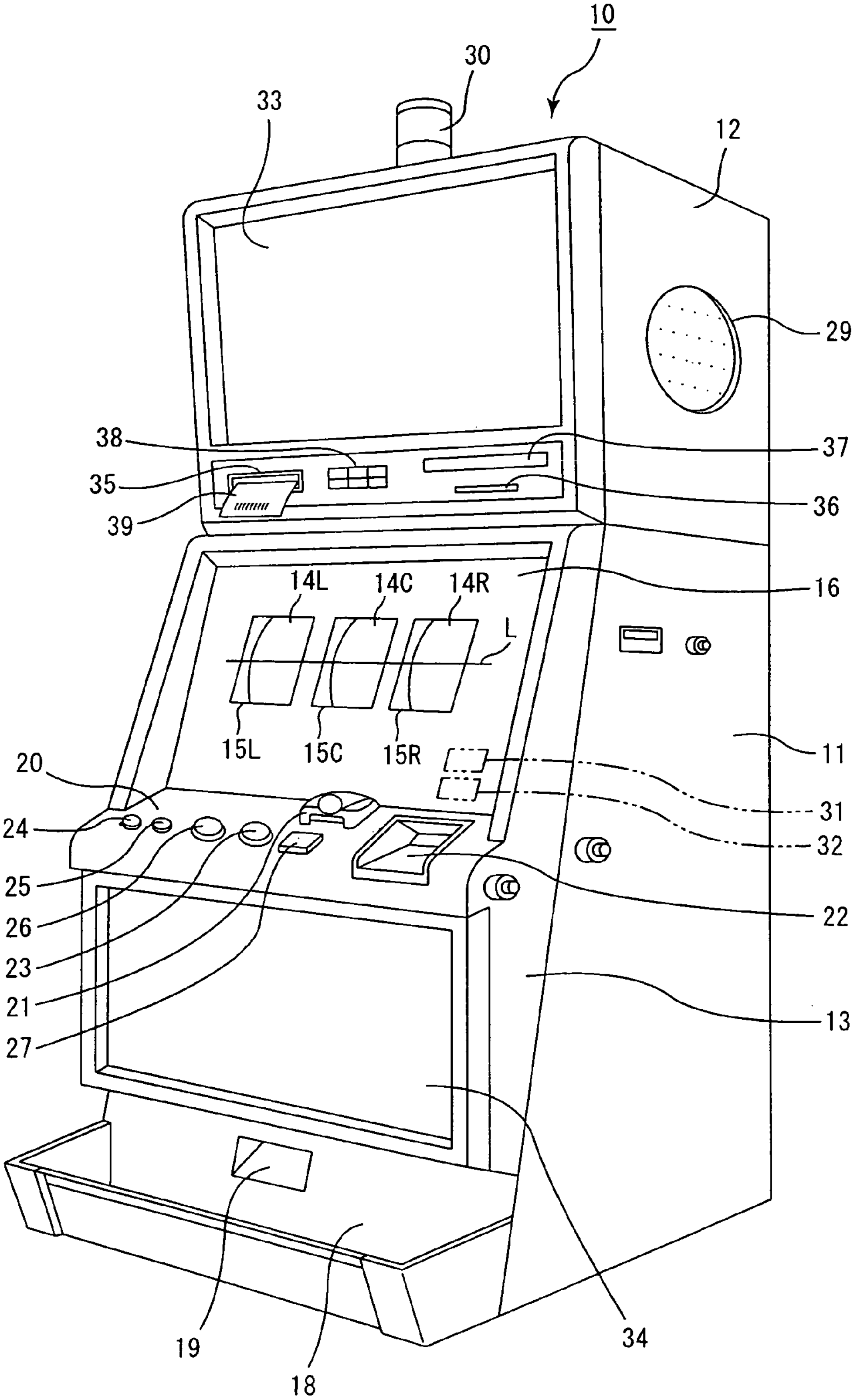
FIG. 2 is a perspective view schematically showing a gaming machine according to one embodiment of the present invention.

FIG. 2 is a perspective view schematically showing a gaming machine according to one embodiment of the present invention.

The gaming machine 10 includes: a cabinet 11; a top box 12 placed on the upper side of the cabinet 11; and a main door 13 provided at the front face of the cabinet 11. Inside the cabinet 11, three reels 14 (14L, 14C and 14R) are rotatably installed. Twenty two designs (hereinafter, also referred to as symbols) are depicted as symbol sequences on the outer circumferential surface of each of the reels 14.

A lower image display panel 16 is provided over the reels 14 in the main door 13. The lower image display panel 16 is provided with a transparent liquid crystal panel, and various kinds of information, representation image and the like associated with the game are displayed while the game is played. The lower image display panel 16 is an output device for an image and functions also as output means capable of outputting an image.

A number-of-credits display section 31 and a number-of-payouts display section 32 are formed on the lower image display panel 16. The number of credited coins is displayed as an image on the number-of-credits display section 31. The number of coins to be paid out is shown as an image on the number-of-payouts display section 32, when a combination of symbols stop displayed on a winning line L is a predetermined combination.

Three display windows 15 (15L, 15C and 15R), the back faces of which are visually recognizable, are formed on the lower image display panel 16, and through each of the display windows 15, three of the symbols depicted on the outer circumferential surface of each of the reels 14 are displayed. One winning line L traversing horizontally the three display windows 15 is formed on the lower image display panel 16. The winning line L defines a combination of symbols. When a combination of symbols stop displayed on the winning line L is a predetermined combination, the number of coins corresponding to the combination and the number of inserted coins (the number of BETs) is paid out.

Moreover, in the present invention, for example, when: plural winning lines L which traverse horizontally or obliquely the three display windows 15 are formed; the winning lines L, the number thereof which becomes effective set to be dependent on the number of coin-in, become effective; and a combination of symbols stop displayed on the winning line L which became effective is a predetermined combination, the number of coins corresponding to the stop-displayed combination may be paid out.

A touch panel 69, which is not shown in the figure, is provided on the front face of the lower image display panel 16 and the player can input various kinds of commands by operating the touch panel 69.

Provided below the lower image display panel 16 are: a control panel 20 constituting of plural buttons 23 to 27 which are inputted by the player, commands associated with progress of the game; a coin receiving slot 21 accepting coins into the cabinet 11; and a note identifier 22.

The control panel 20 is provided with: a spin button 23; a change button 24; a CASHOUT button 25; a 1-BET button 26; and a maximum BET button 27. The spin button 23 is used for inputting a command to start the rotating of the reels 14. The change button 24 is used in a case where a player requests an attendant of a recreation facility to exchange money. The CASHOUT button 25 is used for inputting a command to pay out credited coins to a coin tray 18.

The 1-BET button 26 is used for inputting a command to bet one coin of the credited coins. The maximum BET button 27 is used for inputting a command to bet the maximum number of coins that can be bet on one game (50 coins in the present embodiment) of the credited coins.

In the present invention, insertion of a game media means that a game media is bet on a game. For example, when coins inserted into the coin receiving slot 21 are directly bet on a game, insertion of coins into the coin receiving slot 21 corresponds to insertion of a game media. However, when coins inserted into the coin receiving slot 21 are temporarily credited, and the credited coins are bet on a game by operating the 1-BET button 26 or the maximum BET button 27, as in the present embodiment, the bet of the credited coins on the game corresponds to insertion of a game media.

The note identifier 22 is used not only for discriminating a false note from a true note but also for accepting the true note into the cabinet 11. The note identifier 22 may be configured such that a ticket 39 with a bar code which will be described later can be read. A belly glass 34 on which characters and the like of the gaming machine 10 are depicted is provided on the front face of the lower portion of the main door 13, that is, below the control panel 20.

An upper image display panel 33 is provided at the front face of a top box 12. The upper image display panel 33 is provided with a liquid crystal panel and, for example, an image to introduce the contents of the game or explain a game rule is displayed thereto. Although the lower image display panel 16 is an image output device and functions also as the output means of an image in the present embodiment, in the present invention, the upper image display panel 33 may also be an image output device, which functions also as the output means of an image.

A speaker 29 is provided in the top box 12. The speaker 29 is a sound output device and functions as output means capable of outputting a sound. A ticket printer 35, a card reader 36, a data display 37 and a keypad 38 are provided beneath the upper image display panel 33. The ticket printer 35 prints on a ticket a bar code in which data such as the number of credits, date, time, identification number of the gaming machine 10 and of the like data are encoded, and outputs the ticket 39 with a bar code. A player can make the ticket 39 with a bar code to be read by a second gaming machine and play a game in the second gaming machine, or exchange in a predetermined place (for example, at a cashier in the casino) of a recreation facility the ticket 39 with a bar code to notes.

The card reader 36 is used for reading data from a smart card and writing data onto a smart card. The smart card is a card to be carried by a player, and for example, data to identify a player and data concerning a history of a game played by a player are stored thereon. Data corresponding to a coin, a note or a credit may also be stored on the smart card. As an alternative of a smart card, a magnetic stripe card may be adopted. The data display 37 is a fluorescent display and the like, and it is used, for example, to display data read by the card reader 36 and data inputted by a player from the keypad 38. The keypad 38 is used for inputting a command or data to issue a ticket and the like.

FIG. 3 is a schematic view showing the symbol sequence depicted on the outer circumferential surface of each reel.

Twenty two symbols each are depicted on the outer circumferential surface of the left reel 14L, the middle reel 14C and the right reel 14R. A sequence of the symbols depicted on the outer circumferential surface of each of the reels 14 is different from one another. The sequences of the symbols are combinations of the following symbols: "JACKPOT 7", "BLUE 7", "BELL", "CHERRY", "STRAWBERRY", "PLUM", "ORANGE" and "APPLE".

When the same three symbols of one of the symbols of "JACKPOT 7", "BLUE 7", "BELL", "CHERRY", "STRAWBERRY", "PLUM" and "ORANGE" are stop displayed on the winning line L, a predetermined number of credits is added to the account of the player as a credit owned by the player (see FIG. 14). As for "CHERRY" and "ORANGE", even if one or two of one of the symbols are stop displayed, a predetermined number of credits are added to the account of the player as credits owned by the player according to the number of the symbols-stop displayed (see FIG. 14).

The symbol sequence "APPLE" is a bonus game trigger (a symbol to transit to a bonus game). When three of the "APPLE" are stop displayed on the winning line L, a game state shifts to a bonus game. The bonus game corresponds to the first special game state. In the present embodiment, a bonus game is a free game (a game in which a predetermined number thereof can be played without inserting coins for BET).

In the present invention, the first special game state is not particularly limited as far as it is a game state advantageous to the player. A game state that is advantageous to the player is not particularly limited as far as it is more advantageous than an ordinary game state (a game state other than the first special game state or the second special game state) and examples thereof include: a state where more of the game media can be earned than in an ordinary game state, a state where the game media can be earned on a probability higher than in an ordinary game state, a state where the number of the game media spent by a player is less than in an ordinary game state and of the like state. More specifically, examples of the first special game state include a free game, a second game, a mystery bonus and the like.

The sequence of symbols depicted on each of the reels 14 are, when the spin button 23 is pressed after the 1-BET button or the maximum BET button 27 is pressed to start a game, scroll displayed by scrolling downwards in the display windows 15 during the rotating of the reels 14, and after a predetermined time elapses, the rotating of the reels 14 comes to a stop, and thus the sequence of symbols are stop displayed in the display windows 15. Various kinds of winning combinations (see FIG. 14) are predetermined based on combinations of symbols and when a combination of symbols corresponding to a winning combination stops on the winning line L, the number of payout coins corresponding to the winning combination is added to credits owned by the player. When a bonus game trigger has been established, a bonus game is generated.

Furthermore, when a return mode flag which will be described later has been set to the state "ON", a game state shifts to a return mode after the symbols are stop displayed as described above. When a bonus game has been generated, the game state shifts to the return mode after the bonus game is over. The return mode corresponds to the second special game state.

According to this embodiment, when a game state shifts to the return mode, one return mode is selected from return modes A to C and the game state shifts to the selected return mode.

Although payout modes of coin-in are different in the return modes A to C, a number of coin-out is the same in any of return modes.

That is, 1000 coins are paid out in the return mode A. A free game is played in the return mode B. The return mode B is continued until 1000 coins are paid out.

In the return mode C, a game in which the number of coin-out in response to a winning combination is increased is played in the return mode C. In the return mode C, the number of coins being counted by adding the number of payout in a normal game and the increased number of payout are paid out. Among these, an increased number of payout corresponds to the number of payout in the return mode C. Therefore, the return mode C is continued until the increased number of coins to be increased reaches 1000.

According to the present invention, the "payout mode of the game media" means a pattern for paying out the game media. As an element of defining the payout mode of the game media, there are, for example, a method of paying the game media, the number of games required for the payout of the game media, the number of payout of the game media, and the like. In addition, the kind of the game media (credit or coin, for example) is not included in the element for defining the payout mode of the game media.

For example, according to the method of paying out the game media in the case of the return mode A, the coins are paid out regardless of the combination of the symbols, and the number of the games required for the payout of the game media is 0 and the number of paying the game media is 1.

In addition, the method of paying out the game media in the case of the return mode B is the free game. The number of the games required for the payout of the game media is the number until the 1000 coins are paid out and the number of paying the game media is the number until the 1000 coins are paid out.

In addition, the method of paying the game media in the case of the return mode C is the method in which the number of payout of the game media in response to the winning combination is increased. The number of the games required for the payout of the game media is the number until the increased number of coins to be paid out reaches 1000, and the number of paying out the game media is the number until the increased number of coins reaches 1000.

According to the present invention, in the second special game state, the payout mode of the game media is not particularly limited as long as it is a game state that the predetermined number of game media is paid out. For example, the payout mode may be such that the predetermined number of game media is paid out in a lump, the free game is played, and the number of payout game media in response to the winning combination is increased.

According to the present invention, the payout mode of the game media in the second special game state may be the same as that in the first special game state, or it may be different from that. In addition, the payout mode of the game media in the second special game state may be specially implemented only when the second special game state is generated.

Figure 4:
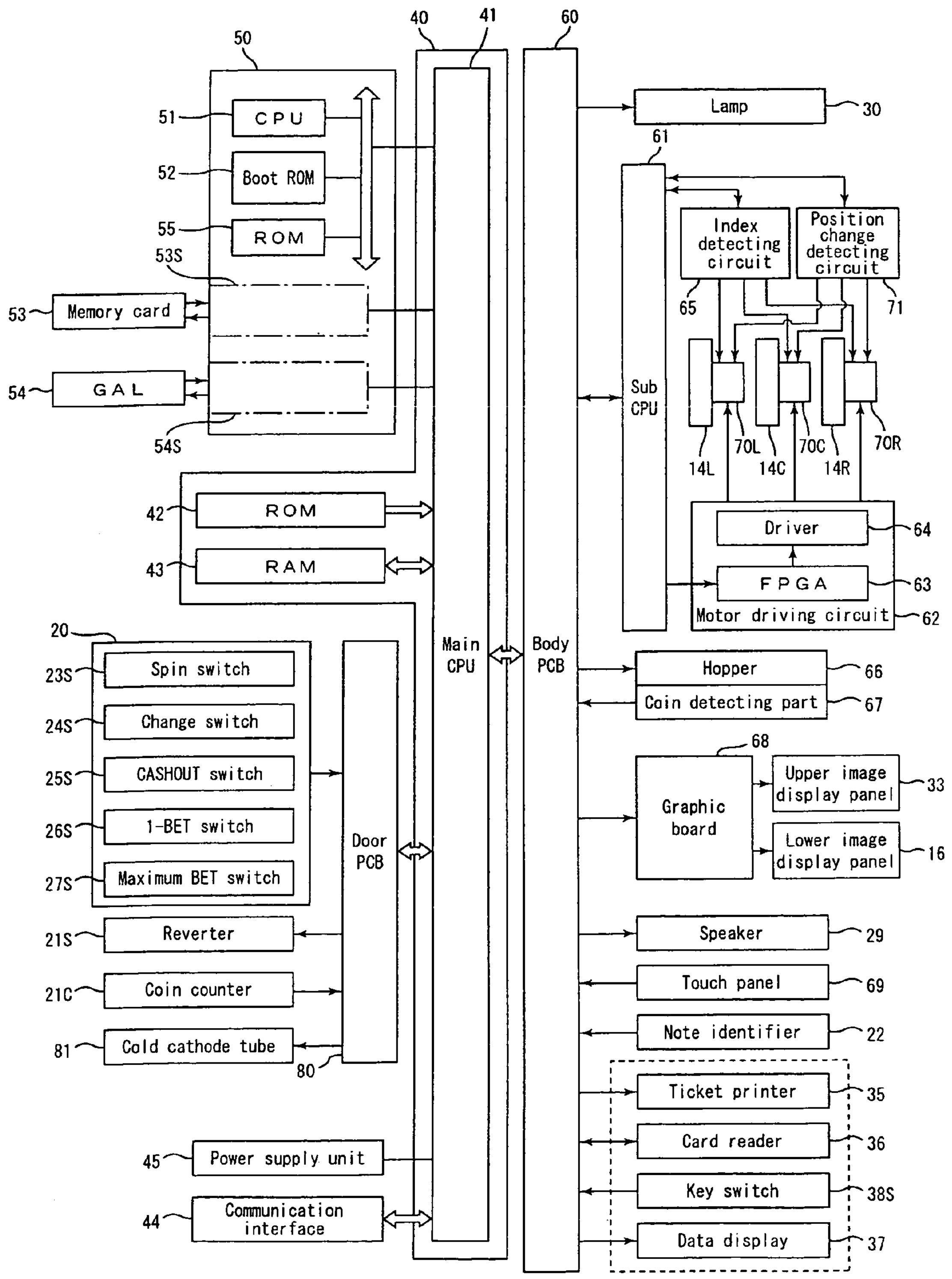
FIG. 4 is a block diagram showing the internal construction of the gaming machine shown in FIG. 2.

FIG. 4 is a block diagram showing the internal construction of the gaming machine shown in FIG. 2.

A gaming board 50 includes: CPU (Central Processing Unit) 51, ROM 55 and boot ROM 52 which are interconnected to one another by an internal bus; a card slot 53S which accepts a memory card 53; an IC socket 54S which accepts GAL (Generic Array Logic) 54.

The memory card 53 is constituted of non-volatile memories such as Compact Flash (registered trademark) and stores a game program and a game system program. The game program contains a lottery program. The lottery program is a program for determining symbols (code Nos. corresponding to the symbols) on each of the reels 14 which are to be stop displayed on the winning line L. The lottery program contains one or more of symbol weighting determination data, each corresponding to respective plural kinds of payout rates (for example, 80%, 84% and 88%). The symbol weighting determination data is data showing a correspondence relationship between a code No. (see FIG. 3) of each symbol and one or plural random number values from a predetermined numerical value range (0 to 255), for each of the three reels 14. A payout rate is determined based on data for setting a payout rate outputted from the GAL 54, and the lottery is executed based on symbol weighting determination data corresponding to the payout rate.

The card slot 53S is configured so that the memory card 53 can be inserted therein or drawn out therefrom, and connected to a motherboard 40 through IDE bus. Therefore, a kind or contents of a game played in the gaming machine 10 can be changed by drawing out the memory card 53 from the card slot 53S, writing a different game program and game system program thereon, and inserting the memory card 53 into the card slot 53S thereafter. Moreover, a kind or contents of a game played in the gaming machine 10 can also be changed by changing a memory card 53 on which a game program and a game system program are stored to a different memory card 53 on which a different game program and game system program are stored. The game program comprises a program regarding game proceeding, a first program for generating the bonus game (first special game state), and a second program for making the transition to the return mode (generation of the second special game state). In addition, the second program for making the transition to the return mode comprises three second programs for making the transition to the return modes A to C in which the payout modes of the coins are different. When the transition to the return mode is made, the main CPU 41 selects one return mode from the return modes A to C and carries out the second program for making the transition to the selected return mode. In addition, the game program comprises image data, audio data or the like which is outputted in the course of the game.

GAL 54 is one kind of PLD having an OR fixed array structure. GAL 54 is equipped with a plurality of an input port and an output port and when a predetermined data is inputted to the input port, data corresponding to the input data is outputted from the output port. The data outputted from the output port is the above-mentioned data for setting a payout rate.

The IC socket 54S is configured such that GAL 54 can be mounted thereto or demounted therefrom, and connected to the motherboard 40 through PCI bus. Therefore, data for setting a payout rate outputted from GAL 54 can be changed by drawing out GAL 54 from the IC socket 54S, rewriting a program stored on GAL 54, mounting GAL 54 is to the IC socket 54S thereafter. Moreover, data for setting a payout rate can also be changed by changing GAL 54 to a different GAL 54.

CPU 51, ROM 55 and boot ROM 52 interconnected to each other by the internal bus are connected to the motherboard 40 by PCI bus. The PCI bus not only conducts signal transmission between the motherboard 40 and the gaming board 50, but also supplies electric power to the gaming board 50 from the motherboard 40. ROM 55 stores country identification information and an authentication program therein. Boot ROM 52 stores a preliminary authentication program, a program for CPU 51 to activate the preliminary authentication program (a boot code) and the like therein.

The authentication program is a program to authenticate a game program and a game system program (an alteration check program). The authentication program is stated along a procedure for confirmation and certification that the game program and the game system program that are objects of an authentication capture processing are not altered, that is, a procedure for conducting authentication of the game program and the game system program (an authentication procedure). The preliminary authentication program is a program for authenticating the above-mentioned authentication program. The preliminary authentication program is stated along a procedure for certification that an authentication program that is an object of an authentication processing is not altered, that is, a procedure for authenticating the authentication program (an authentication procedure).

The motherboard 40 is constructed with a general-purpose motherboard commercially available (a printed circuit board on which basic parts of a personal computer are mounted) and includes: a main CPU 41; ROM (Read Only Memory) 42; RAM (Random Access Memory) 43 and a communication interface 44. The main CPU 41 is the processing device of the present invention.

ROM 42 is constituted of a memory device such as a flash memory and stores thereon a program such as BIOS (Basic Input/Output System) executed by the main CPU 41 and permanent data. When BIOS is executed by the main CPU 41, not only is an initialization processing for predetermined peripheral devices conducted, but a capture processing for the game program and the game system program stored on the memory card 53 is also started via the gaming board 50. In the present invention, contents of ROM 42 may be rewritable or not rewritable.

RAM 43 stores data and a program used at the time of operation of the main CPU 41. RAM 43 can store the authentication program read through the gaming board 50 together with the game program and the game system program. RAM 43 is the storage device of the present invention.

RAM 43 is provided with a storage region for a return mode flag. The return mode flag is a flag to be referred to when a game state is to be selected whether it should be shifted to a return mode corresponding to the second special game state or not. The storage region of the return mode flag is constituted of a storage region with, for example, a predetermined number of bits and the return mode flag is turned "ON" or "OFF" according to storage contents in the storage region. If the return mode flag is set to the state "ON", the game state thereafter shifts to the return mode without fail. RAM 43 further stores data on the number of credits, the number of coin-in or coin-out for one game, and the like.

The communication interface 44 is used to communicate with the control device 200 through the communication line 101. The main CPU 41 transmits the number of coin-in and the number of coin-out together with the gaming machine identification number of the gaming machine 10 to the control device 200 each time a game is played. The number of games, an accumulative number of coin-in and an accumulative number of coin-out is made to be associated with each gaming machine identification number, and stored in the control device 200. When the number of games in the gaming machine 10 reaches a set value (600 in the present embodiment) in the control device 200, a return command signal is transmitted from the control device 200. When the main CPU 41 receives the return command signal through the communication interface 44, the return mode flag is set to the state "ON".

Both a body PCB (Printed Circuit Board) 60 and a door PCB 80 which will be described later are connected to the motherboard 40 by USB. A power supply unit 45 is also connected to the motherboard 40. When electric power is supplied from the power supply unit 45 to the motherboard 40, not only is the main CPU 41 of the motherboard 40 activated, but CPU 51 is also activated from electric power supplied through the PCI bus to the gaming board 50.

Equipment and devices which generate input signals to be inputted to the main CPU 41, and equipment and devices of which operations are controlled by a control signal outputted from the main CPU 41 are connected to the body PCB 60 and the door PCB 80. The main CPU 41 executes a game program and a game system program stored in RAM 43 based of an input signal inputted to the main CPU 41, and thereby performs a predetermined computational processing, stores results of thereof into RAM 43 and transmits a control signal to each equipment and device as a control processing for each of the equipment and devices.

A lamp 30, a sub CPU 61, a hopper 66, a coin detecting section 67, a graphic board 68, a speaker 29 as an output device, a touch panel 69, a note identifier 22, a ticket printer 35, a card reader 36, a key switch 38S and a data display 37 are connected to the body PCB 60. The lamp 30 is lit up in a predetermined pattern based on a control signal outputted from the main CPU 41.

The sub CPU 61 controls the rotation and stopping of the reels 14 (14L, 14C and 14R). A motor driving circuit 62 equipped with FPGA (Field Programmable Gate array) 63 and a driver 64 is connected to the sub CPU 61. FPGA 63 is an electronic circuit such as LSI capable of programming and works as a control circuit of a stepping motor 70. The driver 64 works as an amplifier circuit of a pulse to be inputted to the stepping motor 70. The stepping motors 70 (70L, 70C and 70R) which rotate each of the reels 14, are connected to the motor driving circuit 62. The stepping motor 70 is a 1-2 phase excitation type stepping motor.

In the present invention, an exciting type of the stepping motor is not particularly limited, and for example, a motor of a 2 or 1 phase excitation type can be adopted. A DC motor may be adopted instead of a stepping motor. When a DC motor is adopted, a deviation counter, a D/A converter and a servo amplifier are sequentially connected to the sub CPU 61 in this order and the DC motor is connected to the servo amplifier. A rotational position of the DC motor is detected by a rotary encoder and a current rotational position of the DC motor is supplied as data from the rotary encoder to the deviation counter.

An index detecting circuit 65 and a position change detecting circuit 71 are connected to the sub CPU 61. The index detecting circuit 65 is used for detecting positions (indexes described later) of the rotating reels 14 and can also detect an out-of-order state of the reels 14. As for the control of the rotating and stopping of the reels 14, detailed description will be given later by making reference to the figures.

The position change detecting circuit 71 detects a change of stoppage positions of the reels 14 after the stopping of the rotating of the reels 14. The position change detecting circuit 71 detects the change of stoppage positions of the reels 14, for example, in a case where the stoppage position is changed by force by a player as if the combination of symbols was in a wining state, despite the fact that the combination of symbols is not actually in a wining state, and of the like cases. The position change detecting circuit 71 is configured to be capable of detecting the change of stoppage position of the reel 14 by, for example, detecting fins (not shown in the figure) attached with a predetermined space on the inner side of the reel 14.

The hopper 66 is installed in the cabinet 11 and pays out a predetermined number of coins from a coin payout exit 19 to a coin tray 18 based on a control signal outputted from the main CPU 41. A coin detecting section 67 is installed inside the coin payout exit 19 and when detecting that a predetermined number of coins has been paid out from the coin payout exit 19, outputs an input signal to the main CPU 41.

The graphic board 68 controls, based on a control signal outputted from the main CPU 41, image displays on the upper image display panel 33 and the lower image display panel 16 as an output device. The number of credits stored in RAM 43 is displayed on the number-of-credits display section 31 of the lower image display panel 16. The number of coin-out is displayed on the number-of-payouts display section 31 of the lower image display panel 16.

The graphic board 68 is equipped with VDP (Video Display Processor) which generates image data based on a control signal outputted from the main CPU 41 and a video RAM which temporarily stores image data generated by VDP, and of the like equipments. Note that image data used in generating image data with VDP is read from the memory card 53 and contained in a game program stored in RAM 43.

The note identifier 22 not only discriminates a true note from a false note, but also accepts the true note into the cabinet 11. The note identifier 22, when accepting a true note, outputs an input signal to the main CPU 41 based on a face amount of the note. The main CPU 41 stores the number of credits corresponding to the amount of the note transmitted with the input signal.

The ticket printer 35, based on a control signal outputted from the main CPU 41, prints on a ticket a bar code obtained by encoding data such as the number of credits, date and time, the identification number of the gaming machine 10, and of the like data stored in RAM 43, and outputs the ticket 39 with a bar code.

The card reader 36 transmits to the main CPU 41 data read from the smart card and writes data onto the smart card based on a control signal from the main CPU 41. The key switch 38S is provided on the keypad 38, and when the keypad 38 is operated by a player, outputs a predetermined input signal to the main CPU 41. The data display 37 displays, based on a control signal outputted from the main CPU 41, data read by the card reader 36 and data inputted by a player through the keypad 38.

The control panel 20, a reverter 21S, a coin counter 21C and a cold cathode tube 81 are connected to the door PCB 80. The control panel 20 is provided with a spin switch 23S corresponding to the spin button 23, a change switch 24S corresponding to the change button 24, a CASHOUT switch 25S corresponding to the CASHOUT button 25, a 1-BET switch 26S corresponding to the 1-BET button 26, and a maximum BET switch 27S corresponding to the maximum BET button 27. When the buttons 23 to 27 are operated by a player, each of the switches 23S to 27S corresponding thereto outputs input signals to the main CPU 41.

The coin counter 21C is installed inside the coin receiving slot 21, and discriminates whether a coin inserted by a player into the coin receiving slot 21 is true or false. Coins other than the true ones are discharged from the coin payout exit 19. The coin counter 21C also outputs an input signal to the main CPU 41 when a true coin is detected.

The reverter 21S operates based on a control signal outputted from the main CPU 41 and distributes coins recognized by the coin counter 21C as true coins into a cash box (not shown in the figure) or the hopper 66, which are disposed in the gaming machine 10. In other words, when the hopper 66 is filled with coins, true coins are distributed into the cash box. On the other hand, when the hopper 66 is not filled with coins, true coins are distributed into the hopper 66. The cold cathode tube 81 works as a backlight installed on the back face sides of the lower image display panel 16 and the upper image display panel 33 and is lit up based on a control signal outputted from the main CPU 41.

Figures 5, 6, 7, 8:
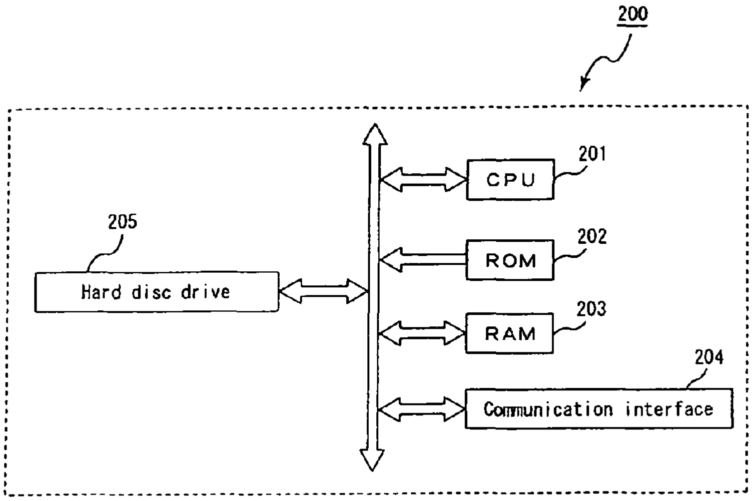
FIG. 5 is a block diagram showing the internal construction of a control device according to one embodiment of the present invention.
FIG. 6 is a figure schematically showing an example of correspondence table between a gaming machine identification number and a game history.
FIG. 7 is a figure schematically showing an example of correspondence table between a set value and the number of payouts.
FIG. 8 is a figure schematically showing another example of correspondence table between a set value and the number of payouts.

FIG. 5 is a block diagram showing the internal construction of a control device according to one embodiment of the present invention.

A control device 200 includes: CPU 201 as a processing device; ROM 202; RAM 203 as a temporary storage device; a communication interface 204; and a hard disc drive 205. The communication interface 204 is connected to the communication interface 44 of the gaming machine 10 through the communication line 101. ROM 202 stores a system program for controlling operations of the control device, a permanent data, and the like. RAM 203 temporarily stores data received from each of the gaming machines 10 and data such as results of the computational operation. Moreover, a game history of a gaming machine 10 is stored in the hard disc drive 205, by being associated with the gaming machine identification number of each of the gaming machines 10.

FIG. 6 is a figure schematically showing an example of correspondence table between a gaming machine identification number and a game history.

Each of the gaming machine identification numbers correspond to a game history based on the number of games, an accumulative number of coin-in, an accumulative number of coin-out, a payment balance in terms of the coins and a return rate of coin-out.

When CPU 201 receives the number of coin-in, the number of coin-out and the gaming machine identification number from the gaming machine 10 through the communication interface 204, a game history corresponding to the gaming machine identification number is updated. More specifically, 1 is added to the number of games, the number of coins inserted is added to the accumulative number of coin-in and the number of coins paid out is added to the accumulative number of coin-out. Furthermore, a payment balance in terms of the coins and a return rate are calculated based on the accumulative number of coin-in and the accumulative number of coin-out. When CPU 201 determines that the number of games updated has reached a set value, the return command signal containing the number of coin-out in the return mode as data is transmitted to that gaming machine 10.

FIG. 7 is a figure schematically showing an example of a correspondence table between the set value and the number of payout.

The number of payout "1000" in the return mode is set corresponding to the set value "600". Therefore, the 1000 coins are paid out in any one of the return modes A to C. In addition, the correspondence table shown in FIG. 7 is stored in the hard disk drive 205 as data.

According to the present invention, the number of payout in the return mode is not necessarily constant as long as the payout mode of the game media in the plural kinds of the return modes in which the payout modes are different is the same. For example, the number of payout may be varied with the game history and the like.

FIG. 8 is a figure schematically showing another example of correspondence table between a set value and the number of payouts.

At a set value "600", "(− payment balance)×50% (provided that the number of coin-out=1000 if a payment balance≧0)" is set as the number of coin-out in the return mode. Hence, if a payment balance is "−2000" when the number of games reaches 600, the number of coin-out is 1000, and if a payment balance is "−4000", the number of coin-out is 2000.

Next, description will be given of a processing performed in the gaming machine 10.

Figure 9:
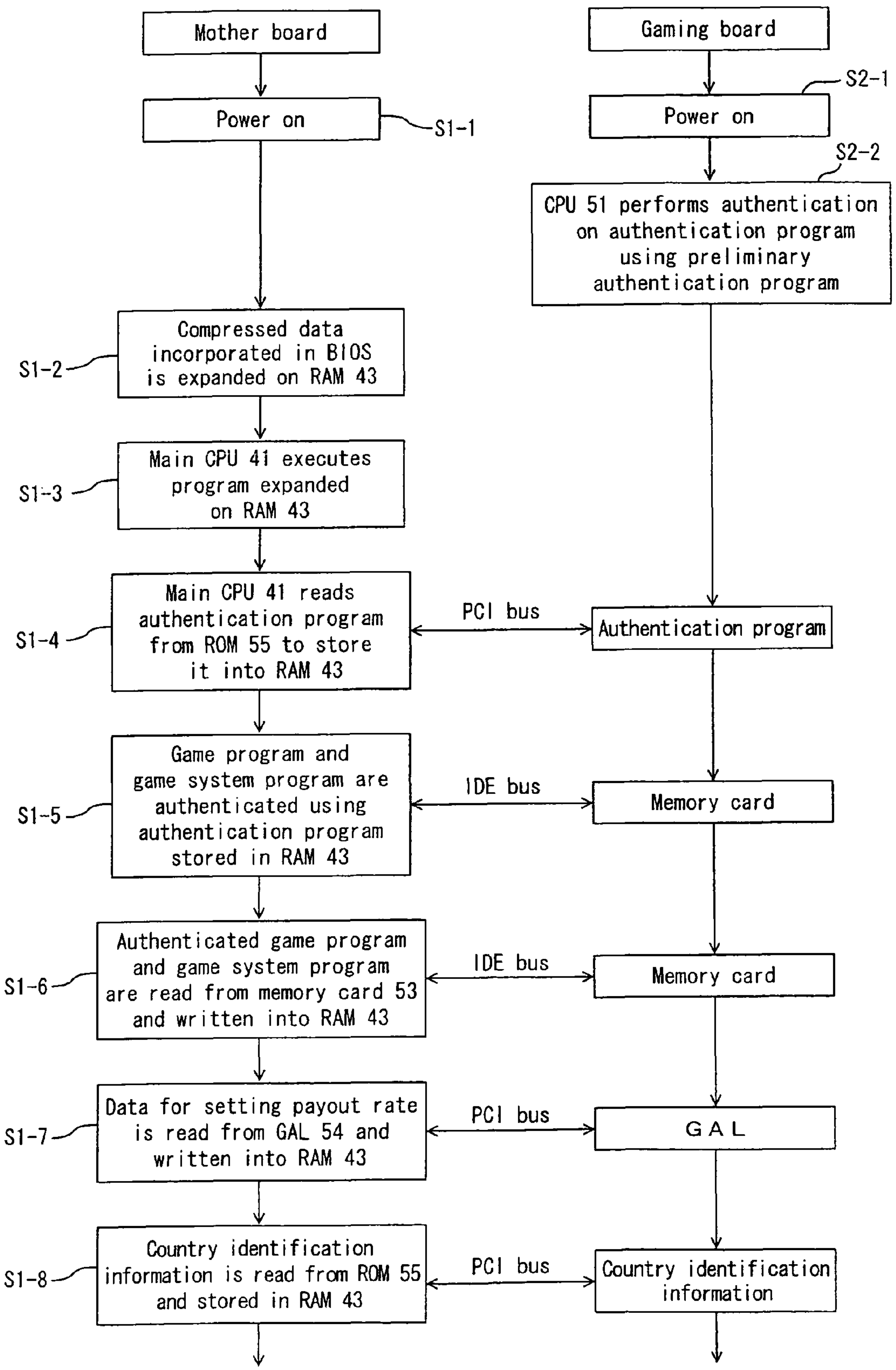
FIG. 9 is a flowchart showing a procedure in an authentication reading processing for a game program and a game system program executed by a motherboard and a gaming board shown in FIG. 4.

FIG. 9 is a flowchart showing a procedure in an authentication reading processing for a game program and a game system program executed by a motherboard and a gaming board shown in FIG. 4. Note that the memory card 53 is inserted into the card slot 53S on the gaming board 50 and GAL 54 is mounted to the IC socket 54S.

When a power supply switch is turned on in the power supply unit 45, the motherboard 40 and the gaming board 50 are activated (steps S1-1 and S2-1). When the motherboard 40 and the gaming board 50 are activated, separate processing are performed at the same time. That is, in the gaming board 50, CPU 51 reads a preliminary authentication program stored in the boot ROM 52 and performs the preliminary authentication which in advance, prior to capturing the authentication program into the motherboard 40, confirms or certificates that the program is not altered according to the read preliminary authentication program (step S2-2). On the other hand, in the motherboard 40, the main CPU 41 executes BIOS stored in ROM 42 to expand on RAM 43 compressed data incorporated in BIOS (step S1-2). Then, the main CPU 41 executes BIOS expanded on RAM 43 to perform diagnosis on and initialization of various kinds of the peripheral devices (step S1-3).

Then, since ROM 55 on the gaming board 50 is connected to the main CPU 41 through PCI bus, the main CPU 41 not only performs reading of the authentication program stored in ROM 55, but also stores the read authentication program into RAM 43 (step S1-4). On this occasion, the main CPU 41 takes a checksum according to ADDSUM method (a standard check function) with the help of the function of a standard BIOS of BIOS, and by performing a confirmation processing for whether or not storage is conducted without error, stores the authentication program into RAM 43.

Then, after confirming what is connected to the IDE bus, the main CPU 41 accesses the memory card 53 inserted into the card slot 53S through the IDE bus, and conducts reading of the game program and the game system program from the memory card 53. In this case, the main CPU 41 reads 4 bites at a time of data constituting the game program and the game system program. Next, the main CPU 41 authenticates by confirming and certifying according to the authentication program stored in RAM 43, that the read game program and game system program has not been altered (step S1-5). When the authentication processing is normally completed, the main CPU 41 writes and stores in RAM 43 the game program and the game system program that have been an object of authentication (have been authenticated) (steps S1 to S6). Then, main CPU 41 accesses through the PCI bus to GAL 54 mounted to the IC socket 54S, reads data for setting a payout rate from GAL 54 and writes and stores the data in RAM 43 (step S1-7). Then, the main CPU 41 not only reads through the PCI bus country identification information stored in ROM 55 on the gaming board 50, but also stores the read country identification information into RAM 43 (step S1-8).

After the processing is over, the main CPU 41 sequentially reads and executes the game program and the game system program to such that a game is progressed.

After the processing shown in FIG. 9 is over, the main CPU 41 performs a game mode selection processing.

Figure 10:
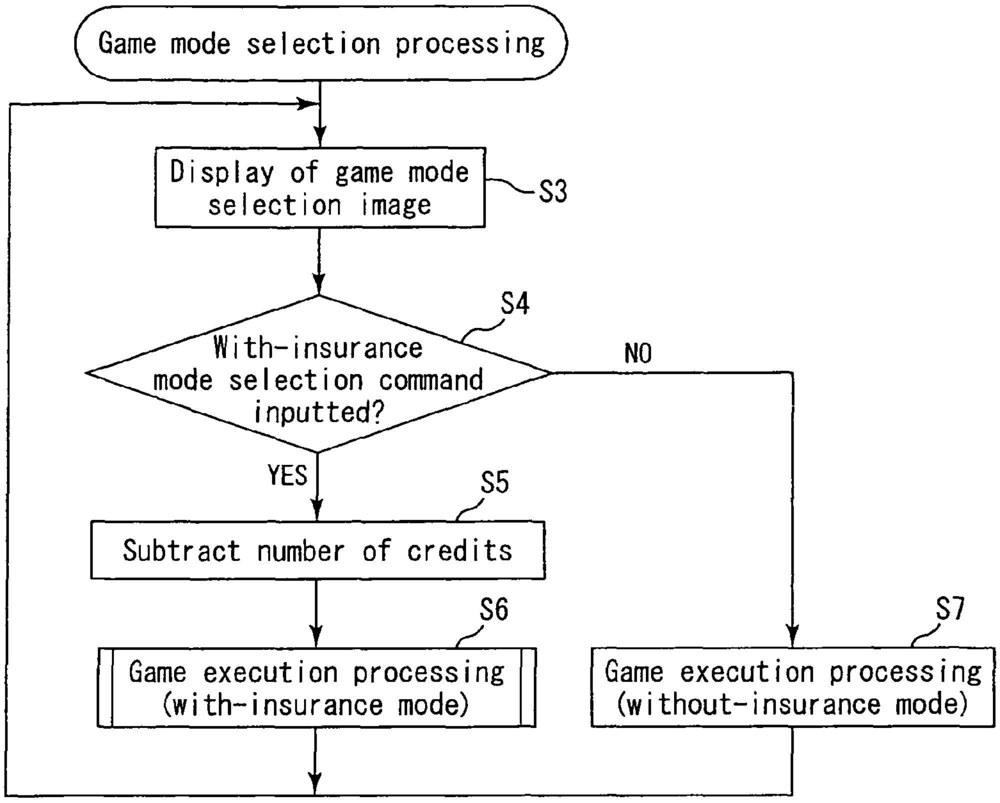
FIG. 10 is a flowchart showing a subroutine of a game mode selection processing.

FIG. 10 is a flowchart showing a subroutine of a game mode selection processing.

The main CPU 41 conducts a processing for adding credits stored in RAM 43 as an interrupt processing when it receives a detection signal outputted from the coin counter 21C in a case where the coin counter 21C detects a coin inserted into the coin receiving slot 21 while executing the subroutine.

Figure 11A:
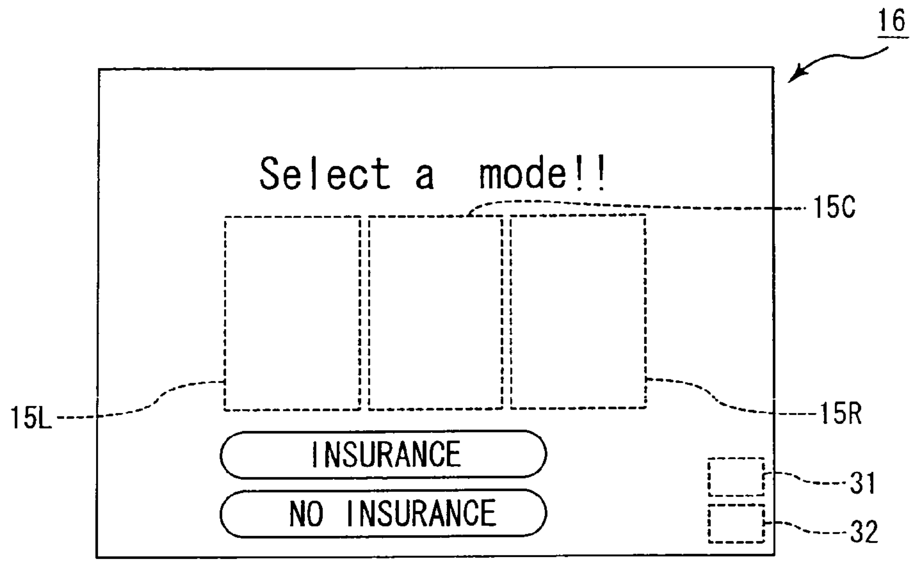
FIGS. 11A and 11B are figures showing an image displayed on the lower image display panel when a game mode selection processing is executed.
Figure 11B:
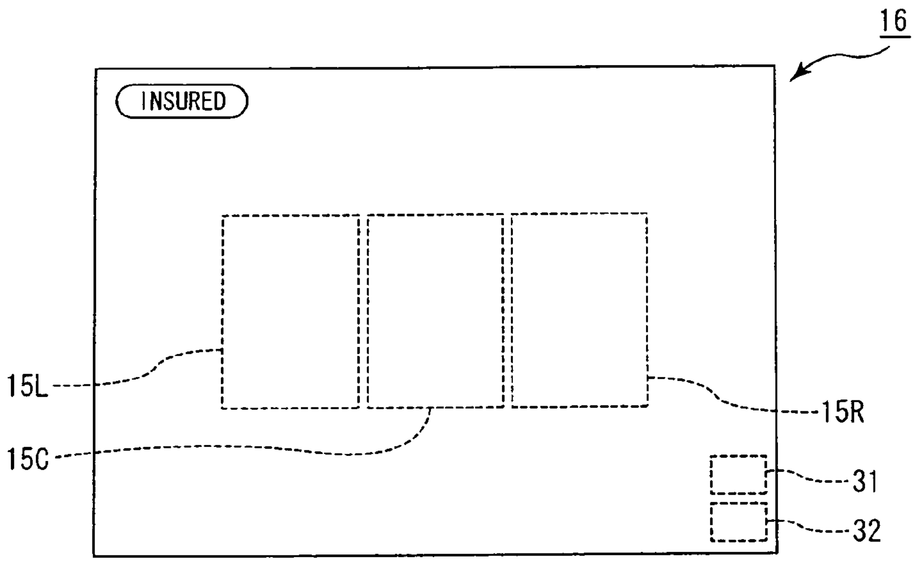

FIGS. 11A and 11B are figures showing an image displayed on the lower image display panel when a game mode selection processing is executed.

To begin with, the main CPU 41 conducts a processing to display on the lower image display panel 16 an image for requesting to the player selection of a game mode (step S3). In this processing, the main CPU 41 transmits a depiction command for the game mode selection image to the graphic board 68. On the graphic board, VDP extracts image data from RAM 43 and expands the data on the video RAM to produce image data for one frame and to output the image data to the lower image display panel 16, based on the depiction command. As a result, for example, an image as shown in FIG. 11A is displayed on the lower side display panel 16.

FIG. 11A is a figure showing an example of game mode selection image displayed on the lower image display panel. In the figure, numerical reference 15 (15L, 15C and 15R) indicates display windows. An image showing "Select a mode!!" is displayed in the upper portion of the lower image display panel 16. The image is an image for requesting a player to select a game mode. Moreover, images showing "INSURANCE" and "NO INSURANCE" are displayed in the lower portion of the lower image display panel 16. The images are images indicating game mode options and the player touches a predetermined site of the touch panel 69 corresponding to a display region of the image, and is thereby enabled to input a command for selecting a game mode.

The option "INSURANCE" corresponds to the with-insurance mode. A predetermined number of credits (for example, number of credits equivalent to 1 dollar) is required for selecting the with-insurance mode. As an alternative of the number of credits, a note or a coin equivalent to the number of credits may be directly inserted. In a case where the with-insurance mode has been selected, when the number of games reaches a set value (for example, 600) without a bonus game being generated, the return mode flag is set to the state "ON" and a game state shifts to the return mode. In the payout return mode, the player can receive the predetermined number of payout of coins. In other words, in the with-insurance mode, a game can be played in a state where an insurance is carried for compensating all or part of a loss arising in a case where no bonus game has arisen for a long time. On the other hand, an option "NO INSURANCE" corresponds to the without-insurance mode. In a case where the without-insurance mode has been selected, the return mode flag is not set to the state of "ON" and a game state does not shift to the payout return mode even if no bonus game has arisen for a long time after the without-insurance mode is selected.

After the processing in step S3, the main CPU 41 determines whether the with-insurance mode has been selected or not (step S4). In a case where it is determined that the with-insurance mode has been selected, the main CPU conducts a processing for subtracting a predetermined number of credit from the number of credits stored in RAM 43 (step S5). Thereafter, the game execution processing in the with-insurance mode is conducted (step S6).

While detailed description of the above-mentioned processing will be given later by making reference to FIG. 12, when played in the with-insurance mode, an image showing "INSURED" is displayed in the upper left of the lower image display panel 16, as shown in FIG. 11B. The image is an image showing that a game mode is in the with-insurance mode.

On the other hand, in the case where, in step S4, it is determined that the without-insurance mode has been selected, the main CPU 41 conducts the game execution processing in the without-insurance mode (step S7). Since this processing is a processing almost the same as the game execution processing in the with-insurance mode (see FIG. 12) except that neither a processing related to transition to the return mode nor a processing related to counting of the number of games is conducted, description thereof is omitted here. When the processing in step S6 or S7 has been executed, the process is returned to step S3 thereafter.

Figure 12:
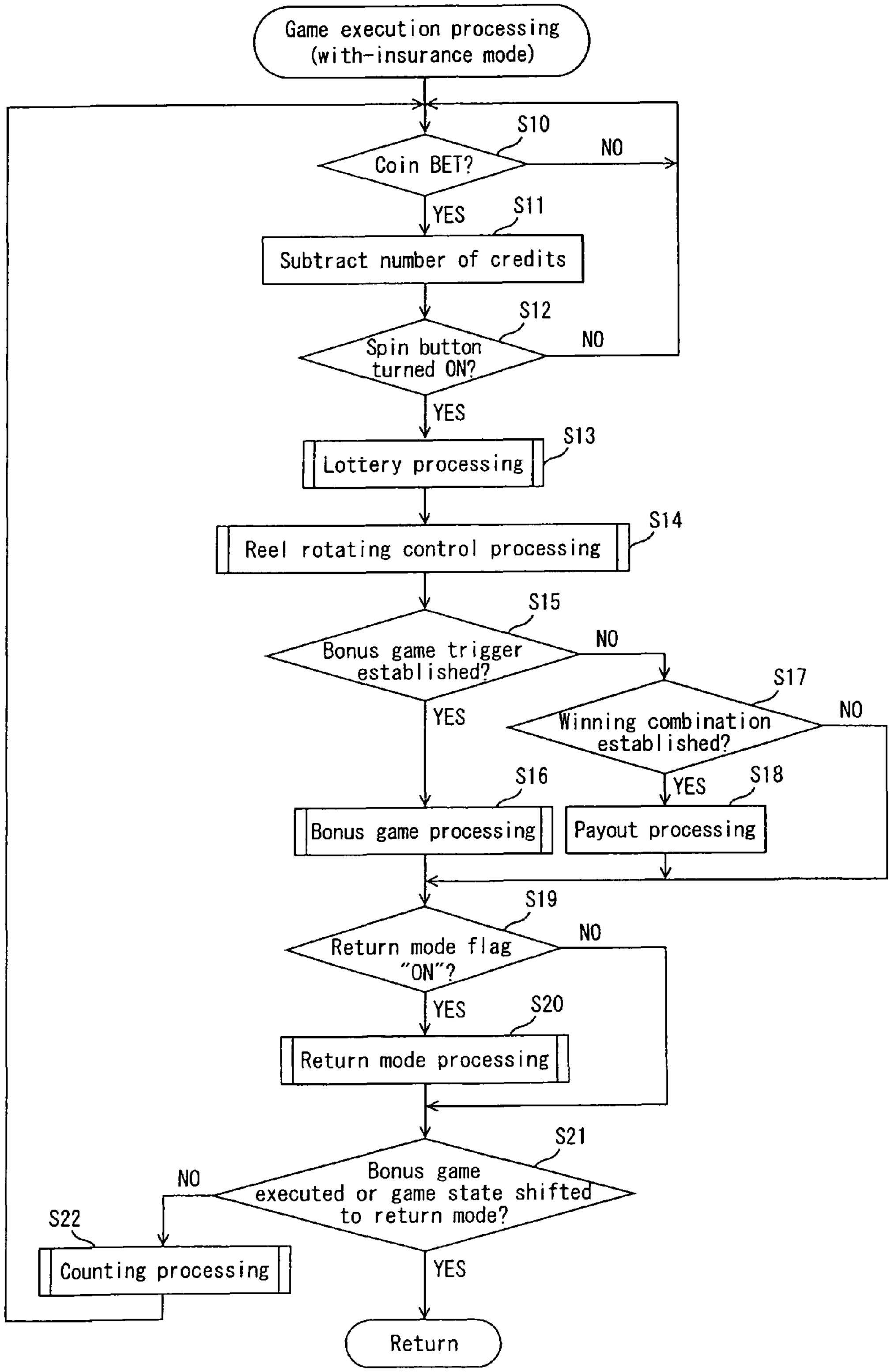
FIG. 12 is a flowchart showing a subroutine of a game execution processing.

FIG. 12 is a flowchart showing a subroutine of a game execution processing in the with-insurance mode that is called and executed in step S6 of the subroutine shown in FIG. 10.

In the game execution processing, the main CPU 41 at first determines whether or not a coin is BET (step S10). In the processing, the main CPU 41 determines whether an input signal outputted from the 1-BET switch 26S or the maximum BET switch 27S has been received or not when the 1-BET button 26 or the maximum BET button 27 is operated, respectively. If it is determined that a coin has not been BET, the process returns to step S10.

On the other hand, if it is determined in step S10 that a coin is BET, the main CPU 41 conducts a processing for subtracting the number of credits stored in RAM 43 according to the number of BET coins (step S11). In a case where the number of BET coins is more than the number of credits stored in RAM 43, the process returns to step S10 without conducting subtraction on the number of credits stored in RAM 43. In a case where the number of BET coins exceeds the upper limit (50 coins in the present embodiment) up to which a BET is possible in one game, the process advances to step S12 without conducting a processing for subtracting the number of BET coins from the number of credits stored in RAM 43.

Then, the main CPU 41 determines whether the spin button 23 has been turned ON or not (step S12). In the processing, the main CPU 41*d* determines, when the spin button 23 is pressed, whether an input signal outputted from the spin switch 23S has been received or not.

If it is determined that the spin button 23 has not been turned ON, the process returns to step S10. Note that in a case where the spin button has not been turned ON (for example, in a case where a command of terminating a game has been inputted without turning ON the spin button), the main CPU 41 cancels a result of the subtracting processing in step S11.

In the present embodiment, description will be given of a case in which: after a coin is BET (step S10), a processing for conducting subtraction on the number of credits (step S11) is conducted prior to the determination on whether the spin button has been turned ON or not (step S12). However, the present invention is not limited to this example. For example, a processing for subtraction on the number of credits (step S11) may be conducted after a coin is BET (step S10), determined whether the spin button 23 has been turned ON or not (step S12), and when determined that the spin button 23 has been turned ON (YES in step S12).

Meanwhile, in step S12 of FIG. 12, if it is determined that the spin button 23 has been turned ON therein, the main CPU 41 conducts a lottery processing (step S13). In the lottery processing, the main CPU 41 (processing device) executes a lottery program stored in RAM 43 (storage device) to thereby determine a code No. of the stopped reels 14. Thus, a combination of symbols stop displayed is determined. Detailed description of the processing will be given later by making reference to FIGS. 13 and 14. When the processing in step S13 is executed, the main CPU 41 works as winning combination determination means for determining a winning combination by a lottery. In the present embodiment, description will be given of a case where a combination of symbols stop displayed is determined, and one winning combination of plural winning combinations is determined thereafter. However, in the present invention, one winning combination selected from plural winning combinations may at first be determined by a lottery, and the combination of symbols to be stop displayed may be determined thereafter, based on the determined winning combination.

Then, the main CPU 41 conducts a reel rotating control processing (step S14). The processing is a processing which, after all of the reels 14 starts to rotate, stops the rotating of each of the reels 14 such that a combination of symbol sequences corresponding to the winning combination determined in step S13 is stop displayed on the winning line L. Detailed description of the processing will be given later by making reference to FIGS. 15 to 17.

Then, the main CPU 41 determines whether a bonus game trigger has been established or not, that is whether "APPLE" is stop displayed in the display window 15 or not (step S15) If it is determined that the bonus game trigger has been established, the main CPU 41 (processing device) reads a program for conducting a bonus game from RAM 43 (storage device) to execute a bonus game processing (step S16). Here, the first special game state is generated. Detailed description of the bonus game processing will be given later by making reference to FIG. 18. When the processing in step S16 is executed, the main CPU 41 functions as means for generating the first special game state.

On the other hand, if it is determined that the bonus game trigger has not been established, the main CPU 41 determines whether a winning combination has been established or not (step S17). If it is determined that a winning combination has been established, the main CPU 41 conducts payout of a coin corresponding to the number of coin-in and the winning combination (step S18).

In a case where coins are reserved, the main CPU 41 conducts a processing to add the coins to the number of credits stored in RAM 43. On the other hand, in a case where payout of a coin is conducted, the main CPU 41 transmits a control signal to the hopper 66 and conducts payout of a predetermined number of coins. In that situation, the coin detecting section 67 counts the number of coins paid out from the hopper 66 and when the number of counts reaches a designated number, transmits a payout completion signal to the main CPU 41. Thus, the main CPU 41 stops the driving of the hopper 66 to terminate the coin payout processing.

When the processing in step S16 or S18 is executed, or when it is determined that no winning combination has been established (that a winning combination has failed to be established) in step S17, the main CPU 41 determines whether the return mode flag stored in RAM 43 is set to the state "ON" (step S19) or not. If it is determined that the return mode flag has been set to the state "ON", the main CPU 41 (processing device) reads from RAM 43 (storage device) a program for shifting a game state to the return mode, executes the return mode processing, to thus shift a game state to the return mode (step S20). Here, the second special game state has been generated. Detailed description will be given of the payout return mode processing later using FIG. 19. The main CPU 41, when executing the processing in step S20, functions as means for generating the second special game state.

If the processing in step S20 has been executed, or if it is determined that the return mode flag has not been set to the state "ON" in step S19, the main CPU 41 determines whether the bonus game (step S16) has been executed or not or whether a game state has shifted to the return mode (step S20) or not (step S21).

If it is determined that a bonus game has not been executed, or that a game state has not shifted to the payout return mode, the main CPU 41 executes a counting processing (step S22).

The counting processing is a processing conducted between the gaming machine 10 and the control device 200. The number of coin-in and the number of coin-out for one game together with the gaming machine identification number are transmitted to the control device 200. In the control device 200, the number of games, an accumulative number of coin-in, an accumulative number of coin-out and the like are updated with respect to each gaming machine identification number. When the number of games reaches a set value, a return command signal showing the number of coin-out in the return mode is transmitted to the gaming machine 10 from the control device 200. The main CPU 41, when receiving the return command signal, sets the return mode flag to the state "ON". Detailed description of the counting processing will be given later by making reference to FIG. 25. After the processing in step S22 is executed, the main CPU 41 returns the process to the processing in step S10 and subsequently executes a game in the with-insurance mode.

On the other hand, when it is determined that a bonus game has been executed or a game state has shifted to the payout return mode, the present subroutine is completed and the process returns to the processing shown in FIG. 10. As a result, a player can once again select whether a game is to be played by the with-insurance mode or the without-insurance mode.

FIG. 13 is a flowchart showing a subroutine of a lottery processing called and executed in step S13 of the subroutine shown in FIG. 12. The processing is a processing conducted by executing a lottery program stored in RAM 43 with the main CPU 41. The main CPU 41 executes a random number generating program included in the lottery program, and a random number value from the numerical value range of 0 to 255 is selected thereby such that each of the selected random number values correspond to each of the three reels 14 (step S31). In the present embodiment, description will be given of a case where random numbers are generated on a program (a case where so-called software random numbers are used). In the present invention, however, a random number generator may be used, and random numbers may be extracted therefrom (so-called hardware random numbers may be used).

After the random number values are selected, the main CPU 41 (processing device) refers to symbol weighting determination data corresponding to payout rate setting data which is outputted from GAL 54 and stored in RAM 43, and determines, based on the selected three random number values, code Nos. (see FIG. 3) for each of the reels 14 (step S32). The code Nos. of the reels 14 correspond to code Nos. of the symbols stop displayed on the winning line L. The main CPU 41 determines code Nos. of the reels 14 to thereby determine a winning combination. For example, in a case where code Nos. of the reels 14 are determined "00", "00" and "00", it means that the main CPU 41 determined a winning combination as "JACKPOT". Based on the code Nos. determined for each of the reels, a reel rotating control processing which will be described later is conducted. On this occasion, the main CPU 41 functions as winning combination determination means.

Here, description of a winning combination in the present embodiment will be given.

FIG. 14 is a figure describing a relationship among winning combinations of plural kinds, establishment possibility of each winning combination and the number of coin-out in the present embodiment. The establishment possibilities of each of the winning combinations shown in FIG. 14 are of a case where a payout rate is set to 88% in a game other than a bonus game. The establishment possibilities shown in the figure show possibilities of the establishment of each of the shown winning combinations in such a case that code Nos. of each of the reels 14 are determined based on the selected three random number values by referring to a symbol weighting determination data. In other words, the random number values are not made to correspond to each of the winning combinations.

An establishment possibility of a bonus game trigger is 0.5%. If a player hits the bonus game trigger, three "APPLE" symbols are stop displayed on the winning line L and a bonus game is generated. In the bonus game, executed is a free game of which the number of games is determined by a lottery.

An establishment possibility of "JACKPOT 7" is 0.5%. If the winning combination has been established, three "JACKPOT 7" symbols are stop displayed on the winning line L, and 30 coins per one coin-in are paid out. The lower the establishment possibility of the winning combination is, the higher the number of coin-out is set. When a combination of symbols stop displayed is not hitting any of the winning combinations shown in FIG. 14, this is a failure, and there is no coin-out.

Figure 15:
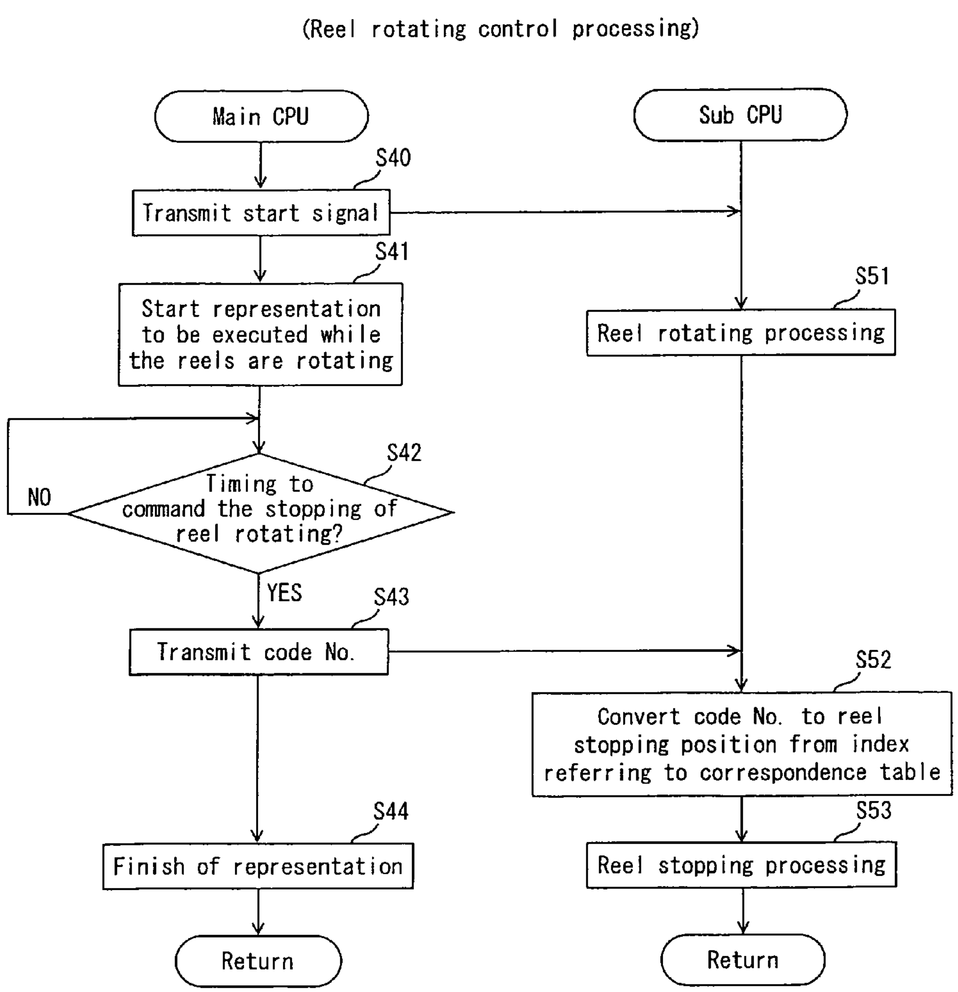
FIG. 15 is a flowchart showing a subroutine of a reel rotating control processing.

FIG. 15 is a flowchart showing a reel rotating control processing called and executed in step S15 of the subroutine shown in FIG. 12. This processing is a processing conducted between the main CPU 41 and the sub CPU 61.

The main CPU 41 transmits to the sub CPU 61 a start signal that starts the rotating of reels (step S40). The sub CPU 61 conducts a reel rotating processing when it receives the start signal from the main CPU 41 (step S51). In the processing, the sub CPU 61 supplies a pulse to the motor driving circuit 62. The pulse outputted from the sub CPU 61 is amplified by the driver 64 and supplied to each of the stepping motors 70 (70L, 70C and 70R). As a result, the stepping motors 70 rotate, thereby making the reels 14 (14L, 14C and 14R) to rotate. A stepping motor 70 is a 1-2 phase excitation type stepping motor which has a step angle of 0.9 degree and requires the number of steps of 400 for one rotation. Hence, if 400 pulses are supplied to the stepping motor 70, the reels 14 rotate once.

When the reels 14 start to rotate, the sub CPU 61 supplies to the motor driving circuit 62 pulses at a lower frequency, and the pulse frequency is gradually raised. A rotational speed of the reels 14 is thereby increased. When a predetermined time elapses, the pulse frequency is controlled to be constant. As a result, the reels 14 rotate at a constant speed.

Here, description of a rotational operation of the reels 14 will be given, by using FIG. 14.

FIGS. 16A to 16D are side views for describing a rotating operation of a reel 14.

Figure 16A:
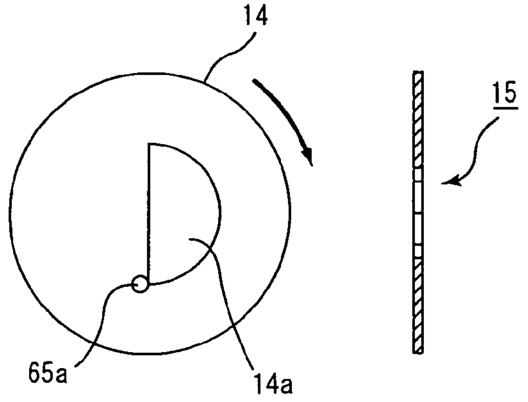
FIGS. 16A to 16D are side views for describing a rotating operation of the reel.

As shown in FIG. 16A, a semicircular metal plate 14*a* is attached to the side surface of a reel 14. The metal plate 14*a* rotates together with the reel 14. Twenty two symbols (see FIG. 3) are depicted on the circumferential surface of the reel 14. Three symbols of the twenty two symbols depicted on the circumferential surface of the reel 14 can be visually recognizable through the display window 15 formed in front of the reel 14. The arrow mark of a heavy line in the figure indicates a rotating direction of the reel 14. A proximity sensor 65*a* is provided on the side of the reel 14. The proximity sensor 65*a* is used to detect the metal plate 14*a*. The proximity sensor 65*a* does not rotate nor move even if the reel 14 rotates.

Figure 16B:
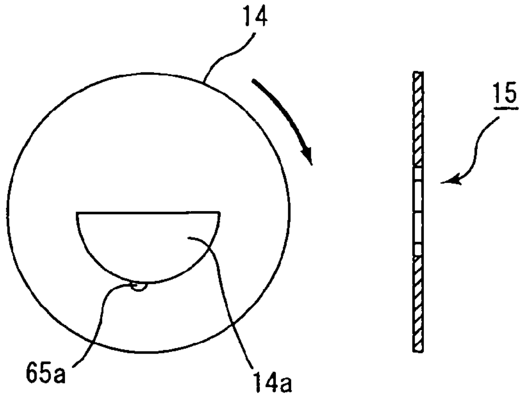
Figure 16C:
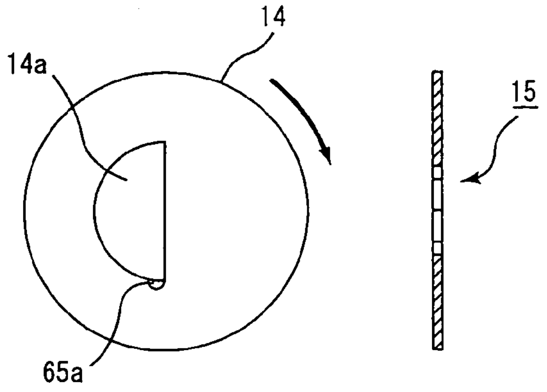

FIG. 16A shows a position of the meal plate 14*a* when the metal plate 14*a* starts being detected by the proximity sensor 65*a* (hereinafter also referred to as a position A). If the reel 14 rotates when the metal plate 14*a* is at the position A, the metal plate 14*a* moves to a position shown in FIG. 16B. FIG. 16B shows a position of the metal plate 14*a* when the metal plate 14*a* is being detected by the proximity sensor 65*a* (hereinafter also referred to as a position B). If the reel 14 rotates when the metal plate 14*a* is at the position B, the metal plate 14*a* moves to a position shown in FIG. 16C. FIG. 16C shows a position of the metal plate 14*a* when the metal plate 14*a* will no longer be detected by the proximity sensor 65*a* (hereinafter also referred to as a position C).

Figure 16D:
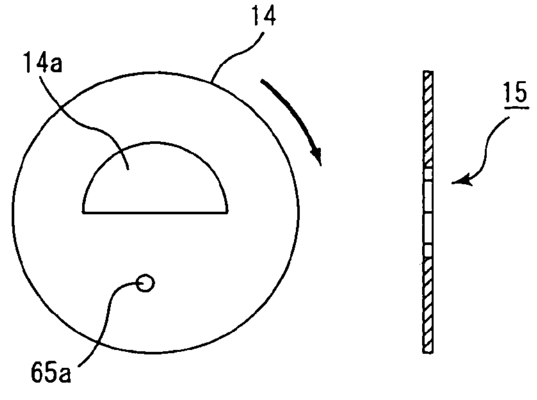

If the reel 14 rotates when the metal plate 14*a* is at the position C, the metal plate 14*a* moves to a position shown in FIG. 16D. FIG. 16D shows a position of the metal plate 14*a* when the metal plate 14*a* is not detected by the proximity sensor 65*a* (hereinafter also referred to as a position D). If the reel 14 further rotates, a position of the metal plate 14*a* returns to the position A. As described above, together with the rotating of the reel 14, the metal plate 14*a* changes its position in the order from the position A, to the position B, to the position C, to the position D, to the position A and so forth.

The proximity sensor 65*a* constitutes an index detecting circuit 65 (see FIG. 3). When it is referred to as "High" at a state where the proximity sensor 65*a* detects the metal plate 14*a*, and as "Low" at a state where the proximity sensor 65*a* does not detect the metal plate 14*a*, a state of the index detecting circuit 65 is "High" during the period when the metal plate 14*a* moves from the position A to the position B and to the position C, and a state of the index detecting circuit 65 is "Low" during the period when the metal plate 14*a* moves from the position C to the position D and to the position A. The sub CPU 61 assigns a rise from "Low" to "High" as an index (origin) 1 and a fall from "High" to "Low" as an index (origin) 2 to thereby recognize the rotating position of the reel 14.

The main CPU 40, after transmitting in step 40 a start signal to the sub CPU 61, executes representation to be executed while the reels are rotating (step S41). The process is a processing which conducts display of an image on the lower image display panel 16 and output of a sound from the speaker 29 over a period (for example, 3 seconds) determined according to a result and the like of the lottery processing (step S13 in FIG. 12).

Then, the main CPU 40 determines whether it is the timing at which a command is to be issued so as to stop the rotating of the reel 14, or not (step S42).

The timing at which a command is issued so as to stop rotation of a reel 14 is a timing before the time when the representation to be executed while the reels are rotating is completed, which is an interval having the minimum time necessary for stopping the rotating of the reel 14. Note that the minimum time necessary for stopping the rotating of the reel 14 is determined in advance.

If it is determined in step S42 that it is not the timing at which the command to stop the rotating of the reel 14 is to be issued, the process returns to the processing in step S42 and the representation to be executed while the reels are rotating continues to be conducted. On the other hand, if it is determined in step S42 that it is the timing at which the command to stop the rotating of the reel 14 is to be issued, the main CPU 41 transmits to the sub CPU 61 a code No. of the reel which is stored in RAM 43 (step S43). When the sub CPU 61 receives a code No. of the reel from the main CPU 41, the code No. is converted to a stopping position of the reel (the number of steps) from an index, based on a correspondence table between the number or steps and the code Nos. stored in ROM (not shown in the figure) included in the sub CPU 61 (step S52).

FIG. 17 is a schematic diagram showing a correspondence table between the number of steps and the code No. Each of the code Nos. is related to an index and the number of steps.

Each code No. corresponds to the symbols depicted on the circumferential surfaces of the reels 14 (see FIG. 3) and symbols of code Nos. "00" to "10" correspond to the index 1. Moreover, symbols of code Nos. "11" to "21" correspond to the index 2. The number of steps in the correspondence table shown in FIG. 17 is the number of steps with the index 1 as a reference. For example, if a code No. is "08", a stopping position of the reel is at 145 steps from the index 1. If a code No. is "12", a stopping position of the reel is at 218 steps from the index 1.

Then, the sub CPU 61 executes a reel stopping processing (step S53). In the processing, the sub CPU 61 detects a rise in the index detecting circuit 65 from "Low" to "High" (the index 1) on each of the reels 14, and supplies to the motor driving circuit 65 pulses corresponding to the number of steps which were converted in step S52 from a code No. at a timing at which the index 1 is detected, and supply of pulses is ceased thereafter.

For example, when, in step S52, the stopping positions of the reels are determined to be 145 steps from the index 1, the sub CPU 61 supplies 145 pulses to the motor driving circuit 65 at a timing at which the index 1 is detected, and the supply of pulses is completed thereafter. Furthermore, when, in step S52, the stopping positions of the reels are determined to be 218 steps from the index 1, the sub CPU 61 supplies 218 pulses to the motor driving circuit 65 at a timing at which the index 1 is detected. As a result, the reels 14 stop at the code No. determined in step 32 of FIG. 13 and the combination of symbols corresponding to the winning combination determined in step S32 of FIG. 13 is stop displayed on the winning line L. On the other hand, the main CPU 41 terminates the representation to be executed while the reels are rotating. After the processing in steps S44 and S53 are over, the present reel rotating control processing is completed.

Moreover, when an index corresponding to the code No. transmitted in step S43 is different from an index detected by the index detecting circuit 65 when the rotating of the reels 14 stop, this means that an out-of-order state occurred on the reels 14; therefore, the main CPU 41 conducts a processing for displaying an error message on the lower image display panel 16 to temporarily stop a game.

For example, in a case where, even though a processing for stopping the reel 14L was executed at the code No. 12 corresponding to the index 2, the index 1 is detected by the index detecting circuit 65 when the rotating of the reel 14L stops, the game is temporarily stopped.

Figure 18:
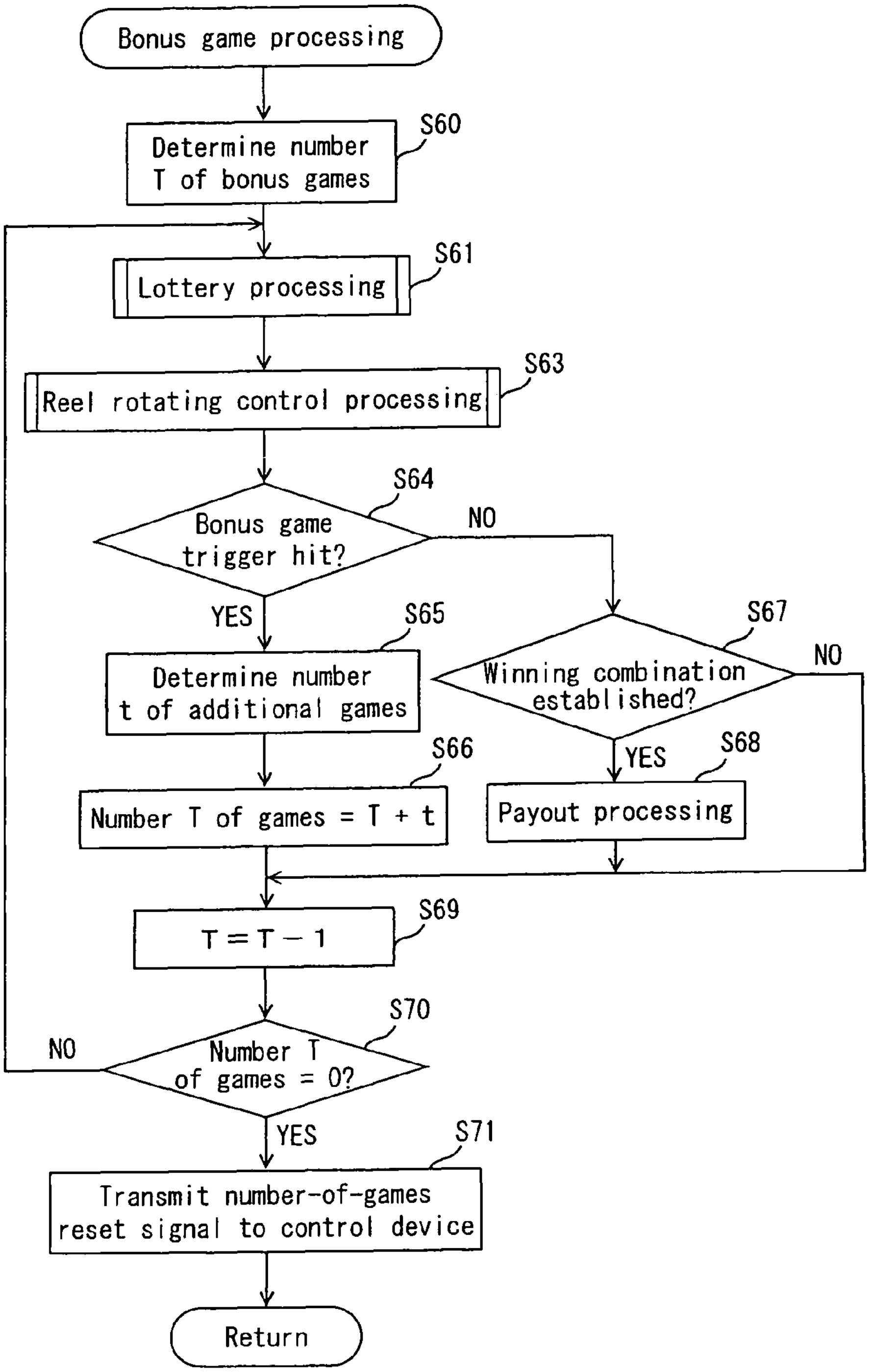
FIG. 18 is flowchart showing a subroutine of a bonus game processing.

FIG. 18 is a flowchart showing a subroutine of a bonus game processing called and executed in step S16 of the subroutine shown in FIG. 12. In the bonus game processing, firstly, the main CPU 41 determines a number T of bonus games from 10 to 25 games, based on a random number value obtained by executing a random number generation program included in a lottery program stored in RAM 43 (step S60). The main CPU 41 stores as data into RAM 43 the number of games of the determined bonus games.

Next, the main CPU 41 conducts a lottery processing (step S61) and a reel rotating control processing (step S63). The processing in step S61 is a processing almost the same as the processing described using FIG. 13. The processing in step S63 is a processing almost the same as the processing described using FIG. 15. Since descriptions of these processing have already been given, descriptions thereof are omitted herein.

Then, the main CPU 41 determines whether a bonus game trigger has been established or not, that is, whether three "APPLE" are stop displayed in the display windows 15 or not (step S64). If it is determined that the bonus game trigger has been established, the number t of additional games of the bonus game is determined in a lottery (step S65) and the determined number t of additional games is added to the number T of games of the bonus game (step S66). Thus, when a bonus game is hit during the bonus game, a remaining number of bonus games increases. More specifically, for example, in a case where a game state shifts to 20 bonus games for the first time, and hits 17 bonus games upon conducting 12 of the bonus games, another 25 bonus games (20 bonus games−12 bonus games+17 bonus games) are to be conducted.

If a bonus game trigger has not been established, the main CPU 41 determines whether a winning combination has been established or not (step S67). If it is determined that the winning combination has been established, the main CPU 41 conducts payout of coins corresponding to the number of coin-in and the winning combination (step S68). Since the processing is similar to the processing in step S18 and description thereof has already been given, the description of the present processing is omitted herein.

In a case where the processing in step S66 or S68 has been executed, or if it is determined in step S67 that any winning combination has not been established (if it is determined that a failure has occurred), the main CPU 41 reads the number T of bonus games stored in RAM 43, and one bonus game is subtracted from the read number T of bonus games. The number T of bonus games after the subtraction is again stored into RAM 43 (step S69).

Then, the main CPU 41 determines whether the number T of bonus games reaches the number of games determined in step S60 or not (step S70). More specifically, it is determined whether the number T of games stored in RAM 43 has become 0 or not, and if the number T of games is not 0, that is, if it is determined that the number of bonus games played does not reach the number of games which were determined in step S60, the process returns to step S61 and the above-mentioned processing is repeated. On the other hand, if the number T of games is 0, that is, if it is determined that the number T of games has reached the number of games which were determined in step S60, a number-of-games reset signal is transmitted to the control device 200 (step S71), and the present subroutine is completed thereafter. The number-of-games reset signal includes the gaming machine identification information of the gaming machine 10, and CPU 201 of the control device 200, when receiving the number-of-games reset signal, resets to 0 the number of games of which is stored in the hard disc drive 205 by being made to correspond to the gaming machine identification information included in the number-of-games reset signal.

Figures 19, 20:
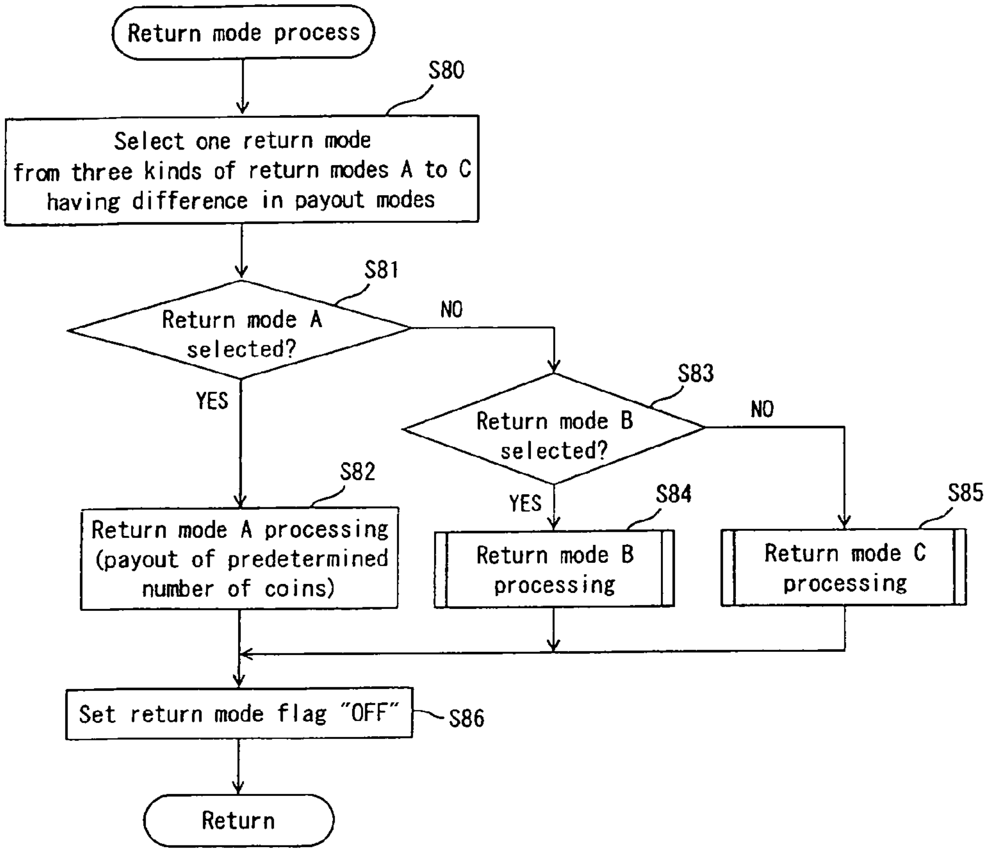
FIG. 19 is a flowchart showing a subroutine of a return mode processing.
FIG. 20 is a schematic view showing a correspondence table between a kind of the return mode and a payout mode.

FIG. 19 is a flowchart showing a subroutine of a return mode processing called and executed in step S20 of the subroutine shown in FIG. 12.

First, the main CPU 41 (processing device) selects one return mode from the three return modes A to C which have the different payout modes (step S80). In this process, the main CPU 41 selects the return mode based on a random number value provided by executing a random number generating program contained in the lottery program stored in the RAM 43. At this time, the main CPU 41 functions as means for selecting the payout mode of the coins in the return mode (second special game state) from plural kinds of the predetermined payout modes.

FIG. 20 is a schematic view showing a correspondence table between the kind of the return mode and the payout mode.

According to the payout mode in the return mode A, 1000 coins are paid out. According to the payout mode in the return mode B, the free game is played. In addition, the return mode B is continued until 1000 coins are paid out. According to the payout mode in the return mode C, the game is played in which the number of payout in response to the winning combination is increased. In addition, according to the return mode C, the return mode C is continued until the increased number of coins to be paid out reaches 1000.

Although it is described that the payout mode in the return mode is selected by the lottery in this embodiment, the method of selecting the payout mode in the return mode is not particularly limited in the present invention. The payout mode may be selected in a predetermined order or the payout mode may be selected according to the game circumstance or the game history, for example.

Next, the main CPU 41 determines whether or not the return mode A is selected (step S81). When it is determined that the return mode A is selected, the main CPU 41 (processing device) reads out the second program corresponding to the return mode A from the three second programs stored in the RAM 43 (storage device), and executes the second program to perform the return mode A processing (step S82).

In this processing, in a case where coins are reserved, the main CPU 41 conducts a processing for adding 1000 to the number of credits stored in RAM 43. On the other hand, in a case where the coins are to be paid out, the main CPU 41 transmits a control signal to the hopper 66 to conduct 1000 of coin-out. In the payout of coins, the coin detecting section 67 counts the number of coins paid out from the hopper 66 and when the number of counts reaches a designated number (1000), transmits a payout completion signal to the main CPU 41. The main CPU 41 thereby completes a return mode A processing.

Meanwhile, when it is determined that the return mode A is not selected in step S81, the main CPU 41 determines whether or not the return mode B is selected (step S83). When it is determined that the return mode B is selected, the main CPU 41 (processing device) reads out the second program corresponding to the return mode B from the three second programs stored in the RAM 43 (storage device), and executes the second program to perform the return mode B processing (step S84). In the return mode B processing, the free games are played until 1000 coins are paid out. This process will be described in detail below with reference to FIGS. 21 and 22.

Meanwhile, when it is determined that the return mode B is not selected in step S85, the main CPU 41 (processing device) reads out the second program corresponding to the return mode C from the three second programs stored in the RAM 43 (storage device), and executes the second program to perform the return mode C processing (step S85). In the return mode C processing, the games are performed in which the number of payout in response to the winning combination is increased. This process will be described in detail below with reference to FIGS. 23 and 24.

After step S82 (the return mode A processing), step S84 (the return mode B processing) or step S85 (the return mode C processing) is executed, the main CPU 41 sets the return mode flag to "OFF" (step S86) and completes this subroutine.

Figure 21:
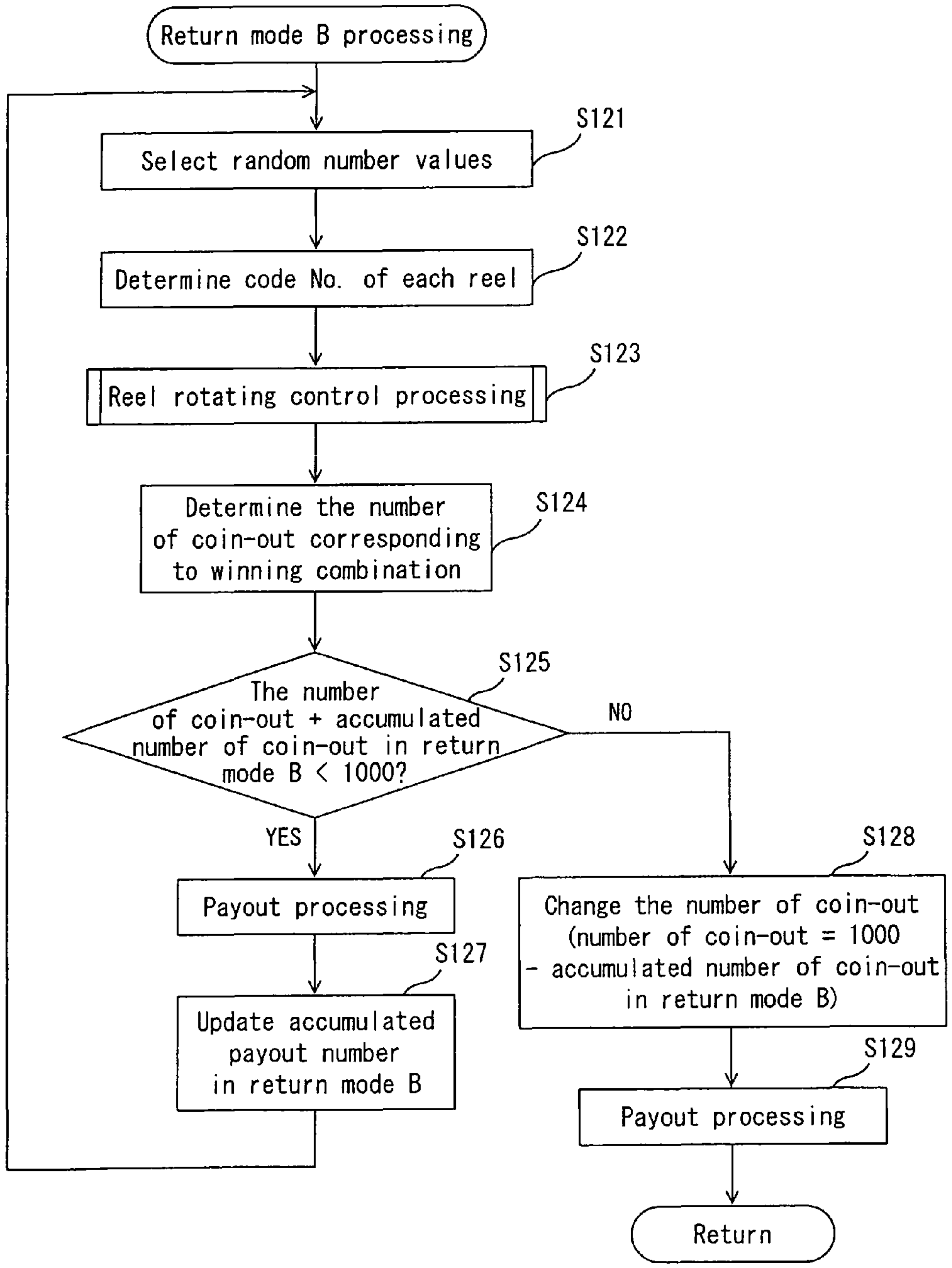
FIG. 21 is a flowchart showing a subroutine of a return mode B processing.

FIG. 21 is a flowchart showing a subroutine of the return mode B processing called and executed in step S84 of the subroutine shown in FIG. 19.

First, the main CPU 41 executes the random number generating program contained in the lottery program and selects the random number value corresponding to each of the three reels 14 from a numeric value range of 0 to 255 (step S121). Then, the main CPU 41 refers to the symbol weighting determination data corresponding to payout rate setting data (payout rate setting data for the return mode B) outputted from the GAL and stored in the RAM 43, and determines the code NO. (refer to FIG. 3) of each reel 14 based on the selected three random number values (step S122). Thus, the winning combination is determined in step S122.

Here, the winning combination in the return mode B will be described.

FIG. 22 is a figure describing a relationship among winning combinations of plural kinds, establishment possibility of each winning combination and the number of coin-out in the return mode B. In addition, the establishment possibilities shown in the drawing show possibilities which the winning combinations are established in a case where the code No. of each reel 14 is determined based on the three random number values referring to the symbol weighting determination data. That is, the random number values are not made to correspond to each winning combination.

The establishment possibility of a bonus game trigger is 0.8%. When a player hits the bonus game trigger in the return mode B, the three "APPLE" symbols are stop displayed on the winning line and the coins are paid out, but the bonus game is not generated.

The number of coins to be paid out in this case is the number provided by subtracting the accumulated number of payout in the return mode B from 1000. Therefore, in a case where 300 coins have been paid out in the return mode B already, when the bonus game trigger is established, 700 coins are to be paid out. According to other winning combinations, the lower the establishment possibility of the winning combination is, the higher the number of coin-out is set.

Next, the main CPU 41 performs a rotating control processing of the reel (step S123). Since this processing is the same as that in step S14 (refer to FIGS. 15 to 17) in the subroutine shown in FIG. 12, its description will be omitted.

Next, the main CPU 41 determines the number of payout (refer to FIG. 22) corresponding to the winning combination (step S124). Then, the main CPU 41 determines whether or not the sum of the accumulated number of coin-out in the return mode B stored in the RAM 43 and the number of payout determined in step S124 is less than 1000 (step S125).

When it is determined that the sum of the accumulative number of coin-in and the number of payout is less than 1000, the main CPU 41 performs the payout processing (step S126), and the number of coin-outs determined in step S124 is paid out. Then, the main CPU 41 updates the accumulated number of payout in the return mode B by adding the number of payout determined in step S124 to the accumulated number of payout in the return mode B stored in the RAM 43 and stores it in the RAM 43 (step S127). Then, the operation returns to step S121.

Meanwhile, when it is determined that the sum of the accumulated number of payout and the number of payout is not less than 1000, the main CPU 41 changes the number of payout (step S128). In this process, the main CPU 41 determines the value which is provided by subtracting the accumulative number of coin-out in the return mode B from 1000, as the number of payout. Then, the main CPU 41 performs the payout processing (step S129) and pays out the number of coin-outs determined in step S128. Then, this subroutine is completed.

Figure 23:
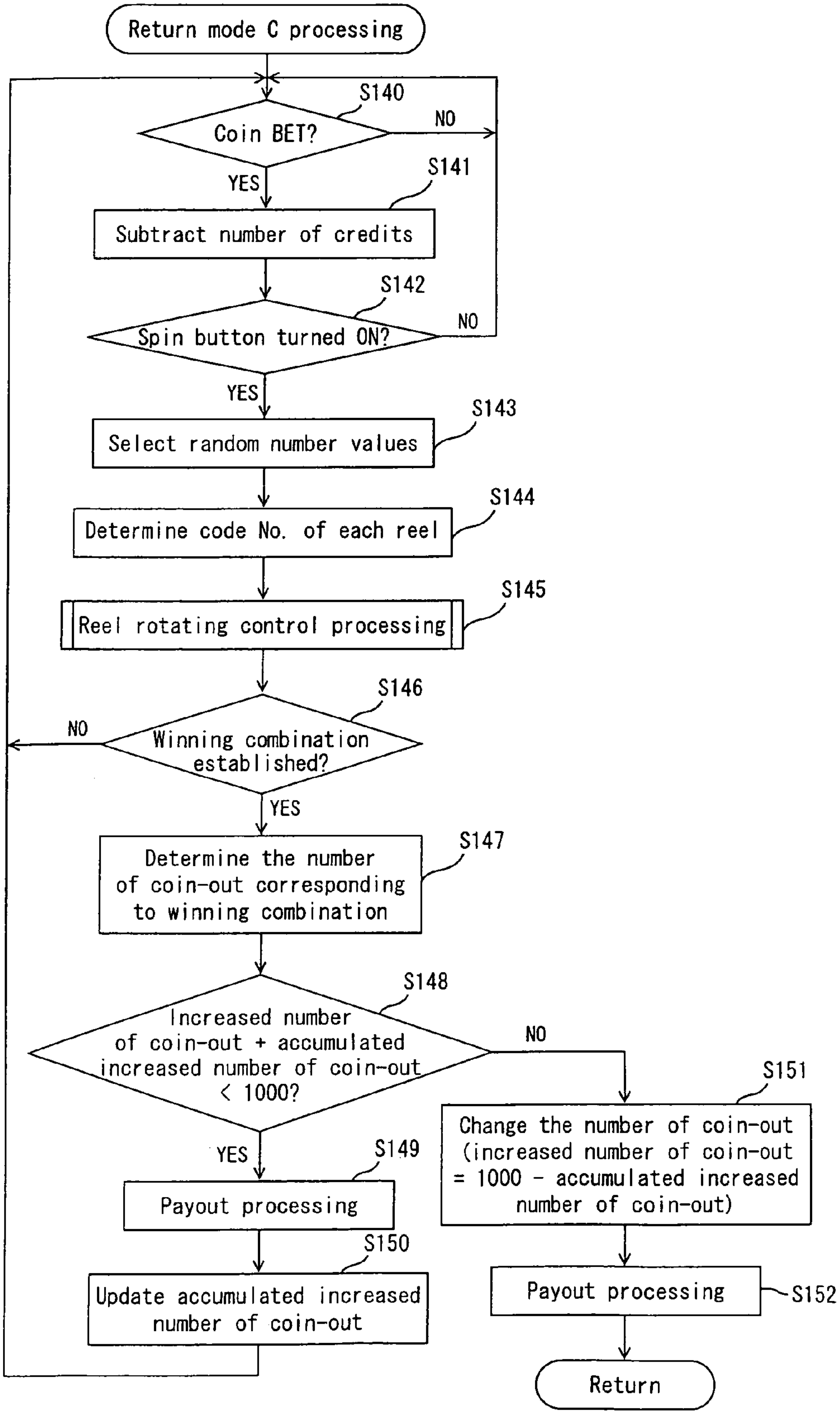
FIG. 23 is a flowchart showing a subroutine of a return mode C processing.

FIG. 23 is a flowchart showing a subroutine in the return mode C processing called and executed in step S85 in the subroutine shown in FIG. 19.

First, the main CPU 41 determines whether or not the coin is BET (step S140). When it is determined that the coin is not BET, the operation is returned to step S140. Meanwhile, when it is determined that the coin is BET, the main CPU 41 performs a processing subtracting the number of credit (step S141) and determines whether or not the spin button 23 is turned ON (step S142). When it is determined that the spin button 23 is not turned ON, the operation is returned to step S140. Meanwhile, when it is determined that the spin button 23 is turned ON, the operation proceeds to step S143. In addition, the processes in steps S140 to 142 are the same as the processes in steps S10 to S12 in the subroutine shown in FIG. 12.

In step S143, the main CPU 41 selects the random number value corresponding to each of the three reels 14 from the numeric value range of 0 to 255 by executing the random number generating program contained in the lottery program (step S143). Then, the main CPU 41 refers to the payout rate setting data outputted from the GAL and stored in the RAM 43 and determines the code NO. (refer to FIG. 3) of each reel 14 based on the three selected random number values (step S144). Thus, the winning combination is determined in step S144.

Here, the winning combination in the return mode C will be described.

FIG. 24 is a figure describing a relationship among winning combinations of plural kinds, establishment possibility of each winning combination and the number of coin-out in the return mode C. In addition, the establishment possibilities shown in the drawing show possibilities which the winning combinations are established in a case where the code No. of each reel 14 is determined based on the three random number values referring to the symbol weighting determination data. That is, the random number values are not made to correspond to each winning combination.

The number of payout related to each winning combination is the number of coin-out per one coin-in and comprises the normal number of payout and the increased number of payout. The normal number of payout is the same as the number of payout shown in FIG. 14. The increased number of payout is about a half of the number of payout shown in FIG. 14. Therefore, when a certain winning combination is established in the return mode C, the number of coins which is 1.5 times as many as the number of coins in the case where the winning combination is established in normal game is paid out.

In addition, when a player hits the bonus game trigger in the return mode C, the three "APPLE" symbols are stop displayed on the winning line and the coins are paid out, but the bonus game is not generated. As the number of coins to be paid out when the bonus game trigger is established, the normal number of payout is set to 0, and the number provided by subtracting the accumulated number of payout in the return mode C from 1000 is set as the increased number of payout. Therefore, in a case where the accumulative increased number of coin-out has reached 300 in the return mode C, when the bonus game trigger is established, 700 coins are to be paid out.

Next, the main CPU 41 performs the rotating control processing of the reel (step S145). Since this process is the same as that in step S14 (refer to FIGS. 15 to 17) in the subroutine shown in FIG. 12, its description will be omitted.

Next, the main CPU 41 determines whether or not the winning combination is established (step S146) and when it is determined that the winning combination is not established, the operation is returned to step S140. Meanwhile, when it is determined that the winning combination is established, the number (refer to FIG. 24) of coin-out corresponding to the number of coin-in and the winning combination is determined (step S147).

Then, the main CPU 41 determines whether or not the sum of the accumulated increased number of coin-out in the return mode C stored in the RAM 43 and the increased number of coin-out contained in the number of payout determined in step S147 is less than 1000 (step S148).

When it is determined that the sum of the accumulated increased number of payout and the increased number of payout is less than 1000, the main CPU 41 performs the payout processing (step S149), the number of coin-outs determined in step S147 is paid out. Then, the main CPU 41 updates the accumulated increased number of coin-out by adding the increased number of coin-out contained in the number of payout determined in step S147 to the accumulated increased number of payout in the return mode C stored in the RAM 43, and stores it in the RAM 43 (step S150). Then, the operation returns to step S140.

Meanwhile, when it is determined that the sum of the accumulated increased number of payout and the increased number of payout is not less than 1000 in step S148, the main CPU 41 changes the number of payout (step S151). In this process, the main CPU 41 changes the number of payout so that the value provided by subtracting the accumulated increased number of payout in the return mode C from 1000 becomes the increased number of payout. Then, the main CPU 41 performs the payout processing (step S152) and pays out the number of coin-outs determined in step S151. Then, this subroutine is completed.

FIG. 25 is a flowchart showing a counting processing called and executed in step S22 of the subroutine shown in FIG. 12.

The processing is a processing conducted between the main CPU 41 of a gaming machine 10 and CPU 201 of the control device 200.

To begin with, the main CPU 41 transmits by the communication interface 44 the number of coin-in and the number of coin-out stored in RAM 43 together with the gaming machine identification number to the control device 200 through the communication line 101 (step S90). The number of coin-in and the number of coin-out transmitted to the control device 200 from the gaming machine 10 are those of the game concerned.

The processing in step S90 is a processing in which the main CPU 41 (processing device) transmits the identification information of the gaming machine 10 stored in the main RAM 43 (storage device) to the control device 200 through the communication line 101, each time a game is played. When the processing in step S90 is executed, the main CPU 41 functions as means for transmitting the identification information of the gaming machine 10 to the control device 200 through the communication line 101.

On the other hand, the CPU 201 of the control device 200, when receiving from the gaming machine 10 the number of coin-in, the number of coin-out and the gaming machine identification number through the communication line 101 by the communication interface 204, updates the number of games, the accumulative number of coin-in and the accumulative number of coin-out corresponding to the received gaming machine identification number (step S100), by choosing the data, which are made to correspond to each of the gaming machine identification numbers, of the number of games, the accumulative number of coin-in, the accumulative number of coin-out stored in the hard disc drive 205 (see FIG. 6).

Then, CPU 201 determined whether the number of games after the updating has reached the set value or not (step S101). If it is determined that the number of games after the updating has not reached the set value, the subroutine is completed.

Meanwhile, when it is determined that the number of games after updated reaches the set value in step S101, the CPU 201 transmits the return command signal showing the number of payout by the interface circuit 204 to the gaming machine 10 in which the number of games has reached the set value, through the communication line 101 (step S103). Then, the CPU 201 resets the number of games stored in the hard disk drive 205 so as to be related to the gaming machine identification number of the gaming machine 10 to 0 (step S104).

When the main CPU 41 of the gaming machine 10 receives the return command signal transmitted from the control device 200 in step S103, it sets the return mode flag to "ON" (step S91). The processing in step S91 is a processing which receives the command signal transmitted from the control device 200 when the number of games accumulatively counted by the control device 200 based on the identification information of the gaming machine 10 reaches the set value. In step S91, the main CPU 41 functions as means for receiving the command signal transmitted from the control device 200. Then, the main CPU 41 stores the data showing the number of payout contained in the return command signal in the RAM 42 (step S92), and completes this processing.

In the present embodiment, description has been given of a case where a game state shifts to the return mode when the number of games reaches a set value (see FIG. 25). The present invention is, however, not limited to this example. For example, in a case where the number of inserted game media for a game played by the player is at the upper limit value that can be accepted in one game when the number of games reaches the set value, the second special game state may be generated (the game state shifts to the return mode). This is because in such a case, a player can be urged to insert game media up to the upper limit and a facility such as a casino and the like can increase a profit.

Moreover, in a case where the second special game state is generated when the number of inserted game media is at the upper limit value, the second special game state may be generated not when the number of games reaches the set value, but when the number of inserted game media is at the upper limit value for a game played by a player when the number of games in which insertion of game media is conducted to the upper limit value reaches a set value. This is because, in such a case, it can be prevented from a small number of game media to be inserted in a game, thereby leading to a fact that the second special game state is generated by the spending of only a small number of game media in total.

As described above, the gaming machine 10 according to this embodiment comprises the main CPU 41 (processing device) and the RAM 43 (storage device), and is connected to the control device 200 which accumulatively counts the number of games in for every gaming machine of a plurality of gaming machines 10 through the communication line 101. The main CPU 41 executes: a processing executing the lottery program stored in the RAM 43 to perform the processing determining one winning combination selected from plural kinds of the predetermined winning combinations (refer to FIG. 13); the processing reading from the RAM 43 a first program for generating the bonus game (the first special game state) when the determined winning combination is the special winning combination of "bonus game trigger", and executing the first program (refer to FIG. 18); the processing transmitting the identification information of the gaming machine 10 stored in the RAM 43 to the control device 200 through the communication line each time the game is played (step S90 in FIG. 25); the processing receiving the command signal transmitted from the control device when the number of games accumulatively counted by the control device 200 based on the identification information of the gaming machine reaches the set value (step S91 in FIG. 25); the processing reading from the RAM 43 a second program for making transition to the return mode, and executing the second program (generation of the second special game state) based on the command signal (refer to FIG. 19); and the processing selecting the second program for reading from the RAM 43 and executing, from the three kinds of second programs in which the payout modes of the coin are different (in step S80 in FIG. 19).

In addition, the gaming machine 10 is connected to the control device 200 which accumulatively counts the number of games in for every gaming machine 10 of a plurality of gaming machines 10 through the communication line 101, and comprises the winning combination determination means (the main CPU 41, for example) for determining the winning combination by the lottery, the means (the main CPU 41, for example) for generating the bonus game (the first special game state) when the determined winning combination is the special winning combination of the "bonus game trigger", the means (the main CPU 41, for example) for transmitting the identification information of the gaming machine 10 to the control device 200 through the communication line 101 each time the game is played, the means (the main CPU 41, for example) for receiving the command signal transmitted from the control device 200 when the number of games accumulatively counted by the control device 200 based on the identification information of the gaming machine reaches the set value, the means (the main CPU 41, for example) for generating the second special game state based on the command signal, and the means (the main CPU 41, for example) for selecting the payout mode of the game media in the second special game state from plural kinds of the predetermined payout modes.

According to the gaming machine 10, when the number of games counted by the control device 200 reaches the set value and the command signal transmitted from the control device is received, the transition to the return mode is surely made. Therefore, even in a case where the first special game state has not generated for a long period of time and many coins are spent, when the game is played until the number of games reaches the set value, the transition to the return mode is surely made, so that player can get a profit.

In addition, the payout mode of the coin in the return mode is selected from plural kinds of the predetermined payout modes (return modes A to C). Even when any mode is selected, although the number of coin-out in the return mode is the same, a variety of return modes can be provided by changing the payout mode of the coin in the return mode.

Therefore, the player who has spent many coins can receive return in various modes for playing a game until the number of games reaches the set value. As a result, it can be prevented for a player who has spent many of the game media from feeling unpleasant against the game, building up distrust thereto, or losing interest in or a concern on the game.

The gaming machine 10 according to this embodiment is connected to the control device 200 through the communication line 101 and the control device counts the number of games in the gaming machine 10, and determines whether or not the transition to the return mode is made (whether or not the second special game state is generated). However, the gaming machine 10 does not always uses the network and may be stand alone.

A standalone gaming machine 10 according to the present invention comprises a main CPU 41 (processing device) and a RAM 43 (storage device), and the main CPU 41 executes: a processing executing a lottery program stored in the RAM 43 to perform a processing determining one winning combination selected from plural kinds of the predetermined winning combinations; a processing reading from the RAM 43 a first program for generating the bonus game (the first special game state) when the determined winning combination is the special winning combination of "bonus game trigger", and executing the first program; a processing accumulatively counting the number of games every time the game is played; a processing determining whether or not the number of games reaches the set value; a processing reading from the RAM 43 a second program for making transition to the return mode (generation of the second special game state) when it is determined that the number of games reaches the set value, and executing the second program; and a processing selecting the second program for reading from the RAM 43 and executing, from plural kinds of second programs in which the payout modes of the coin are different.

This gaming machine 10 comprises: winning combination determination means (the main CPU 41, for example) for determining the winning combination by the lottery; means (the main CPU 41, for example) for generating the bonus game when the determined winning combination is the special winning combination of the "bonus game trigger"; means (the main CPU 41, for example) for accumulatively counting the number of games every time the game is played; means (the main CPU 41, for example) for determining whether or not the number of games reaches the set value; means (the main CPU 41, for example) for making transition to the return mode (generation of the second special game state) when it is determined that the number of games reaches the set value; and means (the main CPU 41, for example) for selecting the payout mode of the coin in the return mode from plural kinds of the predetermined payout modes.

In addition, the gaming machine 10 may comprise the following configuration. That is, the gaming machine 10 comprises a main CPU 41 (central processing device) and a RAM 43 (storage device). The main CPU 41 executes: a processing executing a lottery program stored in the RAM 43 to perform a processing determining one winning combination selected from plural kinds of the predetermined winning combinations (refer to FIG. 13); a processing reading from the RAM 43 a first program for generating the bonus game (the first special game state) when the determined winning combination is the special winning combination of the "bonus game trigger", and executing the first program (refer to FIG. 18); a processing reading from the RAM 43 a second program for making transition to the return mode (generation of the second special game state) in a case where the predetermined number (three, for example) of the bonus games are not generated until the number of games accumulatively counted each time a game is played reaches the set value, and executing the second program; and a processing selecting the second program for reading from the RAM 43 and executing, from the three kinds of the second programs in which the payout modes of the coin are different (at step S80 shown in FIG. 19).

According to this gaming machine 10, the number of generation of the bonus game is counted every time the process in FIG. 18 is started and when the number of the bonus game reaches the predetermined times (3 times, for example), a game number reset signal may be transmitted to the control device 200 in step S71 shown in FIG. 18.

Such gaming machine 10 comprises: winning combination determination means (the main CPU 41, for example) for determining a winning combination by a lottery; means (the main CPU 41, for example) for generating a first special game state which is a game state advantageous to a player when the determined winning combination is the special winning combination; means (the main CPU 41, for example) for generating a second special game state in which the predetermined number of the game media is paid out in a case where the predetermined number (three, for example) of the first special game state is not generated until the number of games accumulatively counted each time a game is played reaches a set value; and means (the main CPU 41, for example) for selecting the payout mode of the game media in the second special game state from plural kinds of the predetermined payout modes.

According to the gaming machine 10, the game shifts to the return mode in a case where predetermined number of the bonus game is not generated until the number of games reaches a set value. In addition, the payout mode of the coins in the return mode is selected from plural kinds of the predetermined payout modes. Therefore, the player who has spent many coins can receive return until the number of games reaches the set value in various modes. As a result, it can be prevented for a player who has spent many of the game media from feeling unpleasant against the game, building up distrust thereto, or losing interest in or a concern on the game.

In addition, although the gaming machine 10 according to this embodiment makes the transition to the return mode (generation of the second special game state) when the number of games reaches a set value, the present invention is not limited to this example.

The gaming machine 10 of the present invention may make transition to the return mode (generation of the second special game state) when the payment balance in terms of coins becomes equal to or below the set value.

Such gaming machine 10 comprises a main CPU 41 (processing device), and a RAM 43 (storage device), and is connected to a control device 200 which accumulatively counts the payment balance in terms of coins for every gaming machine 10 of a plurality of gaming machines 10 through a communication line 101. The main CPU 41 executes: a processing executing a lottery program stored in the RAM 43 to perform a processing determining one winning combination selected from plural kinds of the predetermined winning combinations; a processing reading from the RAM 43 a first program for generating the bonus game (the first special game state) when the determined winning combination is the special winning combination of “bonus game trigger”, and executing the first program; a processing transmitting the number of coin-in and the number of coin-out in that game stored in the RAM 43 with the identification information of the gaming machine 10 to the control device through the communication line each time a game is played; a processing receiving a command signal transmitted from the control device 200 when the payment balance in terms of coins accumulatively counted by the control device 200 based on the identification information of the gaming machine 10 and the number of coin-in and the number of coin-out in that game become equal to or below the set value; a processing reading from the RAM 43 a second program for making transition to the return mode (generation of the second special game state) based on the command signal, and executing the second program; and a processing selecting the second program for reading from the RAM 43 and executing, from the plural kinds of the second programs in which the payout modes of the coin are different.

Such gaming machine 10 comprises: winning combination determination means (the main CPU 41, for example) for determining a winning combination by a lottery; means (the main CPU 41, for example) for generating a bonus game (the first special game state) when the determined winning combination is the special winning combination of “bonus game trigger”; means (the main CPU 41, for example) for transmitting the payment balance in terms of coins in that game with the identification information of the gaming machine 10 to the control device 200 through the communication line 101 each time a game is played; means (the main CPU 41, for example) for receiving the command signal transmitted from the control device 200 when the payment balance in terms of coins accumulatively counted by the control device 200 based on the payment balance in terms of coins in that time and the identification information of the gaming machine 10 reaches a set value; means (the main CPU 41, for example) for making transition to the return mode (generation of the second special game state) based on the command signal; and means (the main CPU 41, for example) for selecting the payout mode of coins in the return mode from the plural kinds of the predetermined payout modes.

According to this gaming machine 10, in a case where the command signal transmitted from the control device 200 is received when the payment balance in terms of coins counted by the control device 200 becomes equal to or below a set value, the game always shifts to the return mode. In addition, the payout mode of the coins in the return mode is selected from plural kinds of the predetermined payout modes. Therefore, the player who has spent many coins can receive return in various modes until the payment balance of coins becomes equal to or below a set value. As a result, it can be prevented for a player who has spent many of the game media from feeling unpleasant against the game, building up distrust thereto, or losing interest in or a concern on the game.

The above-mentioned gaming machine 10 is connected to the control device 200 through the communication line 101, and the control device 200 counts the payment balance in terms of coins in the gaming machine 10 and determines whether or not the game shifts to the return mode (whether or not the second special game state is generated). However, the gaming machine 10 may not always uses the network and may be standalone.

Such gaming machine 10 comprises a main CPU 41 (processing device) and a RAM 43 (storage device), and the main CPU 41 executes: a processing executing a lottery program stored in the RAM 43 to perform a processing determining one winning combination selected from plural kinds of the predetermined winning combinations; a processing reading from the RAM 43 a first program for generating the bonus game (the first special game state) when the determined winning combination is the special winning combination of “bonus game trigger”, and executing the first program; a processing counting accumulatively the payment balance in terms of the game media each time a game is played; a processing determining whether or not the payment balance in terms of the game media becomes equal to or below the set value; a processing reading from the RAM 43 a second program for make transition to the return mode (generation of the second special game state) when it is determined that the payment balance in terms of the game media becomes equal to or below the set value, and executing the second program; and a processing selecting the second program for reading from the RAM 43 and executing, from plural kinds of the second programs in which the payout modes of the coin are different.

This gaming machine 10 comprises: winning combination determination means (the main CPU 41, for example) for determining a winning combination by a lottery; means (the main CPU 41, for example) for generating the bonus game (the first special game state) when the determined winning combination is the special winning combination of the "bonus game trigger"; means (the main CPU 41, for example) for counting accumulatively the payment balance in terms of the game media each time a game is played; means (the main CPU 41, for example) for determining whether or not the payment balance in terms of the game media becomes equal to or below a set value; means (the main CPU 41, for example) for making transition to the return mode (generation of the second special game state) when it is determined that the payment balance in terms of the game media becomes equal to or below the set value; and means (the main CPU 41, for example) for selecting the payout mode of the coin in the return mode from plural kinds of the predetermined payout modes.

In addition, the gaming machine 10 may comprises the following configuration. That is, the gaming machine 10 comprises a main CPU 41 (processing device) and a RAM 43 (storage device). The main CPU 41 executes: a processing executing a lottery program stored in the RAM 43 to perform a processing determining one winning combination selected from plural kinds of the predetermined winning combinations (refer to FIG. 13); a processing reading from the RAM 43 a first program for generating the bonus game (the first special game state) when the determined winning combination is the special winning combination of "bonus game trigger", and executing the first program (refer to FIG. 18); a processing reading from the RAM 43 a second program for making transition to the return mode (generation of the second special game state) in a case where the predetermined number (three, for example) of the bonus game is not generated until the payment balance in terms of coins accumulatively counted each time a game is played becomes equal to or below the set value, and executing the second program; and a processing selecting the second program for reading from the RAM 43 and executing, from the three kinds of the second programs in which the payout modes of the coin are different.

Such gaming machine 10 comprises: winning combination determination means (the main CPU 41, for example) for determining a winning combination by a lottery; means (the main CPU 41, for example) for generating the first special game state which is a game state advantageous to a player when the determined winning combination is the special winning combination; means (the main CPU 41, for example) for generating the second special game state in which the predetermined number of the game media is paid out in a case where the predetermined number (three, for example) of the first special game state is not generated until the payment balance in terms of coins accumulatively counted each time a game is played becomes equal to or below the set value; and means (the main CPU 41, for example) for selecting the payout mode of the game media in the second special game state from plural kinds of the predetermined payout modes.

According to the gaming machine 10, the game shifts to the return mode in a case where the predetermined number of the bonus game is not generated until the payment balance in terms of coins becomes equal to or below the set value. In addition, the payout mode of the coins in the return mode is selected from plural kinds of the predetermined payout modes. Therefore, the player who has spent many coins can receive return in various modes until the number of games reaches the set value. As a result, it can be prevented for a player who has spent many of the game media from feeling unpleasant against the game, building up distrust thereto, or losing interest in or a concern on the game.

In the present embodiment, description has been given of a case where a game state shifts to the return mode when the return mode flag has been set to the state "ON", without other conditions being established thereafter. The present invention is, however, not limited to this example and, for example, a game state may shift to the return mode when a predetermined condition has been met after the return mode flag is set to the state "ON". In such a case, the predetermined condition for transition to the return mode is not particularly limited, and may include, for example, establishment of a bonus game trigger, stop display of a predetermined combination of symbols, and of the like conditions.

In the present embodiment, description has been given of a case where a game state shifts to the return mode when the return mode flag is set to the state "ON", regardless of the combination of symbols stop displayed thereafter. However, the present invention is not limited to this example. For example, a combination of symbols corresponding to the transition to the return mode may be set in advance and a game state may shift to the return mode after the symbols are stop displayed in that winning combination.

In the present embodiment, description has been given of a case where symbols are stop displayed (step S14 in FIG. 12), a processing is conducted based on the stop displayed combination of symbols (steps S15 to S20 in FIG. 12), and the number of games is counted (step S22 in FIG. 12) thereafter. In the present invention, however, no specific limitation is placed on a timing at which counting of the number of games is conducted. For example, the timing may be a timing at which BET of a coin is conducted (after step S10 or S11 in FIG. 12) or a timing at which the spin button is turned ON (after step S12 in FIG. 12). The number of games may be counted at a predetermined timing that is in the period from the time when display of a change in symbol is started, to the time when symbol sequences are stop displayed, and a processing based on the stop displayed combination of symbols has been conducted (for example, a timing at which symbol sequences are stop displayed). Note that a timing at which a payment balance in terms of game media can be the same as described above.

In the present embodiment, description has been given of a gaming machine 10 in which in a case where a special winning combination, "bonus game trigger", has been established (step S15 in FIG. 12) in the period from the time when the return mode flag is set to the state "ON" (step S22 in FIG. 12), to the time when transition to the return mode is conducted (step S20 in FIG. 12), transitions to the return mode is further conducted after the bonus game is generated (step S16 in FIG. 12). That is, a gaming machine according to the present embodiment generates the first special game state based on the a special winning combination, and further generates the second special game state, in a case where the special winning combination is established in the period from the time when the number of games reaches a set value, to the time when the second special game state is generated.

However, the present invention is not limited to this example. For example, in a case where a special winning combination is established in the period from the time when the number of games reaches a set value, to the time when the second special game state is generated, only the first special game state may be generated. In a case where the above embodiment is adopted, a player can earn a profit in the first special game state or the second special game state without fail when a game is played until the number of games reaches the set value. The above embodiment is one of the embodiments of the present invention. In a case where the above embodiment is adopted for the gaming machine 10, for example, the following processing has only to be conducted instead of the processing shown in FIG. 12.

Figure 26:
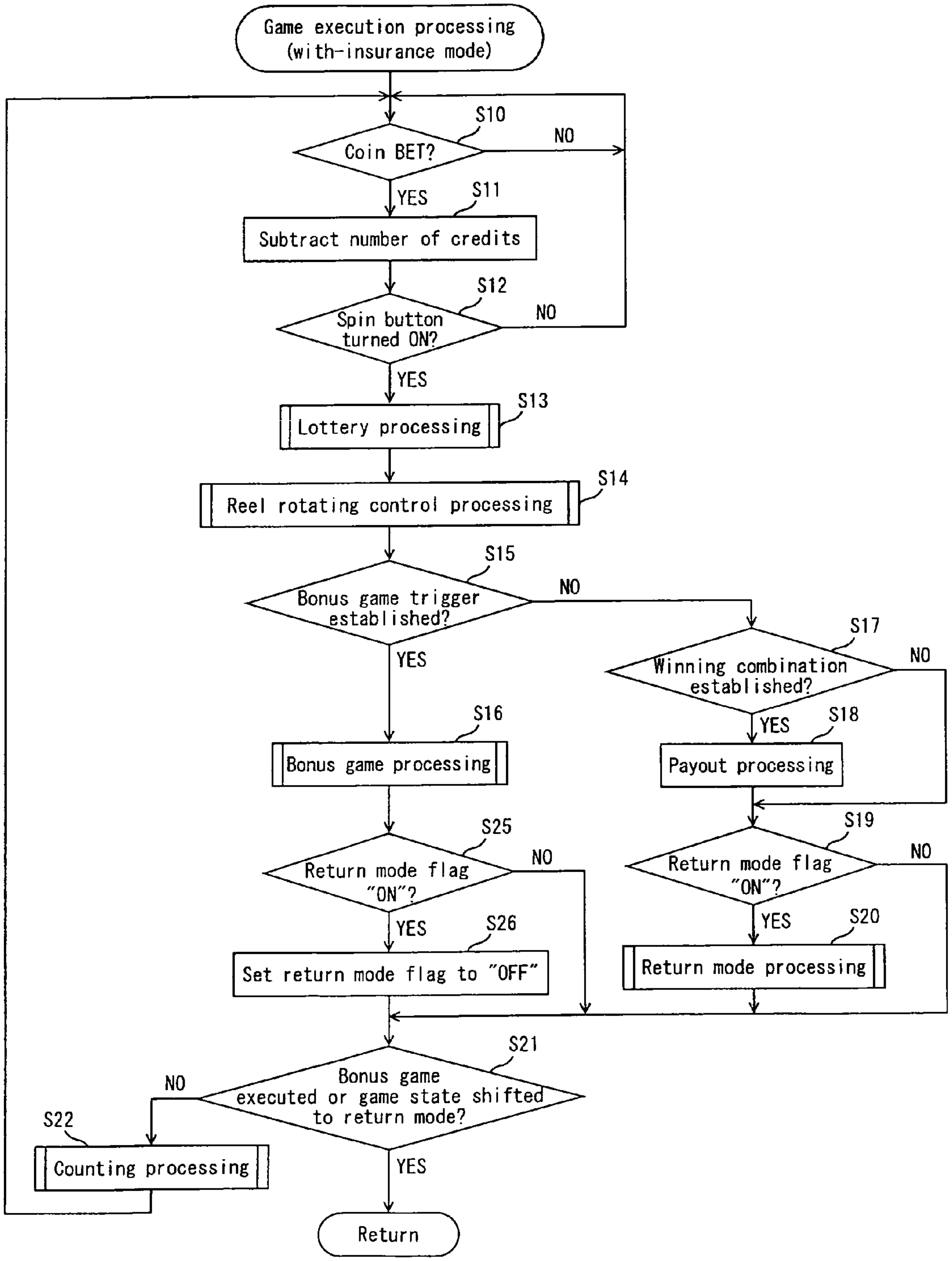
FIG. 26 is a flowchart showing another example of the subroutine of the game execution process.

FIG. 26 is a flowchart showing another example of a subroutine of a game execution processing. In the flowchart shown in FIG. 26, the same numerical references are assigned to steps which conduct processing similar to those in the flowchart shown in FIG. 12.

After the processing in steps S10 to S14 are executed, the main CPU 41 determines whether a bonus game trigger has been established or not (step S15) and if it is determined that the bonus game trigger has been established, a bonus game processing is executed (step S16). Then, it is determined whether a return mode flag is set to the state "ON" or not (step S25) and if the return mode flag is set to "ON", the return mode flag is set to the state "OFF" (step S26). The processing in step S21 is performed thereafter and thus the present subroutine is completed. Since the other processing are processing similar to those described in FIG. 12, descriptions thereof are omitted here. In the subroutine shown in FIG. 26, after a coins is BET (step S10), in a case where it is determined whether the spin button 23 has been turned ON or not (step S12), and if it is determined that the spin button has been turned ON (YES in step S12), a processing for subtracting the number of credits (step S11) may be conducted, as in the subroutine shown in FIG. 12.

A more specific description of the processing shown in FIG. 26 will be given here with a case where a set value is 600. In a case where, in step S22, the number of games reaches 600 and a return mode flag has been established, if a bonus game trigger has been established (step S15) in the 601st game, the bonus game is generated (step S16) but transition to the return mode is not performed (steps S25 and S26). On the other hand, in a case where a bonus game trigger has not been established in the 601st game run, transition to the return mode is conducted (steps S19 and S20).

Hence, in a case where the processing shown in FIG. 26 is performed, a bonus game is generated or transition to the return mode is performed without fail, when the number of games reaches a set value.

In the present invention, in a case where a special winning combination has been established in the period from the time when the number of games reaches a set value, to the time when the second special game state is generated, only the second special game state may be generated, or alternatively, either the first special game state or the second special game state may be generated depending on a game situation and the like.

An embodiment similar to the above-mentioned embodiment can also be adopted in a case where the second special game state is generated according to a payment balance in terms of game media. In other words, in a case where a special winning combination has been established in the period from the time when a payment balance in terms of game media is equal to or less than a set value, to the time when the second special game state is generated, only the first special game state may be generated, only the second special game state may be generated, or either the first special game state or the second special game state may be generated depending on a game situation and the like.

According to this embodiment, the description has been made of the case where a set value is fixed to one set value and the number of coin-outs in the return mode is fixed to one value. However, the present invention is not limited to this example. For example, the set value may be selected from predetermined candidate values which are set stepwise in advance, and the number of coin-outs in the return mode may be determined according to the set value.

A description will be made of the case where the gaming machine 10 comprises the above constitution.

FIG. 27 is a figure schematically showing an example of correspondence table between a gaming machine identification number and a game history. The correspondence table is stored as data in the hard disk drive 205 of the control device 200. Each of the gaming machine identification numbers is made to correspond to the number of games as a game history, an accumulative number of coin-ins, an accumulative number of coin-outs, a payment balance in terms of the coins and a return rate of coin-outs.

A set value that is an object of comparison with the number of games is determined for each of the gaming machine identification numbers. The set value is selected from plural candidate values "600", "1200" and "2400" stepwise determined in advance. A set value "600" is assigned to the gaming machine 10 with the gaming machine identification number "001". A set value "600" is assigned to the gaming machine 10 with the gaming machine identification number "002". A set value "1200" is assigned to the gaming machine 10 with the gaming machine identification number "003". In the present invention, the values or number of the candidate values is not particularly limited, and may be set according to circumstances. Moreover, the set value does not need to be set individually for each of the gaming machines 10, but assigned to plural gaming machines 10 collectively.

When CPU 201 receives the number of coin-in, the number of coin-out and the gaming machine identification number from the gaming machine 10 through the communication interface 204, a game history corresponding to the gaming machine identification number is updated. More specifically, 1 is added to the number of games, the number of coins inserted is added to the accumulative number of coin-ins and the number of coins paid out is added to the accumulative number of coin-outs. Furthermore, a payment balance in terms of the coins and a return rate are calculated based on the accumulative number of coin-ins and the accumulative number of coin-outs. When CPU 201 determines that the number of games updated has reached a set value, CPU 201 determines the number of coin-outs in the return mode based on the set value.

FIG. 28 is a figure schematically showing an example of correspondence table between a set value and the number of payouts.

The number of coin-outs "1000" in the return mode is set corresponding to a set value of "600". The number of coin-outs "2000" in the return mode is set corresponding to a set value of "1200". The number of coin-outs "4000" in the return mode is set corresponding to a set value of "2400". Since, in the present embodiment, the number of coin-outs in the payout return mode is larger the larger a set value is, a profit matching the number of games played by a player is given to the player in the return mode. Therefore, it can be prevented for a player who has spent many of the game media from feeling unpleasant against the game, building up distrust thereto, or losing interest in or a concern on the game. Note that the correspondence table shown in FIG. 28 is stored on the hard disc drive 205 as data.

It is not necessary for the number of coin-outs set to correspond to a set value to be constantly the same, and for example, the number of coin-outs set to correspond to a set value may be changeable according to a game history and the like.

FIG. 29 is a figure schematically showing another example of correspondence table between a set value and the number of payouts.

At a set value "600", "(−payment balance)×50% (provided that the number of coin-outs=1000 if a payment balance≧0)" is set as the number of coin-outs in the return mode. Hence, if a payment balance is "−2000" when the number of games reaches 600, the number of coin-outs is 1000, and if a payment balance is "−4000", the number of coin-outs is 2000. At a set value "1200", "(−payment balance)×60% (provided that the number of coin-outs=2000 if payment balance≧0)" is set as the number of coin-outs in the return mode. At a set value "2400", "(−payment balance)×70% (provided that the number of coin-outs=4000 if payment balance≧0)" is set as the number of coin-outs in the return mode.

Figure 30:
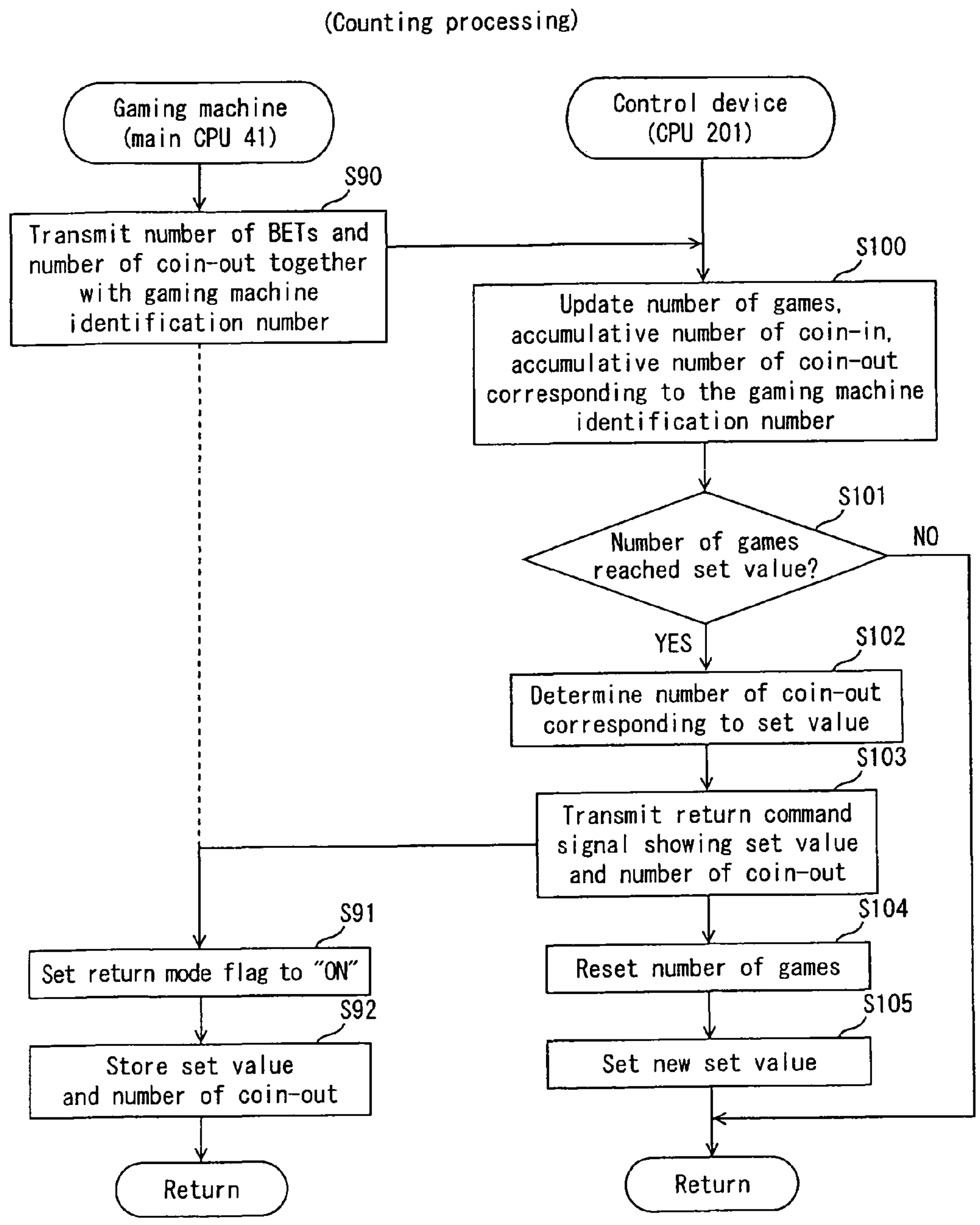
FIG. 30 is a schematic view showing another example of the correspondence table between the set value and the number of payout.

FIG. 30 is a flowchart showing another example of the counting processing.

In the flowchart shown in FIG. 30, the same numerical references are assigned to steps which conduct processing similar to those in the flowchart shown in FIG. 25.

Here, one set value selected from plural candidate values "600", "1200" and "2400" stepwise determined in advance is set to each of the plural gaming machines 10 (refer to FIG. 27).

To begin with, the main CPU 41 transmits by the communication interface 44 the number of coin-ins and the number of coin-outs stored in RAM 43 together with the gaming machine identification number to the control device 200 through the communication line 101 (step S90). The number of coin-ins and the number of coin-outs transmitted to the control device 200 from the gaming machine 10 are those of the game concerned.

The processing in step S90 is a processing in which the main CPU 41 (processing device) transmits the identification information of the gaming machine 10 stored in the main RAM 43 (storage device) to the control device 200 through the communication line 101, each time a game is played. When the processing in step S90 is executed, the main CPU 41 functions as means for transmitting the identification information of the gaming machine 10 to the control device 200 through the communication line 101.

On the other hand, the CPU 201 of the control device 200, when receiving from the gaming machine 10 the number of coin-ins, the number of coin-outs and the gaming machine identification number through the communication line 101 by the communication interface 204, updates the number of games, the accumulative number of coin-ins and the accumulative number of coin-outs corresponding to the received gaming machine identification number (step S100), by choosing the data, which are made to correspond to each of the gaming machine identification numbers, of the number of games, the accumulative number of coin-ins, the accumulative number of coin-outs stored in the hard disc drive 205 (refer to FIG. 27) (step S100).

Then, CPU 201 determined whether the number of games after the updating has reached the set value or not (step S101). If it is determined that the number of games after the updating has not reached the set value, the subroutine is completed.

On the other hand, if it is determined in step S101 that the number of games after the updating has reached the set value, CPU 201 determines the number of coin-outs corresponding to the set value, based on a correspondence table (see FIG. 28) between the set value and the number of coin-outs stored in the hard disc drive 205 (step S102).

Then, CPU 201 transmits through the communication line 101 by the communication interface 204 to the gaming machine 10 in which the number of games has reached the set value, a return command signal showing the set value and the number of payout coins (step S103). Thereafter, CPU 201 resets to 0 the number of games stored in the hard disc drive 205 which are made to correspond to the gaming machine identification number of the gaming machine 10 (step S104). In succession thereto, CPU 201 selects a new set value by lottery and the selected set value is stored in the hard disc drive 205, being made to correspond to the gaming machine identification number of the concerned gaming machine 10 (step S105).

The main CPU 41 of the gaming machine 10, when receiving the return command signal transmitted from the control device 200 in step S103, sets the return mode flag to the state "ON" (step S91). The processing in step S91 is a processing for receiving a command signal transmitted from the control device 200 when the number of games accumulatively counted by the control device 200 based on the identification information of the gaming machine 10 reaches a set value selected from plural candidate values stepwise determined in advance. In step S91, the main CPU 41 functions as means for receiving a command signal transmitted from the control device 200. The main CPU 41 thereafter stores into RAM 43 data showing the set value and the number of payout coins, included in the return command signal (step S92). Thereafter, the present processing is completed.

A payout mode as the second special game state may includes a payout mode in which a predetermined number of game media is paid out to a player when the number of games reaches a set value like a return mode A. It may alternatively include a payout mode that when the number of games reaches a set value, the return mode as the second special game state, allowing a player to have a privilege in a similar manner to the first special game state such as a free game, a second game, a mystery game and the like, can be set, and a predetermined number of game media is paid out by one of the above-mentioned game mode.

In the aforementioned embodiment, both embodiments are exemplified. The second special game state in the present invention includes both embodiments.

A timing at which a predetermined number of game media is paid out is not limited to such a timing at which one game is completed and symbol sequences are stop displayed as in the mystery game described above, and for example, game media may be immediately paid out when the number of games reaches a set value.

Moreover, a method for paying out a predetermined number of game media is also not particularly limited, and for example, coins may be actually paid out, the number of credits may be increased, or a ticket such as a ticket with a bar code may be issued.

However, in order to be able to discriminate and recognize whether a player is paid out by an ordinary game or a bonus game (the first special game state), or by the return mode (the second special game state), it is necessary to perform the following way. That is, in a case where coins are actually paid out in mystery bonus of the return mode (the second special game state), the timing for payout is required to be different from those of an ordinary game and bonus game (the first special game state). Moreover, it is required that payout in an ordinary game and a bonus game (the first special game state) is performed with actual coins and payout in the return mode (the second special game state) is performed with a ticket described above. With such an embodiment adopted, payout in an ordinary game and a bonus game (the first special game state), and payout in the return mode (the second special game state) can be discriminated from each other.

Although the embodiment according to the present invention has been described, the description presents only some of the specific examples, and is not intended to limit the present invention in any way and specific constructions of each means and the like can be properly changed in terms of design. Besides, the effects described in the embodiment of the present invention are only the most preferable effects generated from the present invention and effects to be caused by the present invention is not limited to those described in the embodiment of the present invention.

What is claimed as new and desired to be secured by Letters Patent of the United States is:

1. A gaming machine comprising:

a winning combination determination unit configured to determine a winning combination by a lottery;

a first generating unit configured to generate a first special game state which is a game state advantageous to a player when the determined winning combination is a special winning combination;

a second generating unit configured to generate a second special game state in which a predetermined number of game media is paid out when the number of games accumulatively counted each time a game is played reaches a set value that is an object of comparison with the number of games accumulatively counted; and a selecting unit configured to randomly select, after the number of games accumulatively counted reaches the set value, a payout mode of the game medium in said second special game state from plural kinds of predetermined payout modes, wherein each predetermined payout mode provides a same number of game media for payout and employs different processing while providing the same number of game media for payout, and the plural kinds of predetermined payout modes include a mode in which games, having a payout equal to a sum of a normal payout based on a winning combination and a predetermined increased payout, are played until the same number of game media are paid out.

2. A gaming machine comprising:

a winning combination determination unit configured to determine a winning combination by a lottery;

a first generating unit configured to generate a first special game state which is a game state advantageous to a player when the determined winning combination is a special winning combination; and a second generating unit configured to generate a second special game state in which the predetermined number of game medium is paid out in a case where the predetermined number of the first special game state is not generated until the number of games accumulatively counted each time a game is played reaches a set value that is an object of comparison with the number of games accumulatively counted; and a selecting unit configured to randomly select, after the number of games accumulatively counted reaches the set value, a payout mode of the game medium in said second special game state from plural kinds of predetermined payout modes, wherein each predetermined payout mode provides a same number of game media for payout and employs different processing while providing the same number of game media for payout, and the plural kinds of predetermined payout modes include a mode in which games, having a payout equal to a sum of a normal payout based on a winning combination and an increased payout, are played until the predetermined number of game media are paid out.

3. A gaming machine comprising:

a winning combination determination unit configured to determine a winning combination by a lottery;

a first generating unit configured to generate a first special game state which is a game state advantageous to a player when the determined winning combination is a special winning combination;

a second generating unit configured to generate second special game state in which the predetermined number of game medium is paid out in a case where the predetermined number of the first special game state is not generated until the number of games accumulatively counted each time a game is played reaches a set value that is an object of comparison with the number of games accumulatively counted; and a selecting unit configured to randomly select, after the number of games accumulatively counted reaches the set value, a payout mode of the game medium in said second special game state from plural kinds of predetermined payout modes, wherein each predetermined payout mode provides a same number of game media for payout and employs different processing while providing the same number of game media for payout, and the plural kinds of predetermined payout modes include a mode in which games, having a payout equal to a sum of a normal payout based on a winning combination and an increased payout, are played until the predetermined number of game media are paid out.

4. A gaming machine connected to a control device which accumulatively counts the number of games in for every gaming machine of a plurality of gaming machines through a communication line, comprising:

a winning combination determination unit configured to determine a winning combination by a lottery;

a first generating unit configured to generate a first special game state which is a game state advantageous to a player when the determined winning combination is a special winning combination;

a transmitter configured to transmit an identification information of the gaming machine to said control device through said communication line each time a game is played;

a receiver configured to receive a command signal transmitted from said control device when the number of games accumulatively counted by the control device based on said identification information of the gaming machine reaches a set value that is an object of comparison with said number of games accumulatively counted;

a second generating unit configured to generate a second special game state in which the predetermined number of game medium is paid out based on said command signal; and a selecting unit configured to randomly select, after the number of games accumulatively counted reaches the set value, a payout mode of the game medium in said second special game state from plural kinds of predetermined payout modes, wherein each predetermined payout mode provides a same number of game media for payout and employs different processing while providing the same number of game media for payout, and the plural kinds of predetermined payout modes include a mode in which games, having a payout equal to a sum of a normal payout based on a winning combination and an increased payout, are played until the predetermined number of game media are paid out.

5. A gaming machine comprising:

a winning combination determination unit configured to determine a winning combination by a lottery;

a first generating unit configured to generate a first special game state which is a game state advantageous to a player when the determined winning combination is a special winning combination;

a counter configured to accumulatively count the number of games each time a game is played;

a determination unit configured to determine whether or not said number of games has reached a set value that is an object of comparison with said number of games accumulatively counted;

a second generating unit configured to generate a second special game state in which the predetermined number of game medium is paid out when said number of games is determined to have reached said set value; and a selecting unit configured to randomly select, after the number of games accumulatively counted reaches the set value, a payout mode of the game medium in said second special game state from plural kinds of predetermined payout modes, wherein each predetermined payout mode provides a same number of game media for payout and employs different processing while providing the same number of game media for payout, and the plural kinds of predetermined payout modes include a mode in which games, having a payout equal to a sum of a normal payout based on a winning combination and an increased payout, are played until the predetermined number of game media are paid out.

6. The gaming machine according to claim 1, wherein a reception unit configured to accept for one game an insertion of game media up to a predetermined upper limit value is provided, and said second generating unit configured to generate said second special game state generates a second special game state in a case where the number of inserted game media for the game played by the player is equal to said upper limit when said number of games reaches said set value.

7. A gaming machine equipped with a processing device and a storage device, wherein said processing device executes:

determining one winning combination selected from plural kinds of winning combinations determined in advance by executing a lottery program stored in said storage device;

reading from said storage device a first program for generating a first special game state that is a game state advantageous to a player when the determined winning combination is a special winning combination, and executing said first program;

reading from the storage device a second program for generating a second special game state in which the predetermined number of game media is paid out when the number of games accumulatively counted each time a game is played reaches a set value that is an object of comparison with said number of games accumulatively counted, and executing said second program; and randomly selecting, after the number of games accumulatively counted reaches the set value, a payout mode of game medium in said second special game state from plural kinds of predetermined payout modes, wherein each predetermined payout mode provides a same number of game media for payout and employs different processing while providing the same number of game media for payout, and the plural kinds of predetermined payout modes include a mode in which games, having a payout equal to a sum of a normal payout based on a winning combination and an increased payout, are played until the predetermined number of game media are paid out.

8. A gaming machine equipped with a processing device and a storage device, wherein said processing device executes:

determining one winning combination selected from plural kinds of winning combinations determined in advance by executing a lottery program stored in said storage device;

reading from said storage device a first program for generating a first special game state that is a game state advantageous to a player when the determined winning combination is a special winning combination, and executing said first program;

reading from said storage device a second program for generating a second special game state in which the predetermined number of game media is paid out in a case where the predetermined number of the first special game state is not generated until the number of games accumulatively counted each time a game is played reaches a set value that is an object of comparison with the number of games accumulatively counted, and executing said second program; and randomly selecting, after the number of games accumulatively counted reaches the set value, a payout mode of game medium in said second special game state from plural kinds of predetermined payout modes, wherein each predetermined payout mode provides a same number of game media for payout and employs different processing while providing the same number of game media for payout, and the plural kinds of predetermined payout modes include a mode in which games, having a payout equal to a sum of a normal payout based on a winning combination and an increased payout, are played until the predetermined number of game media are paid out.

9. A gaming machine equipped with a processing device and a storage device, and connected through a communication line to a control device which counts the number of games accumulatively for every gaming machine of plural gaming machines, wherein said processing device executes:

determining one winning combination selected from plural kinds of winning combinations determined in advance by executing a lottery program stored in said storage device;

reading from said storage device a first program for generating a first special game state that is a game state advantageous to a player when the determined winning combination is a special winning combination, and executing said first program;

transmitting an identification information on a gaming machine stored in said storage device to said control device through said communication line each time a game is played;

receiving a command signal transmitted from said control device when said number of games counted accumulatively by said control device based on said identification information on the gaming machine reaches a set value that is an object of comparison with said number of games accumulatively counted;

reading from the storage device based on said command signal a second program for generating a second special game state in which the predetermined number of game media is paid out, and executing said second program; and randomly selecting, after the number of games accumulatively counted reaches the set value, a payout mode of game medium in said second special game state from plural kinds of predetermined payout modes, wherein each predetermined payout mode provides a same number of game media for payout and employs different processing while providing the same number of game media for payout, and the plural kinds of predetermined payout modes include a mode in which games, having a payout equal to a sum of a normal payout based on a winning combination and an increased payout, are played until the predetermined number of game media are paid out.

10. A gaming machine equipped with a processing device and a storage device, wherein said processing device executes:

determining one winning combination selected from plural kinds of winning combinations determined in advance by executing a lottery program stored in said storage device;

reading from said storage device a first program for generating a first special state that is a game state advantageous to a player when the determined winning combination is a special winning combination, and executing said first program;

counting the number of games accumulatively each time a game is played;

determining whether or not said number of games has reached said set value that is an object of comparison with said number of games accumulatively counted;

reading from the storage device a second program for generating a second special game state in which the predetermined number of game media is paid out when said number of games is determined to have reached said set value, and executing said second program; and randomly selecting, after the number of games accumulatively counted reaches the set value, a payout mode of game medium in said second special game state from plural kinds of predetermined payout modes, wherein each predetermined payout mode provides a same number of game media for payout and employs different processing while providing the same number of game media for payout, and the plural kinds of predetermined payout modes include a mode in which games, having a payout equal to a sum of a normal payout based on a winning combination and an increased payout, are played until the predetermined number of game media are paid out.

11. The gaming machine according to claim 7, wherein said processing device executes a second program for generating said second special game state in a case where the number of inserted game media for the game played a player is predetermined upper limit value of the number of game media to be inserted for one game when said number of games accumulatively counted reaches said set value.

12. A gaming machine comprising:

a payout unit configured to pay out to the player the number of game media corresponding to the number of games played by a player; and a selecting unit configured to randomly select, after the number of games accumulatively counted reaches the set value, a payout mode of the number of game media corresponding to said number of games from plural kinds of predetermined payout modes, wherein each predetermined payout mode provides a same number of game media for payout and employs different processing while providing the same number of game media for payout, and the plural kinds of predetermined payout modes include a mode in which games, having a payout equal to a sum of a normal payout based on a winning combination and an increased payout, are played until the predetermined number of game media are paid out.

13. A game control method comprising:

paying out to the player the number of game media corresponding to the number of games played by a player; and randomly selecting, after the number of games accumulatively counted reaches the set value, a payout mode of the number of game media corresponding to said number of games from plural kinds of predetermined payout modes, wherein each predetermined payout mode provides a same number of game media for payout and employs different processing while providing the same number of game media for payout, and the plural kinds of predetermined payout modes include a mode in which games, having a payout equal to a sum of a normal payout based on a winning combination and an increased payout, are played until the predetermined number of game media are paid out.

14. A control system equipped with a gaming machine and a control device, wherein said control device includes:

a transmitter configured to transmit a signal to said gaming machine according to said number of games played by a player in said gaming machine, said gaming machine including, a payout unit configured to pay out the number of game media corresponding to said number of games to the player based on said signal received from said control device; and a selecting unit configured to randomly select, after the number of games accumulatively counted reaches the set value, a payout mode of the number of game media corresponding to said number of games from plural kinds of predetermined payout modes, wherein each predetermined payout mode provides a same number of game media for payout and employs different processing while providing the same number of game media for payout, and the plural kinds of predetermined payout modes include a mode in which games, having a payout equal to a sum of a normal payout based on a winning combination and an increased payout, are played until the predetermined number of game media are paid out.

15. The gaming machine according to claim 1, wherein the plural kinds of predetermined payout modes include a mode in which 1,000 game media tokens are paid out, and a mode in which free games are executed.

16. The gaming machine according to claim 1, wherein the number of game media paid out in the second special game state is varied with a game history.

17. The gaming machine according to claim 1, further comprising:

a receiver configured to receive an insertion of game media up to a predetermined upper limit value for one game, wherein said second generating unit generates the second special game state when the number of inserted game media for the one game is at the upper limit value for a current game and, the number of games in which the insertion of game media has been conducted at the upper limit value reaches a set value.

18. The gaming machine according to claim 3, wherein the plural kinds of predetermined payout modes include a mode in which 1,000 game media tokens are paid out, and a mode in which free games are executed.

19. The gaming machine according to claim 3, wherein the number of game media paid out in the second special game state is varied with a game history.

20. The gaming machine according to claim 3, further comprising:

a receiver configured to receive an insertion of game media up to a predetermined upper limit value for one game, wherein said second generating unit generates the second special game state when the number of inserted game media for the one game is at the upper limit value for a current game and, the number of games in which the insertion of game media has been conducted at the upper limit value reaches a set value.

21. The gaming machine according to claim 4, wherein the plural kinds of predetermined payout modes include a mode in which 1,000 game media tokens are paid out, and a mode in which free games are executed.

22. The gaming machine according to claim 4, wherein the number of game media paid out in the second special game state is varied with a game history.

23. The gaming machine according to claim 4, further comprising:

a receiver configured to receive an insertion of game media up to a predetermined upper limit value for one game, wherein said second generating unit generates the second special game state when the number of inserted game media for the one game is at the upper limit value for a current game and, the number of games in which the insertion of game media has been conducted at the upper limit value reaches a set value.

24. The gaming machine according to claim 5, wherein the modes include a mode in which 1,000 game media tokens are paid out, and a mode in which free games are executed.

25. The gaming machine according to claim 5, wherein the number of game media paid out in the second special game state is varied with a game history.

26. The gaming machine according to claim 5, further comprising:

a receiver configured to receive an insertion of game media up to a predetermined upper limit value for one game, wherein said second generating unit generates the second special game state when the number of inserted game media for the one game is at the upper limit value for a current game and, the number of games in which the insertion of game media has been conducted at the upper limit value reaches a set value.

* * * * *